(12) United States Patent
Kirino et al.

(10) Patent No.: US 6,893,746 B1
(45) Date of Patent: May 17, 2005

(54) MAGNETIC RECORDING MEDIUM WITH HIGH THERMAL STABILITY, METHOD FOR PRODUCING THE SAME, AND MAGNETIC RECORDING APPARATUS

(75) Inventors: Fumiyoshi Kirino, Suginami (JP); Norio Ohta, Yawara-mura (JP); Kouichirou Wakabayashi, Toride (JP); Teruaki Takeuchi, Moriya (JP); Harumi Hieida, Moriya (JP); Masaki Sekine, Moriya (JP); Hiroyuki Awano, Chiba (JP); Akira Yano, Moriya (JP); Satoshi Matsunuma, Kamakura (JP); Nobuyuki Inaba, Hasuda (JP); Tetsunori Koda, Moriya (JP)

(73) Assignee: Hitachi Maxell, Ltd., Osaka (JP)

(*) Notice: Subject to any disclaimer, the term of this patent is extended or adjusted under 35 U.S.C. 154(b) by 0 days.

(21) Appl. No.: 10/111,608

(22) PCT Filed: Oct. 30, 2000

(86) PCT No.: PCT/JP00/07622

§ 371 (c)(1),
(2), (4) Date: Apr. 26, 2002

(87) PCT Pub. No.: WO01/31645

PCT Pub. Date: May 3, 2001

(30) Foreign Application Priority Data

Oct. 29, 1999 (JP) .............................. 11/308316
Oct. 29, 1999 (JP) .............................. 11/308317

(51) Int. Cl.$^7$ .............................. G11B 5/66; G11B 5/70; G11B 11/105
(52) U.S. Cl. .............................. 428/694 R; 428/694 ML; 428/694 SC; 428/694 RE; 428/694 NF; 428/694 MM; 369/13.02; 369/13.4; 369/13.45; 369/13.5; 369/13.54
(58) Field of Search .............................. 369/13.02, 13.4, 369/13.5, 13.45, 13.54; 428/694 R, 694 ML, 694 SC, 694 RE, 694 NF, 694 S, 694 MN, 694 T, 694 TS, 694 TM

(56) References Cited

U.S. PATENT DOCUMENTS 4,652,499 A    3/1987  Howard
4,711,810 A  * 12/1987  Ando .......................... 428/336
5,851,643 A  * 12/1998  Honda .......................... 428/336
2001/0009730 A1 *  7/2001  Futamoto et al. ..... 428/694 TM
2001/0051287 A1 * 12/2001  Kikitsu et al. ....... 428/694 ML

FOREIGN PATENT DOCUMENTS

| JP | A 61-105721 | 5/1986 |
| JP | 63-094449 | 4/1988 |
| JP | A 8-30951 | 2/1996 |
| JP | 10-091938 | 4/1998 |
| JP | 10-172189 | 6/1998 |
| JP | 10-289434 | 10/1998 |
| JP | 09-139655 | * 12/1998 |
| JP | A 10-334443 | 12/1998 |
| JP | 2000-067425 | 3/2000 |
| JP | 2000-113444 | 4/2000 |
| JP | 2000-155926 | 6/2000 |
| JP | 2000-195002 | 7/2000 |

OTHER PUBLICATIONS

Matsumoto et al., "Magnetic recording properties of Magneto–Optical media by merge type GMR head", 23 rd Annual Meeting of Magnetic Society of Japan, 1999.

Matsumoto et al., "Magnetic recording Properties of Magneto–Optical Media By Merge Type GMR Head", Inter-Mag2000 HA–04.

O'Grady et al., "Magnetic Characterisation of Thin Film Recording Media", IEEE Transactions On Magnetics, vol. 29, No. 1, Jan. 1993.

* cited by examiner

*Primary Examiner*—D. S. Nakarani
*Assistant Examiner*—Nikolas J. Uhlir
(74) *Attorney, Agent, or Firm*—Oliff & Berridge, PLC

(57) ABSTRACT

A magnetic recording medium comprises an information-recording film and a ferromagnetic film on a substrate. The information-recording film is composed of, for example, an amorphous ferrimagnetic material having perpendicular magnetization. Further, the ferromagnetic film is composed of a magnetic material which has saturation magnetization larger than that of the information-recording film. Accordingly, the leak magnetic flux from the ferromagnetic film is larger than that from the information-recording film. The magnetic recording medium and a magnetic recording apparatus are obtained, which are excellent in thermal stability and which are preferred to perform super high density recording.

37 Claims, 14 Drawing Sheets

(A)

EMBODIMENT OF
THE PRESENT INVENTION (B)

COMPARATIVE
EXAMPLE (A)

(B)

81: SUBSTRATE

82: UNDERLYING BASE FILM

83: MAGNETIC FILM

84: PROTECTIVE FILM (A)

(B)

Data type    Phase
Z range      10.000 de

Data type     Phase
Z range       5.000 de

91: SUBSTRATE
92: UNDERLYING BASE FILM
93: INFORMATION-RECORDING FILM
94: PROTECTIVE FILM

95: MAGNETIC FILM (Tb-Fe-Co FILM)
96: NON-MAGNETIC FILM (Si FILM)

A: MEDIUM HAVING INFORMATION-RECORDING FILM FORMED AT GAS PRESSURE OF 5 mTorr
B: MEDIUM HAVING INFORMATION-RECORDING FILM FORMED AT GAS PRESSURE OF 10 mTorr
C: MEDIUM HAVING INFORMATION-RECORDING FILM FORMED AT GAS PRESSURE OF 20 mTorr 006_# MAGNETIC RECORDING MEDIUM WITH HIGH THERMAL STABILITY, METHOD FOR PRODUCING THE SAME, AND MAGNETIC RECORDING APPARATUS

TECHNICAL FIELD

The present invention relates to a magnetic recording medium for magnetically recording information thereon, and a magnetic recording apparatus provided with the same. In particular, the present invention relates to a magnetic recording medium which is excellent in thermal stability and which has high performance and high reliability. The present invention also relates to a magnetic recording apparatus provided with the same.

BACKGROUND ART

Recent development of advanced information society is remarkable. The multimedia, in which pieces of information in a variety of forms are integrated, rapidly comes into widespread use. A magnetic disk apparatus, which is installed to a computer or the like, is known as one of the multimedia. At present, development is advanced for the magnetic disk apparatus aiming at the miniaturization while improving the recording density. Concurrently therewith, development is also advanced quickly in order to realize a low price of the apparatus.

In order to realize the high density on the magnetic disk, for example, it is demanded that (1) the distance between the disk and the magnetic head is narrowed, (2) the coercivity of the magnetic recording medium is increased, (3) the signal-processing method is executed at a high speed, and (4) the thermal fluctuation of the magnetic recording medium is reduced.

In order to realize the high density magnetic recording on the magnetic recording medium, it is necessary to increase the coercivity of the magnetic film. A material based on the Co—Cr—Pt(—Ta) system has been widely used for the magnetic film of the magnetic recording medium. This material is a crystalline material in which crystal grains of Co of about 20 nm are deposited. In order to realize, for example, an a real recording density exceeding 40 Gbits/inch$^2$ on the magnetic recording medium in which such a material is used for the magnetic film, it is necessary to further decrease the size of the unit (magnetic cluster) in which the inversion of magnetization occurs during recording or erasure, and it is necessary to decrease the grain size distribution so that the structure and the organization of the magnetic film are precisely controlled. When the control is made as described above, the noise, which is generated from the medium during the reproduction, can be reduced. However, any dispersion arises in the crystal grain size. Especially, when grains having small sizes exist in the magnetic film, then the thermal demagnetization and the thermal fluctuation take place, and the magnetic domain, which is formed in the magnetic film, fails to stably exist in some cases. Especially, when the magnetic domain is made fine and minute as the recording density is increased, remarkable influences are exerted by the thermal demagnetization and the thermal fluctuation. In order to reduce the noise generated from the medium by making the crystal grains to be fine and minute, the thermal fluctuation is suddenly increased. Especially, when the crystal grain diameter is not more than 10 nm to 8 nm, the thermal fluctuation has appeared conspicuously. For this reason, in view of the reduction of the thermal demagnetization and the thermal fluctuation, it becomes an important technique to control the crystal grain size distribution. As a method for realizing the above, for example, U.S. Pat. No. 4,652,499 discloses a method in which a seed film is provided between a substrate and a magnetic film.

However, the magnetic disk, which uses a ferromagnetic film as a magnetic film, has involved a certain limit of control of the magnetic grain diameter and the distribution thereof in the magnetic film by using the method in which the seed film is provided as described above. For example, when the super high density recording exceeding 40 Gbits/inch$^2$ is performed, the grain diameter distribution has been broad with large-sized grains and minute grains existing in a mixed manner, for example, even when the material for the seed film, the film formation condition, and the structure of the seed film are adjusted. When information is recorded (when magnetization is inverted), the minute grains are affected by influences of leak magnetic field from surrounding magnetic grains. On the other hand, the large-sized grains interact with surrounding magnetic grains. Further, some magnetic grains, which have grain diameters larger than the average of those of the magnetic grains, cause the increase in noise when recording/reproduction is performed. Other magnetic grains, which have grain diameters smaller than the average, sometimes increase the thermal fluctuation when recording/reproduction is performed. For this reason, it has been difficult to reliably record information. As a result of the presence of magnetic grains having a variety of sizes in a mixed manner in the mass of magnetic grains, the boundary line between an area in which inversion of magnetization occurs and an area in which inversion of magnetization does not occur exhibits a rough zigzag pattern as a whole. Such a phenomenon also causes the increase in noise.

In order to perform the high density recording, it is also important that the magnetic layer is thermally stable. The value represented by $(Ku \cdot V)/(k \cdot T)$ can be used as an index for the thermal stability of the magnetic layer. In the expression, Ku represents the magnetic anisotropy energy, V represents the volume of activation, k represents the Boltzmann's constant, and T represents the temperature. As the value is increased, the magnetic layer is thermally stable. Therefore, in order to enhance the thermal stability of the magnetic layer, it is necessary to increase the volume of activation V and the magnetic anisotropy energy Ku. This fact also holds in the same manner as described above for the magnetic film for perpendicular magnetic recording based on the Co—Cr system.

In the case of the crystalline material based on the Co system, when the magnetic grains are made fine and minute, it is anticipated that the magnetization possessed by the magnetic-crystal grains may be changed, because of transfer into the mesoscopic region. As a result, it is further difficult to secure the heat resistance of the magnetic film.

In order to satisfy the requirement as described above, it has been investigated that an amorphous alloy as a ferrimagnetic substance, which is composed of rare earth element and iron family element, is used for a magnetic film for recording information. For example, it has been reported in 23rd Annual Meeting of Magnetic Society of Japan (8aB11, 1999) that a rare earth-iron family alloy as an amorphous material is hopeful as a magnetic material which is excellent in thermal stability and which is preferred for high density recording. In "InterMag 2000 HA-04", a medium, in which an amorphous alloy based on the rare earth-iron family is used for a recording film, is disclosed as a magnetic recording medium which is resistant to the thermal fluctuation. Although such an amorphous alloy is excellent in thermal stability, the magnetic wall is liable to move. Therefore, when a magnetic field is applied during the recording of information to record the information, it has been difficult to stably form the minute magnetic domain in a magnetic layer. For this reason, it has been necessary that the magnetic wall position (corresponding to the information bit position) is determined highly accurately so that the position of the magnetic domain may be correctly established during the recording of information. This inconvenience results from the fact that the rare earth-transition metal alloy is a magnetic material of the magnetic wall movement type.

The present invention has been made taking the foregoing situations into consideration. A first object of the present invention is to provide a magnetic recording medium which has a large volume of activation of a magnetic film, which has high thermal stability, and which is excellent in reproduction performance, and a magnetic recording apparatus provided with the same.

A second object of the present invention is to provide a low noise magnetic recording medium in which the shape of the magnetic domain hardly takes a form of zigzag pattern in a magnetization transition area and the zigzag pattern is not reflected, and a magnetic recording apparatus provided with the same.

A third object of the present invention is to provide a magnetic recording medium which has large magnetic anisotropy, which is excellent in stability of recorded information, and which makes it possible to reliably form the minute magnetic domain, and a magnetic recording apparatus provided with the same.

A fourth object of the present invention is to provide a magnetic recording medium which has a simplified stacked (laminated) structure and which is suitable for mass production, and a magnetic recording apparatus provided with the same.

A fifth object of the present invention is to provide a magnetic recording medium which makes it possible to highly accurately determine the position of the magnetic wall (i.e., the position of the magnetic domain) formed in an amorphous magnetic film during recording of information, and a magnetic recording apparatus provided with the same.

A sixth object of the present invention is to provide a magnetic recording medium which is preferred for the super high density recording exceeding 40 Gbits/inch$^2$ (6.20 Gbits/cm$^2$), and a magnetic recording apparatus provided with the same.

DISCLOSURE OF THE INVENTION

According to a first aspect of the present invention, there is provided a magnetic recording medium for reproducing information thereon by using a magnetic head, the magnetic recording medium comprising:

a substrate;

an amorphous magnetic film in which information is recorded; and a ferromagnetic film.

The magnetic recording medium according to the first aspect of the present invention is provided with the amorphous magnetic film which is composed of an amorphous magnetic material. Information is recorded in the amorphous magnetic film. The amorphous magnetic film may be constructed, for example, with a ferrimagnetic material which has an easy axis of magnetization in a direction perpendicular to a substrate surface. Such an amorphous magnetic film is resistant to the thermal fluctuation owing to the amorphous structure in which no crystal grain boundary exists. Further, such an amorphous magnetic film has large anisotropy, because it is composed of the ferrimagnetic material. Therefore, fine and minute magnetic domains can be formed in the magnetic recording medium of the present invention which is provided with the amorphous magnetic film as a recording layer for recording information therein. Accordingly, information can be recorded at a high density, and the magnetic recording medium of the present invention is excellent in thermal stability as well. The information, which is recorded in the amorphous magnetic film, can be reproduced by using a magnetic head.

In the magnetic recording medium according to the first aspect of the present invention, the ferromagnetic film may be formed on a side close to the magnetic head in contact with the amorphous magnetic film. For example, when information is recorded and reproduced with the magnetic head arranged on a side opposite to the substrate, a structure may be adopted, in which the amorphous magnetic film and the ferromagnetic film are formed in this order on the substrate. In this arrangement, it is preferable that the ferromagnetic film has an easy axis of magnetization in a direction perpendicular to a substrate surface, and the ferromagnetic film has saturation magnetization which is larger than saturation magnetization of the amorphous magnetic film. When the ferromagnetic film is provided in contact with the amorphous magnetic film, the amorphous magnetic film and the ferromagnetic film are magnetically coupled to one another. When information is reproduced, the magnetization of the amorphous magnetic film is magnetically transferred to the ferromagnetic film. Therefore, when the magnitude of the magnetic flux from the ferromagnetic film or the amount of change of the magnetic flux is detected by using the reproducing magnetic head during reproduction of information, the information, which is recorded in the amorphous magnetic film, can be reproduced at a large reproduced signal intensity. As described above, the ferromagnetic film functions as a reproducing layer which makes it possible to substantially amplify the magnetic flux generated from the amorphous magnetic film.

It is preferable for such a ferromagnetic film to use a magnetic thin film principally containing oxide of Co or alloy principally containing Co. At least one element selected from of Cr, Pt, Pd, Ta, Nb, Si, and Ti may be contained in the above. The ferromagnetic film, which is composed the material as described above, also makes it possible to prevent the amorphous magnetic film from rust and corrosion.

The ferromagnetic film can be also constructed with a material which has small perpendicular magnetic anisotropy in a state of single layer and which does not form any perpendicularly magnetizable film. In this case, the perpendicular magnetic anisotropy may be induced by magnetically coupling the ferromagnetic film and the information-recording film.

In the magnetic recording medium according to the first aspect of the present invention, it is preferable that the material for constructing the amorphous magnetic film is a rare earth-transition metal (iron family element) material. As for the rare earth-transition metal material, the rare earth element is preferably at least one of Tb, Gd, Dy, and Ho, and the transition metal is preferably at least one of Fe, Co, and Ni.

In the present invention, the term "amorphous" means the structure in which atoms are irregularly arranged, and the term means, for example, the structure in which no diffraction peak based on the crystal structure is observed when the X-ray diffraction analysis is performed.

The term "amorphous magnetic film" means the magnetic film which is composed of the "amorphous" magnetic material, and the term resides in the concept which includes the alternately stacked film constructed by alternately stacking amorphous magnetic layers, and the artificial lattice film composed of the amorphous magnetic material. For example, the artificial lattice film composed of the amorphous magnetic material may have such a structure that one or more amorphous thin films composed of iron family element and one or more amorphous thin films composed of rare earth element are alternately stacked to provide a periodic feature similar to that of crystals in the direction of film thickness. The artificial lattice film may include not only the multilayered film (alternately stacked multilayered film) having the structure in which layers composed of different substances are alternately stacked in the film thickness direction, but also the artificial lattice film having the structure in which areas of different substances periodically appear in a specified pattern in the film surface direction. When the amorphous magnetic film is constructed by using the artificial lattice film as described above, the obtained film is more resistant to the thermal fluctuation as compared with a case in which an amorphous magnetic film is constructed in a single layer state by using the same magnetic material as that of the artificial lattice film. Further, when the amorphous magnetic film is constructed by using the artificial lattice film, the anisotropy is successfully increased as compared with a case in which an amorphous magnetic film is constructed with an alloy thin film of a ferrimagnetic material. Therefore, such an amorphous magnetic film is excellent in thermal stability, which is extremely preferred to perform the high density recording.

When the amorphous magnetic film is constructed with the artificial lattice film composed of the iron family element and the rare earth element, then the iron family element is preferably at least one element selected from Fe, Co, and Ni, and the rare earth element is preferably at least one element selected from Tb, Gd, Dy, and Ho. A two-layered film, which is composed of at least two elements selected from Fe, Co, and Ni, may be used for the thin film composed of the iron family element. Alternatively, the thin film, which is composed of the iron family element, may be formed with an alloy thin film composed of at least two elements selected from Fe, Co, and Ni in the artificial lattice film. Further, the artificial lattice film is preferably constructed so that the directions of the sub-lattice magnetization of the thin film composed of the iron family element and the sub-lattice magnetization of the thin film composed of the rare earth element are antiparallel. It is most preferable that the sub-lattice magnetization of the iron family element is more dominant than the sub-lattice magnetization of the rare earth element so as to increase the saturation magnetization which contributes to the magnitude of the reproduced signal output.

In the magnetic recording medium according to the first aspect of the present invention, the ferromagnetic film also has an effect (pinning effect) to suppress the movement of the magnetic wall of the recording magnetic domain formed in the amorphous magnetic film.

The magnetic recording medium according to the first aspect of the present invention may further comprise a magnetic wall movement control layer (pinning layer) which suppresses the movement of the magnetic wall of the recording magnetic domain formed in the amorphous magnetic film. That is, the magnetic recording medium may comprise an amorphous magnetic film for recording information, a ferromagnetic film for substantially increasing a magnetic flux generated from the amorphous magnetic film, and a magnetic wall movement control layer for controlling movement of a magnetic wall of a recording magnetic domain formed in the amorphous magnetic film. When a magnetic material of the magnetic wall movement type is used for the amorphous magnetic film, the position of the magnetic wall formed by recording information is hardly settled. In order to avoid such an inconvenience, it is preferable that a material of the magnetization rotation type is used for the magnetic wall movement control layer. As described above, it is especially preferable that the material of the magnetic wall movement type is used for the amorphous magnetic film, and the material of the magnetization rotation type is used for the magnetic wall movement control layer.

In the present invention, the magnetic wall movement control layer can be provided at an arbitrary position in the magnetic recording medium. However, it is preferable that the magnetic wall movement control layer is formed so that the amorphous magnetic film is positioned between the magnetic wall movement control layer and the ferromagnetic film. It is desirable that the layers are stacked so that the ferromagnetic film is positioned on the side close to the magnetic head for reproducing information, and the magnetic wall movement control layer is positioned on the side far from the magnetic head. It is preferable that all of the easy axes of magnetization of the amorphous magnetic film, the ferromagnetic film, and the magnetic wall movement control layer are in the same direction in a state in which the respective layers constitute the magnetic recording medium.

In the present invention, it is preferable that the amorphous magnetic film, the ferromagnetic film, and the magnetic wall movement control layer are constructed so that the coercivity of the amorphous magnetic film is largest when the coercivities possessed by the respective layers are compared with each other.

It is preferable that the ferromagnetic film has the largest saturation magnetization when the saturation magnetizations possessed by the respective layers of the amorphous magnetic film, the ferromagnetic film, and the magnetic wall movement control layer are compared with each other. Accordingly, the information, which is recorded in the amorphous magnetic film, can be reproduced with larger reproduced signal intensity.

It is preferable that the magnetic wall movement control layer is composed of a magnetic material of the magnetization rotation type. For example, it is preferable that the magnetic wall movement control layer is composed of an alloy which principally contains Co, oxide of Co, or Co—Cr alloy and which further contains at least one element selected from Pt, Pd, Ta, Nb, and Ti. When the magnetic wall movement control layer is constructed by using the material as described above, it is possible to highly accurately establish the position of the magnetic wall of the recording magnetic domain formed in the amorphous magnetic film. Further, the size and the shape of the recording magnetic domain can be made to be a desired size and a desired shape. Accordingly, information can be recorded at a super high density in the amorphous magnetic film, and the recorded information can be reproduced at low noise.

In the magnetic recording medium according to the first aspect of the present invention, in view of the high density recording, as for the magnetic anisotropy possessed by the amorphous magnetic film, the perpendicular magnetic anisotropy energy in the direction perpendicular to the substrate surface is preferably not less than $3 \times 10^6$ erg/cm$^3$ (0.3 J/cm$^3$), and especially preferably not less than $6 \times 10^6$ erg/cm$^3$ (0.6 J/cm$^3$).

It is preferable that the material for constructing the amorphous magnetic film has such magnetic characteristics that the saturation magnetization is not less than 100 emu/cm$^3$, and the coercivity is not less than 3 kOe (about 238.74 kA/m). Further, it is preferable that the film thickness is not more than 100 nm. The values of the saturation magnetization and the coercivity of the amorphous magnetic film can be controlled by changing the composition of the material for constructing the same. Accordingly, it is possible to provide the magnetic recording medium having magnetic characteristics in conformity with the characteristics of the magnetic head of the magnetic recording apparatus.

In the present invention, in order to enhance the thermal stability of the amorphous magnetic film, it is preferable to select the material for constructing the amorphous magnetic film so that the volume of activation V in the amorphous magnetic film is substantially equal to the volume of one magnetic domain formed in the amorphous magnetic film, concerning the relationship represented by KuV/kT (Ku: magnetic anisotropy constant, V: volume of activation, k: Boltzmann's constant, T: temperature). As for such a material, for example, Tb—Fe—Co, Tb—Dy—Fe—Co, Tb—Gd—Fe—Co, Gd—Dy—Fe—Co, Gd—Ho—Fe—Co, Dy—Ho—Fe—Co, Ho—Fe—Co, and Dy—Fe—Co are preferred. When the amorphous magnetic film is constructed as the artificial lattice film, it is preferable to use an alternately stacked film of rare earth element, Fe, and Co, an alternately stacked film of rare earth element and FeCo alloy, especially a Tb/Fe/Co film.

In the present invention, the ferromagnetic film can be constructed with a magnetic thin film principally containing oxide of Co or alloy principally containing Co, in which at least one element of Cr, Pt, Pd, Ta, Nb, Si, and Ti may be contained. Alternatively, the ferromagnetic film may be constructed with an alternately stacked multilayered film obtained by alternately stacking at least one element of Co, Ni, and Fe and at least one element of Pt, Pd, and Rh. Further alternatively, the ferromagnetic film may be constructed with an alternately stacked multilayered film obtained by alternately stacking one or more alloy layers composed of at least one element of Co, Ni, and Fe and at least one element of Pt, Pd, and Rh, and one or more layers composed of at least one element of Pt, Pd, and Rh.

According to a second aspect of the present invention, there is provided a magnetic recording medium comprising:

a substrate and a magnetic film in which information is recorded, wherein:

the magnetic film is an amorphous film which contains at least one element of oxygen and nitrogen.

The magnetic recording medium of the present invention contains at least one of oxygen and nitrogen not at an impurity level but in a significant amount in the magnetic film having the amorphous structure for recording information. The significant amount of oxygen or nitrogen, which is contained in the magnetic film, exists in a dispersed manner in the magnetic film as a simple substance or as a compound (oxide or nitride) with the material for constructing the magnetic film. The magnetic property of the simple substance or the compound of oxygen or nitrogen in the magnetic film is weakened, or the magnetic property disappears. Therefore, it is possible to effectively avoid the movement of the magnetic wall formed in the magnetic film.

Conventionally, when the magnetic domain is formed in the magnetic film of the magnetic wall movement type such as the amorphous film, the magnetic wall, which is formed by the adjoining magnetic domains, is easily moved in the in-plane direction as schematically shown in FIG. 10(B).

Therefore, the edge position of the recorded magnetic domain has been fluctuated. For this reason, it has been difficult to highly accurately determine the shape and the position of the magnetic domain formed in the magnetic film. In the present invention, as shown in FIG. 10(A), the compound or the simple substance of oxygen or nitrogen is dispersed as foreign matters in the magnetic film, and the area, in which the compound or simple substance exists, forms the pinning site respectively. When the magnetic domains are formed in such a magnetic film, the pinning sites in the magnetic film obstruct the movement of the magnetic wall. Therefore, the magnetic domain, which is recorded in the magnetic film, is correctly formed at a desired position with a desired shape without causing any fluctuation.

In the present invention, for example, according to the result of analysis by ESCA (Electron Spectroscopy for Chemical Analysis) or AES (Auger Electron Spectroscopy), the content of at least one of oxygen and nitrogen in the magnetic film is at least not less than 1 at %, and preferably 1 at % to 20 at %, in order to allow oxygen or nitrogen to effectively function as the pinning site in the magnetic film.

In the present invention, for example, the magnetic film may comprise one or more layers each of which contains a significant amount of oxygen or nitrogen, and one or more layers each of which substantially contains neither oxygen nor nitrogen. The magnetic film may have a structure in which the layers are periodically stacked. In the layer containing oxygen or nitrogen, it is especially preferable that areas containing oxygen or nitrogen are dispersed in an island form in the plane when the layer is observed in a plan view. However, such areas may be formed over the entire surface. It is preferable that the layer, which substantially contains neither oxygen nor nitrogen, has a film thickness of not less than 3 nm and not more than 10 nm. It is preferable that the layer, which contains oxygen or nitrogen, has a film thickness of not less than 0.05 nm and not more than 0.5 nm.

In the magnetic recording medium according to the second aspect of the present invention, a ferrimagnetic material, which is composed of, for example, a rare earth element and an iron family element, can be used for the amorphous magnetic film. When the magnetic film is constructed as a perpendicularly magnetizable film, for example, the rare earth element is preferably at least one element selected from Gd, Tb, Dy, and Ho, and the iron family element is preferably at least one element selected from Fe, Co, and Ni. When the magnetic film is constructed as an in-plane magnetizable film, for example, the rare earth element is preferably at least one element selected from Er, La, Ce, Pr, Nd, Pm, Sm, Eu, Tm, Yb, Lu, and Y, and the iron family element is preferably at least one element selected from Fe, Co, and Ni. When the magnetic film is constructed as described above, it is preferable that oxygen or nitrogen, which is contained in the magnetic film, is coupled to the rare earth element.

In the magnetic recording medium according to the second aspect of the present invention, the magnetic film may be constructed with the artificial lattice film described above. The artificial lattice film may have a structure in which one or more thin films each composed of a rare earth element and one or more thin films each composed of an iron family element are alternately stacked. For example, the rare earth element is preferably at least one element selected from Gd, Tb, Dy, and Ho, and the iron family element is preferably at least one element selected from Fe, Co, and Ni. When the magnetic film is constructed as described above, it is preferable that oxygen or nitrogen is contained in the thin film composed of the iron family element, and most preferably in a layer of Co of the iron family element, for the following reason. That is, Co has the strongest magnetic interaction among the iron family elements. When oxygen or nitrogen is added to Co, it is possible to exhibit non-magnetic properties. As a result, innumerable non-magnetic areas are studded in the magnetic film, and it is possible to decrease the exchange coupling force. Accordingly, it is possible to form extremely minute magnetic domains in the magnetic film, and thus it is possible to realize the high density recording.

The artificial lattice film may be also an artificial lattice film (alternately stacked multilayered film) in which one or more thin films each composed of a platinum group element and one or more thin films each composed of an iron family element are alternately stacked. The platinum group element is preferably at least one element selected from Pt, Pd, and Rh, and the iron family element is preferably at least one element selected from Fe, Co, and Ni. Also in this case, it is preferable to contain oxygen or nitrogen in the layer composed of the iron family element of the layers for constructing the artificial lattice film. Especially, it is most preferable to contain oxygen or nitrogen in the layer composed of Co.

In the second aspect of the present invention, it is preferable that the magnetic film has such perpendicular magnetic anisotropy that an easy axis of magnetization is directed in a direction perpendicular to a substrate surface.

According to a third aspect of the present invention, there is provided a method for producing a magnetic recording medium, comprising:

providing a substrate; and forming an amorphous magnetic film on the substrate by means of sputtering, wherein:

the sputtering is performed in an atmosphere in which at least one of oxygen and nitrogen is contained in an inert gas.

According to the production method of the third aspect of the present invention, at least one of oxygen and nitrogen can be contained in a significant amount in the magnetic film. Therefore, the production method is extremely preferred as a method for producing the magnetic recording medium according to the second aspect of the present invention.

In the production method according to the third aspect of the present invention, it is preferable that at least one of oxygen and nitrogen is contained at a concentration of 0.1% by volume to 20% by volume in the sputtering gas atmosphere when the sputtering is performed.

In the production method of the present invention, oxygen or nitrogen can be consequently contained in the sputtering gas atmosphere as well by intentionally lowering the degree of vacuum in a sputtering film formation chamber as compared with the normal operation.

In the production method according to the third aspect of the present invention, oxygen or nitrogen is contained when the sputtering is performed. For this reason, when any material, which tends to react with oxygen or nitrogen, is present in the material for constructing the target, it is feared that a magnetic film having a desired composition cannot be formed. Therefore, it is desirable that the target material is constructed after previously adjusting the composition ratio of the material which reacts with oxygen or nitrogen.

According to a fourth aspect of the present invention, there is provided a method for producing a magnetic recording medium, comprising:

providing a substrate; and forming an amorphous magnetic film on the substrate by means of sputtering, wherein:

the sputtering comprises such operation that the sputtering is temporality interrupted and then the sputtering is resumed.

In the production method according to the fourth aspect of the present invention, the sputtering operation is temporarily stopped when the magnetic film is formed as a film. Accordingly, the surface of the formed magnetic film is naturally oxidized or naturally nitrided with oxygen or nitrogen which is contained as an impurity in the inert gas atmosphere. Further, a structure is obtained, in which one or more layers each containing oxygen or nitrogen in a significant amount and one or more layers each substantially containing neither oxygen nor nitrogen are alternately stacked, by repeatedly performing in a plurality of times the operation to perform the sputtering and the operation to temporarily stop the sputtering. Therefore, the production method according to the fourth aspect of the present invention is extremely preferred as a method for producing the magnetic recording medium according to the second aspect of the present invention.

According to a fifth aspect of the present invention, there is provided a magnetic recording medium comprising:

an information-recording film which is provided on a substrate and which has such a structure that one or more magnetic films and one or more non-magnetic films are alternately stacked, wherein:

the non-magnetic film has a film thickness of not more than 1 nm.

The magnetic recording medium according to the fifth aspect of the present invention comprises the information-recording film having the structure in which the magnetic film and the non-magnetic film having the film thickness of not more than 1 nm are alternately stacked. The state, in which "the film thickness of the non-magnetic film is not more than 1 nm", includes not only a state in which the non-magnetic film is formed as a continuous film but also a state in which a plurality of areas each composed of a nonmagnetic material are dispersed in a form of islands and a state in which a plurality of openings are dispersed in a continuous film. Usually, when the non-magnetic film is formed in a thickness of not more than 1 nm, the cross section of the non-magnetic film is observed to be substantially layered. However, when the planar structure is observed, it is appreciated that areas composed of the non-magnetic material are dispersed in a form of islands on the plane. The island-shaped non-magnetic areas magnetically cut the magnetic film in the information-recording film into pieces, and thus they function as pinning sites. That is, as shown in a schematic sectional view in FIG. 16, the magnetic films, which are positioned over and under the portion B in which the island-shaped non-magnetic area exists, are magnetostatically coupled by the aid of the non-magnetic area in the portion B. Therefore, the magnetic coupling of the magnetic films is weakened at the portion at which the non-magnetic area exists. On the other hand, the magnetic films are subjected to the exchange coupling at the portion A at which the non-magnetic area is absent. In this way, innumerable portions having strong magnetic coupling force and innumerable portions having weak magnetic coupling force are studded in the information-recording film. Owing to the difference in magnetic coupling force as described above, the magnetic wall, which is formed in the information-recording film, is prevented from moving in the film. Therefore, it is possible to highly accurately fix the position of the recording magnetic domain in the information-recording film. Thus, it is possible to reliably form the minute magnetic domain.

The non-magnetic film, which constitutes the information-recording film, functions as the pinning site even in the case of one layer. However, in order to enhance the pinning effect, it is preferable that the nonmagnetic film is provided in multiple layers. It is preferable that the island-shaped area (non-magnetic area) of the non-magnetic material has a size of about several nm to 5 nm. Considering, for example, the film thickness of each of the films which constitute the magnetic recording medium and the stability of the magnetic head which floats over the magnetic recording medium, it is most preferable that the area is granular and composed of grains of about 2 to 3 nm.

In the present invention, it is preferable that the film thickness of the non-magnetic film of the information-recording film is not less than 5% and not more than 20% of the film thickness of the magnetic film. When the film thickness of the non-magnetic film is within the range as described above, it is possible to sufficiently exhibit the pinning effect for the magnetic wall. It is most preferable that the film thickness of the non-magnetic film is 0.2 nm to 0.5 nm.

In the present invention, it is preferable that the magnetic film for constructing the information-recording film is an amorphous film. For example, a ferrimagnetic material, which is composed of a rare earth element and an iron family element, can be used for the amorphous film. When the magnetic film is constructed as a perpendicularly magnetizable film, for example, the rare earth element is preferably at least one element selected from Gd, Tb, Dy, and Ho, and the iron family element is preferably at least one element selected from Fe, Co, and Ni. When the magnetic film is constructed as an in-plane magnetizable film, for example, the rare earth element is preferably at least one element selected from Er, La, Ce, Pr, Nd, Pm, Sm, Eu, Tm, Yb, Lu, and Y, and the iron family element is at least one element selected from Fe, Co, and Ni.

In the magnetic recording medium according to the fifth aspect of the present invention, the magnetic film, which constitutes the information-recording film, may be formed with the artificial lattice film as described above. The artificial lattice film may have, for example, such a structure that one or more layers each composed of a rare earth element and one or more layers each composed of an iron family element are alternately stacked. For example, the rare earth element is preferably at least one element selected from Gd, Tb, Dy, and Ho, and the iron family element is preferably at least one element selected from Fe, Co, and Ni.

The magnetic film, which constitutes the information-recording film, may be also an artificial lattice film (alternately stacked multilayered film) constructed by alternately stacking one or more layers each composed of a platinum group element and one or more layers each composed of an iron family element. The platinum group element is preferably at least one element selected from Pt, Pd, and Rh, and the iron family element is preferably at least one element selected from Fe, Co, and Ni.

In the present invention, those preferably used for the material for constructing the non-magnetic film of the information-recording film include, for example, at least one element selected from Cr, Nb, Ti, Ta, Si, Al, Pd, Rh, Zr, Re, Mo, W, Ir, V, and Cu, aluminum nitride, silicon nitride, aluminum oxide, and zirconium oxide.

In the present invention, it is preferable that the magnetic film of the information-recording film has perpendicular magnetic anisotropy with an easy axis of magnetization in the direction perpendicular to the substrate surface. It is preferable that the magnetic film has a structure in which no diffraction peak based on the crystal structure is observed when the X-ray diffraction analysis is performed.

In the present invention, the information-recording film can be manufactured by alternately forming films of a magnetic material and a non-magnetic material by means of, for example, the dry process or the wet process. The film may be formed by means of the dry process or the wet process with a material in which a non-magnetic material is uniformly dispersed in a magnetic material. The information-recording film, which is manufactured by the method as described above, is a film in which the magnetic films and the non-magnetic films in a state in which a plurality of areas composed of the non-magnetic material are dispersed in an island form are stacked substantially alternately. The information-recording film can be also manufactured by alternately forming films, i.e., films comprising a non-magnetic material dispersed in an iron family element and films composed of a rare earth element (or a platinum group element).

In the magnetic recording media according to the first, second, and fifth aspects of the present invention, the substrate may be composed of, for example, glass, resin, or Al alloy. It is preferable that the substrate has an uneven or concave/convex texture on the surface. The texture on the substrate surface serves as the obstacle for the movement of the magnetic wall between magnetic domains when information is recorded or erased. Therefore, the movement of the magnetic wall, which would be otherwise caused by the recording or the erasing of the recording magnetic domain, is suppressed. Thus, it is possible to decrease the noise during the recording and reproduction. Further, the position on the medium of the magnetic domain formed in the amorphous magnetic film, the magnetic film, or the information-recording film can be controlled to be a desired position. Therefore, the arrangement as described above is suitable for the high density recording. Further, by using the substrate having the texture as described above, it is also possible to control the direction of the magnetic anisotropy of the information-recording film formed on the substrate. The texture may be constructed by processing the substrate surface, or the texture may be constructed by forming a thin film having concave/convex unevenness on the substrate.

In the magnetic recording media according to the first, second, and fifth aspects of the present invention, it is preferable that the film for recording information therein (including the amorphous magnetic film, the magnetic film, and the information-recording film, hereinafter appropriately referred to as "information-recording film") exhibits such magnetic characteristics that substantially no peak is obtained (i.e., the value of δM is substantially zero), or a magnetic field intensity obtained when a peak is obtained (magnetic film intensity at which δM is maximum) is not more than 30% of a coercivity of the information-recording film, when δM(H) represented by the following expression (1) is plotted with respect to the measured magnetic field H to obtain a δM curve:

$$\delta M(H) = Id(H) = [1 - 2Ir(H)] \ldots (1)$$

In the expression, Id(h) represents the DC demagnetization remanent magnetization curve (DC demagnetization remanence curve) and Ir(H) represents the isothermal remanent magnetization curve. The DC demagnetization remanent magnetization curve Id(H) is a curve obtained such that the magnetic field (H) in the direction opposite to the direction of magnetization is gradually increased and applied to a sample having been subjected to saturation magnetization in a certain direction beforehand, and thus the remanent magnetization with respect to the magnitude of the applied magnetic field is normalized and plotted. The isothermal remanent magnetization curve Ir(H) is a curve obtained such that the magnetic field (H) is gradually increased and applied to a sample having been subjected to demagnetization beforehand, and thus the remanent magnetization with respect to the magnitude of the applied magnetic field is normalized and plotted.

It is known that the δM plot, which is obtained on the basis of the DC demagnetization remanent magnetization curve and the isothermal remanent magnetization curve, is used for a method for expressing the magnetic coupling force between crystal grains of conventional Co-based crystalline materials and granular materials. As for the δM plot, for example, reference may be made to "K. O'Grady et al., IEEE TRANSACTIONS ON MAGNETICS, VOL. 29, NO. 1, JANUARY (1993)".

The present inventors have considered that atoms or molecules, which constitute the amorphous material, construct minute aggregates not only in the crystalline material but also in the amorphous material, and they behave as if they are crystal grains (clusters). The present inventors have expressed the intensity of the magnetic coupling force generated between the minute aggregates by using the δM plot described above. When no peak is present on the curve of the δM plot for the amorphous material, it is considered that no magnetic coupling force is exerted between the minute aggregates. It is considered that the magnetic coupling force between the minute aggregates is small, when the magnetic intensity, which is obtained when the peak is obtained, is small. When the magnetic material, which has the magnetic characteristics specified by using the δM plot as described above, is used for the information-recording film, then it is possible to form the minute magnetic domains when information is recorded, and it is possible to rewrite or erase information with ease. That is, the magnetic recording medium, which is suitable to perform the high density recording, can be provided, for example, by raising the gas pressure when the information-recording film is formed, or by dispersing non-magnetic component, inorganic compound, oxide, and/or nitride in the information-recording film so that the information-recording film of the magnetic recording medium satisfies the conditions described above.

According to a sixth aspect of the present invention, there is provided a magnetic recording apparatus comprising:

the magnetic recording medium according to any one of the first, second, and fifth aspects of the present invention;

a magnetic head which records or reproduces information; and a drive unit which drives the magnetic recording medium.

The magnetic recording apparatus according to the present invention is installed with the magnetic recording medium according to any one of the first, second, and fifth aspects of the present invention. Therefore, it is possible to record information including, for example, images, voices, and code data correctly at a super high density. Therefore, it is possible to provide the magnetic recording apparatus having a large storage capacity.

The magnetic head of the magnetic recording apparatus of the present invention can carry a reproducing element which has such a characteristic (magneto-resistance effect) that the resistance is changed corresponding to the change of the magnetic flux generated from the magnetic recording medium, including, for example, the MR element (Magneto Resistive element, magneto-resistance effect element), the GMR element (Giant Magneto Resistive element, giant magneto-resistance effect element), and the TMR element (Tunneling Magneto Resistive element, magneto-tunneling type magneto-resistance effect element). When such a reproducing element is used, the information, which is recorded on the magnetic recording medium, can be reproduced at high S/N.

It is preferable that the magnetic recording apparatus of the present invention further comprises an optical head which radiates a light beam for heating the magnetic recording medium at least when information is recorded. It is preferable to use light pulses modulated in a form of pulse as the light beam to be generated from the optical head. Especially, it is most preferable to use a form of multipulse as an aggregate of pulses each having a definite width.

In the magnetic recording apparatus as described above, information can be recorded by applying a magnetic field from the magnetic head to a light-irradiated area simultaneously with irradiation of the magnetic recording medium with the pulse-shaped light beam when the information is recorded. In this procedure, the magnetic field, which is applied to the magnetic recording medium, may be a pulsed magnetic field which is synchronized with the pulsed light beam. As described above, when the magnetic field is applied with the magnetic head having a narrow magnetic gap to perform recording at a high frequency simultaneously with the irradiation of the magnetic recording medium with the pulsed light beam when information is recorded, it is possible to form minute recording magnetic domains. For example, the recording frequency of the magnetic head can be not less than 30 MHz, and more preferably not less than 50 MHz. Accordingly, information can be recorded at a high density. When the laser beam is radiated from the optical head onto the magnetic recording medium, then the light energy is converted into the thermal energy in the information-recording film (amorphous magnetic film or magnetic film) of the magnetic recording medium, and the coercivity of the light-irradiated area of the information-recording film is lowered. It is necessary to perform recording at a high velocity by applying the magnetic field at a high recording frequency from the magnetic head to the information-recording film in which the coercivity is lowered. As described above, in the magnetic recording apparatus of the present invention, the coercivity of the information-recording film can be lowered by means of the heating with light during the recording of information. Therefore, information can be reliably recorded even in the case of the use of the magnetic recording medium provided with the information-recording film having the high coercivity. That is, information can be recorded on the magnetic recording medium provided with the information-recording film having the coercivity higher than 5 kOe (about 397.9 kA/m), because the ordinary magnetic head can generate the magnetic field of about 5 kOe (about 397.9 kA/m). Therefore, the magnetic recording apparatus is preferably used for the high density recording.

In the magnetic recording apparatus as described above, information can be recorded or erased by forming the magnetic domain having a definite width and a definite length by using the recording magnetic head. The recording magnetic domain can be formed so that the width of the recording magnetic domain in the track direction formed in the information-recording film is narrower than the gap width of the recording magnetic head. That is, it is possible to form the extremely minute magnetic domain in the information-recording film by applying the magnetic field while lowering the coercivity of the information-recording film by radiating the light beam from the optical head. Conventionally, in order to miniaturize the magnetic domain formed in the magnetic recording medium in accordance with the magnetic recording system, it has been necessary that the gap length of the magnetic head is shortened and the track width is narrowed. However, it has been difficult to obtain such a minute magnetic domain due to the problem of machining for the magnetic head and the limit concerning the servo operation. On the other hand, in order to allow the minute magnetic domain to exist stably, it is necessary to raise the coercivity of the magnetic film. However, in the present circumstances, the magnetic head involves a certain limit for the magnetic intensity which can be generated, and it has been difficult to magnetize the magnetic film having high coercivity. Further, in the case of the reproducing system based on the use of the magneto-optical effect as in the magneto-optical recording system, the wavelength of light is greatly restricted, which is not necessarily suitable for the high density recording. Therefore, the method, in which information is recorded, reproduced, and erased by applying the magnetic field while heating the medium by radiating the light beam as in the magnetic recording apparatus described above, is an effective means to realize the high density recording.

Information in a variety of forms can be recorded, reproduced, and erased with the magnetic recording apparatus of the present invention. It is especially preferable that the information to be recorded, reproduced, or erased is at least one type of information selected from, for example, voice information, code data, image information, and control information for controlling the magnetic recording apparatus.

The magnetic recording apparatus of the present invention makes it possible to realize the high density recording in which the areal recording density of the magnetic recording medium exceeds 40 Gbits/inch$^2$ (6.20 Gbits/cm$^2$).

BRIEF DESCRIPTION OF THE DRAWINGS

FIG. 4 schematically shows situations of states of magnetization of recorded portions by means of observation with MFM, wherein FIG. 4(A) shows a situation of the state of magnetization of the recorded portion of the magnetic recording medium of the present invention, and FIG. 4(B) shows a situation of the state of magnetization of the recorded portion of a conventional magnetic recording medium provided with a magnetic film based on the Co—Cr—Pt system as an information-recording film.

FIG. 5 shows a schematic arrangement of a magnetic recording apparatus provided with an optical head used in a fifth embodiment, wherein FIG. 5(A) shows a schematic arrangement on the upper surface of the magnetic recording apparatus, and FIG. 5(B) shows a partial magnified sectional view illustrating those disposed in the vicinity of a magnetic head of the magnetic recording apparatus shown in FIG. 5(A).

FIG. 10 illustrates the magnetic wall movement in magnetic films, wherein FIG. 10(A) shows a case of the present invention in which oxide or nitride is contained in the magnetic film, and FIG. 10(B) shows a conventional case.

BEST MODE FOR CARRYING OUT THE INVENTION

Specified embodiments of the magnetic recording medium of the present invention and the magnetic recording apparatus provided with the same will be explained in detail below with reference to the drawings.

First Embodiment

Figure 1:
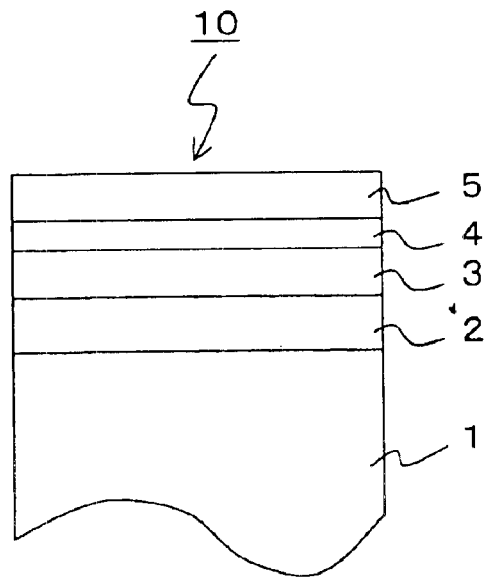
FIG. 1 schematically shows a cross-sectional structure of a magnetic recording medium according to the present invention.

In this embodiment, a magnetic recording medium having a cross-sectional structure as shown in a schematic sectional view in FIG. 1 was manufactured as a magnetic recording medium according to the first aspect of the present invention. The magnetic recording medium 10 has a structure in which an underlying base film 2, an information-recording film 3, a ferromagnetic film 4, and a protective film 5 are successively stacked on a substrate 1. In FIG. 1, the information-recording film 3 is composed of an artificial lattice film of Tb/Fe/Co, and the ferromagnetic film 4 is composed of a Co—Cr alloy film. A method for producing the magnetic recording medium 10 will be explained below.

Formation of Underlying Base Film

At first, a glass substrate having a diameter of 2.5 inches (about 6.35 cm) was prepared as the substrate 1. Subsequently, a silicon nitride film was formed as the underlying base film 2 to have a film thickness of 10 nm on the substrate 1. The underlying base film 2 is a layer which is provided in order to improve the protection of the information-recording film 3 and the adhesive performance with respect to the substrate 1. The magnetron sputtering method was used to form the underlying base film 2. $Si_3N_4$ was used for the target, and Ar was used for the electric discharge gas. The electric discharge gas pressure was 10 mTorr (about 1.33 Pa), and the introduced RF electric power was 1 kW/150 mm$\phi$.

Formation of Information-Recording Film

Subsequently, the information-recording film 3 was formed on the underlying base film 2. The information recording film 3 is an artificial lattice film obtained by periodically stacking thin films each having a three layered structure composed of a Tb layer, an Fe layer, and a Co layer. The film thickness of each of the layers of the thin film having the three-layered structure is Fe (1 nm)/Co (0.1 nm)/Tb (0.2 nm). The multi-source co-sputtering method based on three sources of Tb, Fe, and Co was used as a method for forming the information-recording film (artificial lattice film) 3 as described above. The film thickness of each of the layers of the thin film having the three-layered structure can be precisely controlled to have a desired value by combining the velocity of revolution of the substrate and the electric power introduced during the sputtering. In this case, the introduced DC electric power was 0.3 kW during the formation of the Tb film, it was 0.15 kW during the formation of the Co film, and it was 0.7 kW during the formation of the Fe film. The number of revolutions of the substrate was 30 rpm. High purity Ar gas was used for the electric discharge gas. The electric discharge gas pressure during the sputtering was 3 mTorr (about 399 mPa). The artificial lattice film (information-recording film), which had the structure comprising the periodically stacked three-layered thin films of Fe (1 nm)/Co (0.1 nm)/Tb (0.2 nm), was formed to have a film-thickness of about 40 nm under the sputtering condition as described above. The artificial lattice film is an amorphous magnetic film of the magnetic wall movement type.

When the artificial lattice film as described above is formed, the degree of vacuum at the initial evacuation is important. In this embodiment, the film was formed after effecting the evacuation up to $4\times10^{-9}$ Torr (about $532\times10^9$ Pa). The numerical values, which are adopted in this embodiment when the information-recording film 3 is formed, are not absolute, which change depending on, for example, the system of the sputtering. When the information-recording film 3 is constructed as the artificial lattice film as described above, then it is possible to increase the perpendicular magnetic anisotropy energy as compared with a case in which an amorphous alloy film of Tb—Fe—Co is used as an information-recording film, and it is possible to improve the thermal stability of the information-recording film. The magnetization of the information-recording film 3 is determined by the difference between the magnetization of the transition metal and the magnetization of the rare earth element. This embodiment was designed so that the magnetization of the transition metal was dominant as compared with the magnetization of the rare earth element.

Formation of Ferromagnetic Film

Subsequently, a $CO_{67}Cr_{33}$ film was formed as the ferromagnetic film 4 on the information-recording film 3. The ferromagnetic film 4 was formed to have a film thickness of 15 nm so that the magnetic exchange interaction was generated with respect to the information-recording film 3. The film thickness is the maximum film thickness at which the exchange coupling force is exerted with respect to the information-recording film 3. When the ferromagnetic film 4 was formed, the film was continuously formed without breaking the vacuum during the process after forming the Tb/Fe/Co artificial lattice film as the information-recording film 3 in order to generate the magnetic coupling.

It is noted that the Co—Cr film, which serves as the ferromagnetic film 4, does not exhibit satisfactory magnetization unless crystallization is effected. For this reason, the sputtering method, which utilized the resonance absorption represented by the ECR (Electron Cyclotron Resonance) sputtering method, was used. That is, the particles, which was excited by the resonance absorption, were allowed to collide with the target, and the generated sputtering particles were subjected to the sputtering while constantly uniformizing the energy possessed by the particles by applying a constant drawing voltage as a bias between the target and the substrate. As for the conditions for the sputtering, the pressure during the sputtering was 0.3 mTorr (about 39.9 mPa), and the introduced microwave electric power was 0.7 kW. In order to draw the plasma excited by the microwave, a DC bias voltage of 500 V was applied. Ar was used for the sputtering gas.

When the method as described above is used, the film can be formed at a low temperature without raising the substrate temperature. Therefore, it is possible to suppress the interlayer diffusion which would be otherwise caused with respect to the Tb/Fe/Co artificial lattice film. If such interlayer diffusion takes place, it is especially feared that the perpendicular magnetic anisotropy energy may be lowered and the coercivity may be lowered. Therefore, it is desirable that the substrate temperature is low during the film formation. Therefore, the ECR sputtering method as described above is an effective film formation technique as a method for forming the crystalline magnetic film such as the Co—Cr-based magnetic film at a low temperature. Further, when the Tb—Fe—Co amorphous alloy is used, a Co—Cr film can be also formed without crystallizing the thin film.

Formation of Protective Film

Finally, a C (carbon) film was formed to have a film thickness of 5 nm as the protective film 5 on the ferromagnetic film 4 obtained as described above. The ECR sputtering method based on the use of the microwave was used for the film formation. C (carbon) was used for the target material, and Ar was used for the electric discharge gas. The pressure during the sputtering was 0.3 mTorr (about 39.9 mPa), and the introduced microwave electric power was 0.5 kW. A DC bias voltage of 500 V was applied in order to draw the plasma excited by the microwave. The quality of the carbon film greatly depends on the sputtering conditions and the electrode structure as described above. Therefore, the foregoing conditions are not absolute. Thus, the magnetic recording medium having the stacked structure shown in FIG. 1 was obtained.

Measurement of Magnetic Characteristics

Subsequently, magnetic characteristics of the manufactured magnetic recording medium 10 were measured. An M-H loop was obtained by the measurement with VSM (Vibration Sample Magnetometer). According to the obtained results, both of the rectangularity ratios S, S* were 1.0, exhibiting good rectangularity. The coercivity Hc was 3.9 kOe (about 310.362 kA/m). The perpendicular magnetic anisotropy energy in the direction perpendicular to the substrate surface of the information-recording film was $4 \times 10^7$ erg/cm$^3$.

Measurement of Volume of Activation

Subsequently, the volume of activation of the magnetic recording medium 10 was measured. When the volume of activation is measured, the magnetic domains recorded in the information-recording film were observed with MFM or a polarization microscope to determine the volume of activation by measuring the size of the magnetic domain. As a result of the measurement of the volume of activation, the volume of activation of the information-recording film of the magnetic recording medium of this embodiment was extremely large, i.e., about five times the value of a Co—Cr—Pt-based magnetic film widely used as the magnetic recording medium. This fact indicates that the information-recording film of this embodiment has small thermal fluctuation and small thermal demagnetization, and it is excellent in thermal stability.

Measurement of Saturation Magnetization

Subsequently, the saturation magnetization was measured for the information-recording film 3 and the ferromagnetic film 4. The saturation magnetization of the ferromagnetic film 4 was 380 emu/cm$^3$ which was a value larger than that of the saturation magnetization of 230 emu/cm$^3$ of the information-recording film 3. It was revealed by the measurement with a vibration sample magnetometer (VSM) that the exchange coupling force between the information-recording film 3 and the ferromagnetic film 4 was strong, and the information-recording film 3 and the ferromagnetic film 4 magnetically behaved as a monolayer film. As described above, the reason why the material having the saturation magnetization larger than that of the information-recording film 3 is used for the ferromagnetic film 4 is that it is intended to increase, with the ferromagnetic film 4, the magnetic flux coming from the magnetic domain formed in the information-recording film 3. Accordingly, when the magnetic recording medium is subjected to reproduction by using the magnetic head, a large reproduction output is obtained.

Subsequently, the structures of the information-recording film 3 and the ferromagnetic film 4 were investigated by means of the X-ray diffraction method. As a result, only a diffraction peak based on Co—Cr of the ferromagnetic film 4 was obtained. The organizations and the structures of the information-recording film 3 and the ferromagnetic film 4 were investigated by means of a high resolution transmission electron microscope (high resolution TEM). As a result, a distinct lattice was found for only the Co—Cr film as the ferromagnetic film 4. According to this result, it was revealed that the other films were amorphous or aggregates of extremely fine organizations. Especially, it was revealed that the information-recording film 3 was the artificial lattice film having a desired film thickness composed of thin films of the three-layered structure of Fe (1 nm)/Co (0.1 nm)/Tb (0.2 nm). The film thicknesses of the respective layers of the thin film having the three-layered structure were well coincident with the measured values obtained with the X-ray.

Magnetic Recording Apparatus

Figure 2:
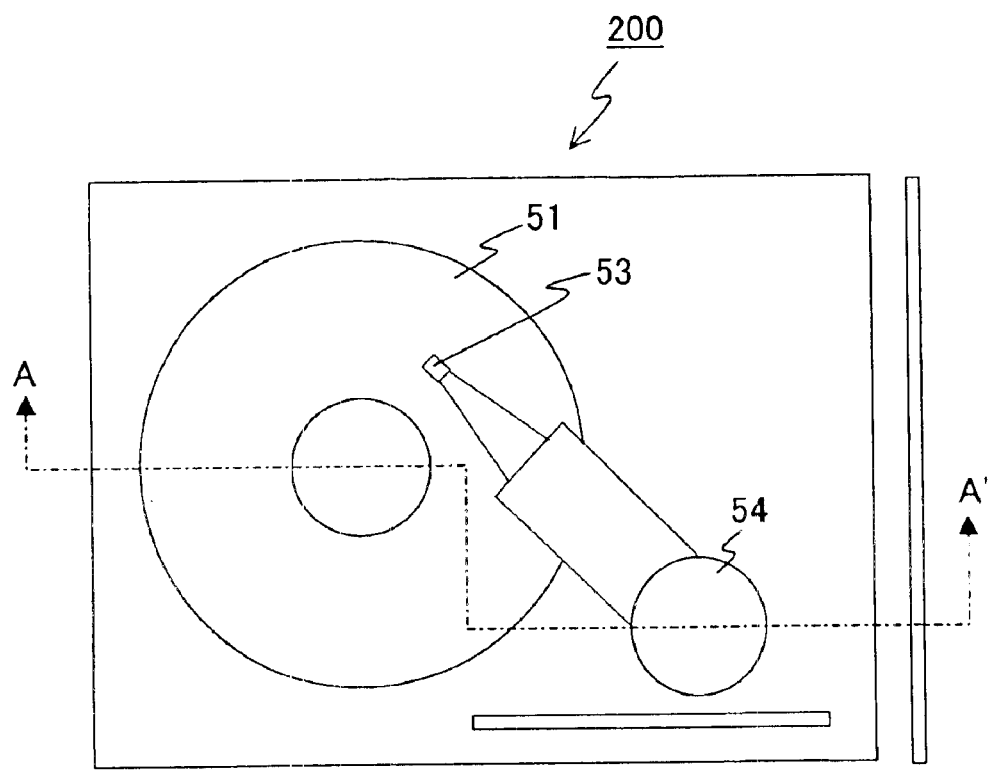
FIG. 2 schematically shows an arrangement on an upper surface of the magnetic recording apparatus as an example of the present invention.
Figure 3:
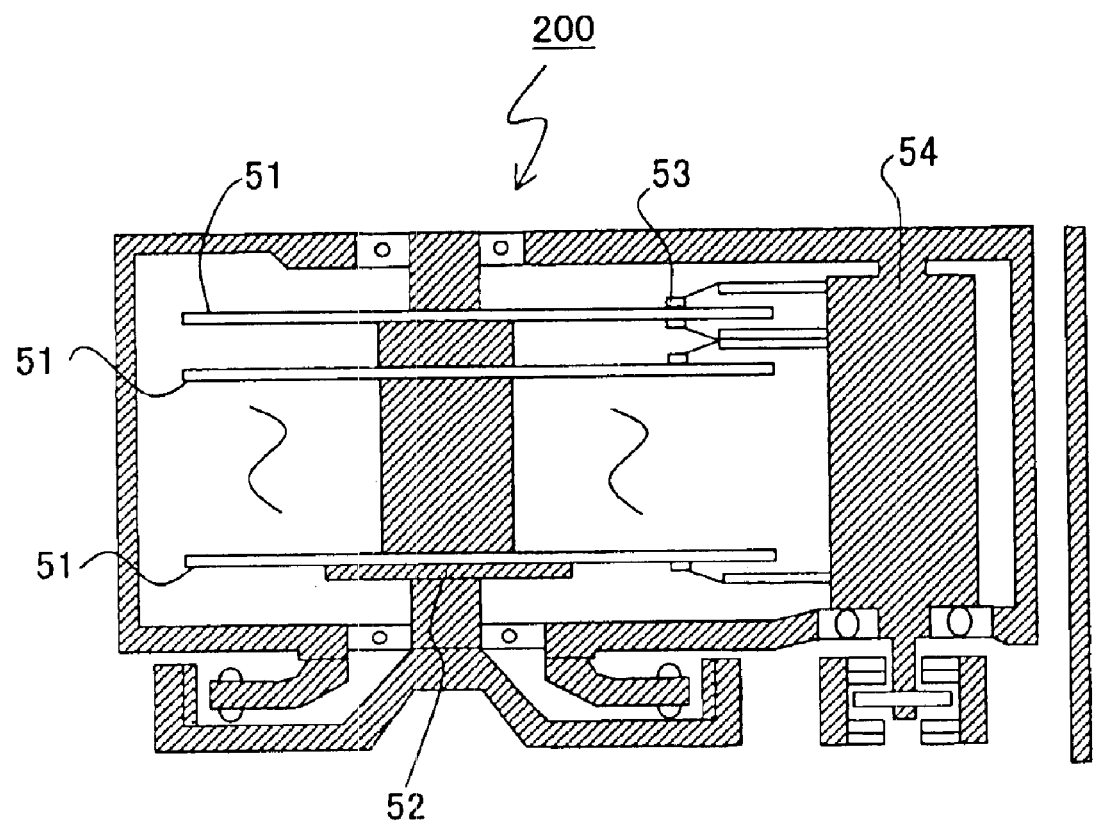
FIG. 3 shows a schematic sectional view illustrating the magnetic recording apparatus taken in the direction of A–A' shown in FIG. 2.

Subsequently, a lubricant was applied onto the protective film 5, and thus the magnetic disk was completed. A plurality of magnetic disks were manufactured in accordance with the same process, and they were coaxially incorporated into the magnetic recording apparatus. A schematic arrangement of the magnetic recording apparatus is shown in FIGS. 2 and 3. FIG. 2 shows a top view of the magnetic recording apparatus 200, and FIG. 3 shows a sectional view taken in the direction along a broken line A–A' shown in FIG. 2 of the magnetic recording apparatus 200. A thin film magnetic head, which was based on the use of a soft magnetic film having a high saturation magnetic flux density of 2.1 T, was used for the recording magnetic head. A recorded signal was reproduced with a GMR magnetic head of the dual spin bulb type having the giant magnetic resistance effect. The gap length of the magnetic head was 0.12 μm. The recording magnetic head and the reproducing magnetic head are integrated into one unit which is shown as the magnetic head 53 in FIGS. 2 and 3. The integrated type magnetic head is controlled by a magnetic head-driving system 54. The plurality of magnetic disks 10 are coaxially rotated by a spindle 52. The distance between the magnetic head surface and the amorphous magnetic film was maintained to be 12 nm. A signal (700 kFCI) corresponding to 40 Gbits/inch$^2$ (6.20 Gbits/cm$^2$) was recorded on the magnetic disk 10 to evaluate S/N of the disk. As a result, a reproduction output of 34 dB was obtained. The error rate or defect rate of the magnetic disk was measured. As a result, a value of not more than $1 \times 10^{-5}$ was obtained when no signal processing was performed.

MFM Observation for Magnetization State

Figure 4:
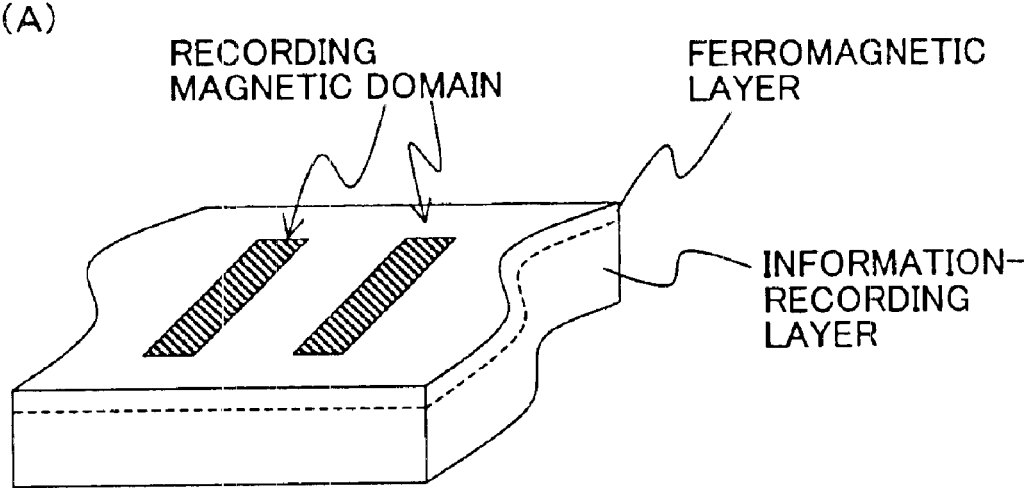
Figure 4:
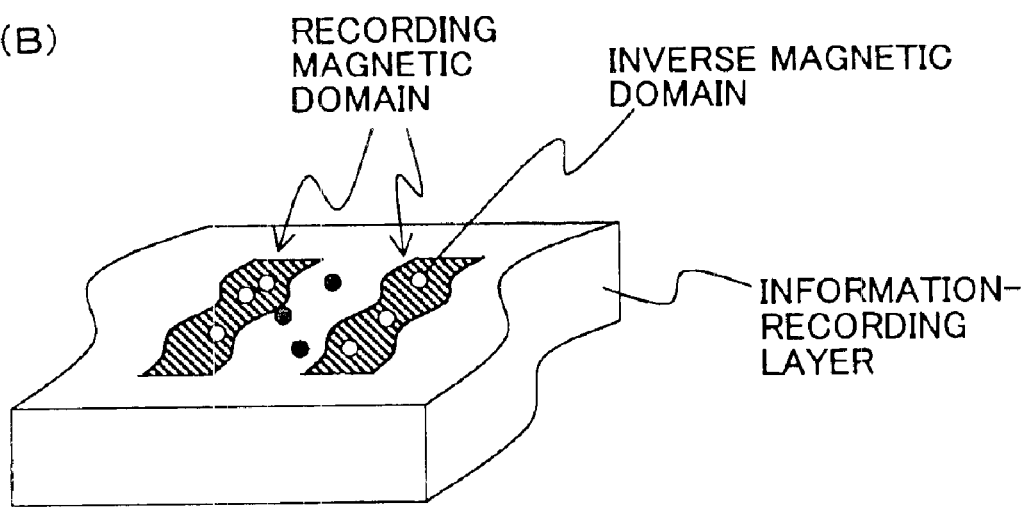

The magnetization state of the recorded portion (recording magnetic domain) was observed with a magnetic force microscope (MFM). As a result of the observation, the zigzag pattern peculiar to the magnetization transition area was not observed. FIG. 4(A) schematically shows a situation of the magnetization state of the recorded portion. It is considered that the noise level is extremely small as compared with a conventional magnetic recording medium provided with an information-recording film based on the Co—Cr—Pt system, because the zigzag pattern peculiar to the magnetization transition area scarcely exists in the magnetic recording medium of the embodiment of the present invention. Further, it is considered that the low noise level is also caused by the fact that the information-recording film is the aggregate of fine and minute grains. For the purpose of comparison, the recording was performed in the same manner as described above on the conventional magnetic recording medium provided with the information-recording film based on the Co—Cr—Pt system to observe the magnetization state of the recorded portion of the information-recording film. FIG. 4(B) schematically shows a situation of the magnetization state. As shown in FIG. 4(B), minute inverse magnetic domains, which had the magnetization in the direction opposite to the surroundings, were observed in the recording magnetic domains and between the mutually adjoining recording magnetic domains. On the other hand, in the case of the magnetic recording medium of this embodiment, as shown in FIG.

4(A), the minute inverse magnetic domain was scarcely observed in the recording magnetic domains and between the mutually adjoining recording magnetic domains. One of the causes of the low noise level is also the fact that the minute inverse magnetic domain scarcely exists in the recording magnetic domains and between the mutually adjoining recording magnetic domains.

This embodiment is illustrative of the case in which the Tb/Fe/Co system is used for the artificial lattice film for constructing the information-recording film. However, any one of the rare earth elements of Gd, Dy, and Ho may be used in place of Tb. The information-recording film may be constructed with two rare earth elements such as Gd—Tb, Gd—Dy, Gd—Ho, Tb—Dy, and Tb—Ho. The two-layered film of Fe/Co comprising the thin film composed of Fe and the thin film composed of Co was used as the iron family metal film for constructing the artificial lattice film. However, the artificial lattice film may be also constructed with a monolayer film composed of an alloy such as Fe—Co, Fe—Ni, and Co—Ni.

The underlying base film 2 is not necessarily formed in the stacked structure shown in FIG. 1. It is also possible to form a magnetic wall movement control film for controlling the movement of the magnetic wall of the recording magnetic domain formed in the information-recording film, in place of the underlying base film 2 as described above.

The underlying base film 2 may be formed as a film in accordance with the reactive sputtering method by using Si as the target and Ar/N$_2$ as the electric discharge gas. A film of oxide such as silicon oxide, nitride (for example, aluminum nitride) other than silicon nitride, and oxynitride such as Si—Al—O—N may be used for the underlying base film other than silicon nitride.

The information-recording film has been formed by means of the DC magnetron sputtering method. However, in the present invention, the sputtering method (ECR sputtering method) based on the use of the electron cyclotron resonance and the RF magnetron sputtering method may be used.

In this embodiment, the Co—Cr system was used for the ferromagnetic film. However, a ferromagnetic film based on, for example, the Co—Cr—Ta system, the Co—Cr—Pt system, or the Co—Cr—Pt—Ta system may be used. In this case, the ratio between the concentration of Co and the concentration of the element other than Co is important, and the ratio determines the perpendicular magnetic anisotropy energy. The concentration of Co in the ferromagnetic film is preferably about 60 at % to 70 at %. The reason why the Co-based material is used for the ferromagnetic film in this embodiment is that such a material has the large saturation magnetization as compared with an Fe-based material.

For example, a ferromagnetic material based on the CoO or Co—CoO system, which has the perpendicular magnetic anisotropy and which has the saturation magnetization larger than that of the information-recording film, can be also used for the ferromagnetic film.

When the protective film was formed, Ar was used for the sputtering gas. However, the film may be formed by using a gas containing nitrogen. When the gas containing nitrogen is used, then the grains are made fine and minute, an obtained protective film (carbon film) is densified, and it is possible to further improve the protection performance. The reason whey the ECR sputtering method is used to manufacture the protective film is that the carbon film, which is dense and free from pin hole and which has good coverage, is obtained even in the case of an extremely thin film of 2 to 3 nm. Additionally, this method also has such a feature that it is possible to extremely decrease the damage received by the information-recording film when the protective film is manufactured. The deterioration of magnetic characteristics caused by the damage received during the film formation is lethal, because the information-recording film is progressively made thin as the realization of high density is advanced. The DC sputtering method may be also used to form the protective film besides the ECR sputtering method. In this case, it is desirable that the DC sputtering method is used when the film thickness of the protective film to be formed is not less than 5 nm. The DC sputtering method is sometimes disadvantageous when the film thickness is thinner than the above, for example, for the following reason. That is, (1) it is feared that the coverage of the surface of the information-recording film may be deteriorated, and (2) it is feared that the density and the hardness of the protective film may be insufficient.

Second Embodiment

In this embodiment, a magnetic recording medium having the cross-sectional structure as shown in the schematic sectional view in FIG. 1 was manufactured in the same manner as in the first embodiment. With reference to FIG. 1, an information-recording film 3 is composed of an amorphous alloy film of Tb—Fe—Co, and a ferromagnetic film 4 is composed of an alloy film of Co—Cr. A method for producing the magnetic recording medium 10 will be explained below.

Formation of Underlying Base Film

At first, a glass substrate having a diameter of 2.5 inches (about 6.35 cm) was prepared as the substrate 1. Subsequently, a silicon nitride film was formed as the underlying base film 2 to have a film thickness of 10 nm on the substrate 1. The underlying base film 2 is a layer which is provided in order to improve the protection of the information-recording film 3 and the adhesive performance with respect to the substrate 1. The magnetron sputtering method was used to form the underlying base film 2. $Si_3N_4$ was used for the target, and Ar was used for the electric discharge gas. The electric discharge gas pressure was 10 mTorr (about 1.33 Pa), and the introduced RF electric power was 1 kW/150 mm$\phi$.

Formation of Information-Recording Film

Subsequently, a film of $Tb_{19}Fe_{71}Co_{10}$ was formed as the information-recording film 3 on the underlying base film 2 by using the magnetron sputtering method to have a film thickness of 20 nm. A Tb—Fe—Co alloy, which had a composition with dominant sub-lattice magnetization of the transition metal, was used for the sputtering target, and pure Ar was used for the electric discharge gas. The electric discharge gas pressure during the sputtering was 5 mTorr (about 665 mPa), and the introduced RF electric power was 1 kW/150 mm$\phi$.

Formation of Ferromagnetic Film

Subsequently, a $CO_{67}Cr_{33}$ film was formed as the ferromagnetic film 4 on the information-recording film 3. The ferromagnetic film 4 was formed to have a film thickness of 8 nm so that the magnetic exchange interaction was generated with respect to the information-recording film 3. The film thickness is the maximum film thickness at which the exchange coupling force is exerted with respect to the information-recording film 3. When the ferromagnetic film 4 was formed, the film was continuously formed without breaking the vacuum during the process after forming the Tb—Fe—Co film as the information-recording film 3 in order to generate the magnetic coupling.

When the Co—Cr film as the ferromagnetic film 4 was formed, the ECR sputtering method was used in the same manner as in the first embodiment. As for the conditions for the sputtering, the pressure during the sputtering was 3 mTorr (about 399 mPa), and the introduced microwave electric power was 1 kW. In order to draw the plasma excited by the microwave, a DC bias voltage of 500 V was applied. Ar was used for the sputtering gas.

The value of the saturation magnetization of the Co—Cr film as the ferromagnetic film was 380 emu/cm$^3$, and the saturation magnetization of the Tb—Fe—Co film as the information-recording film was 230 emu/cm$^3$. The saturation magnetization of the ferromagnetic film was larger than the saturation magnetization of the information-recording film. It was revealed by the measurement with a vibration sample magnetometer (VSM) that the exchange coupling force between the Co—Cr film and the Tb—Fe—Co film was strong, and the Co—Cr film and the Tb—Fe—Co film magnetically behaved as a monolayer film.

Finally, a C (carbon) film was formed to have a film thickness of 5 nm as the protective film 5 on the ferromagnetic film 4. The ECR sputtering method based on the use of the microwave was used for the film formation. C (carbon) was used for the target material, and Ar was used for the electric discharge gas. The pressure during the sputtering was 3 mTorr (about 399 mPa), and the introduced microwave electric power was 1 kW. A DC bias voltage of 500 V was applied in order to draw the plasma excited by the microwave. The quality of the carbon film greatly depends on the sputtering conditions as described above and the electrode structure. Therefore, the foregoing conditions are not absolute. Thus, the magnetic recording medium having the stacked structure shown in FIG. 1 was obtained.

Measurement of Magnetic Characteristics

Subsequently, magnetic characteristics of the manufactured magnetic recording medium were measured. An M-H loop was obtained by the measurement with VSM (Vibration Sample Magnetometer). According to the obtained results, both of the rectangularity ratios S, S* were 1.0, exhibiting good rectangularity. The coercivity Hc was 3.5 kOe (about 278.53 kA/m). The perpendicular magnetic anisotropy energy in the direction perpendicular to the substrate surface of the information-recording film was 2×10' erg/cm$^3$. The in-plane magnetic anisotropy energy in the direction parallel to the substrate surface was 1×10$^4$ erg/cm$^3$.

Measurement of Volume of Activation

Subsequently, the volume of activation of the magnetic recording medium was measured. When the volume of activation is measured, the magnetic domains recorded in the information-recording film were observed with MFM or a polarization microscope to determine the volume of activation by measuring the size of the magnetic domain. As a result of the measurement of the volume of activation, the volume of activation of the information-recording film of the magnetic recording medium of this embodiment was extremely large, i.e., about forty times the value of a Co—Cr—Pt-based magnetic film widely used as the magnetic recording medium. This fact indicates that the information-recording film of this embodiment has small thermal fluctuation and small thermal demagnetization, and it is excellent in thermal stability.

Subsequently, the structures of the information-recording film 3 and the ferromagnetic film 4 were investigated by means of the X-ray diffraction method. As a result, only a diffraction peak based on Co—Cr of the ferromagnetic film 4 was obtained. The organizations and the structures of the information-recording film 3 and the ferromagnetic film 4 were investigated by means of a high resolution transmission electron microscope (high resolution TEM). As a result, a distinct lattice was found for only the Co—Cr film as the ferromagnetic film 4. According to this result, it was revealed that the other films were amorphous or aggregates of extremely fine organizations.

Magnetic Recording Apparatus

Subsequently, a lubricant was applied onto the protective layer in the same manner as in the first embodiment to manufacture a plurality of magnetic disks. The plurality of obtained magnetic disks were coaxially incorporated into the magnetic-recording apparatus. The arrangement of the magnetic recording apparatus was the same as that used in the first embodiment, which was constructed as shown in FIGS. 2 and 3.

The magnetic recording apparatus was driven to evaluate recording and reproduction characteristics of the magnetic disk. When the recording and reproduction characteristics were evaluated, the distance between the magnetic head and the magnetic recording medium was maintained to be 12 nm. A signal (700 kFCI) corresponding to 40 Gbits/inch$^2$ (6.20 Gbits/cm$^2$) was recorded on the disk to evaluate SIN of the disk. As a result, a reproduction output of 34 dB was obtained. The error rate or defect rate of the disk was measured. As a result, a value of not more than 1×10$^{-5}$ was obtained when no signal processing was performed.

MFM Observation for Magnetization State

The magnetization state of the recorded portion (recording magnetic domain) was observed with a magnetic force microscope (MFM). As a result of the observation, the zigzag pattern peculiar to the magnetization transition area was not observed. It is considered that the noise level is extremely small as compared with a conventional magnetic recording medium provided with an information-recording film based on the Co—Cr—Pt system, because the zigzag pattern peculiar to the magnetization transition area scarcely exists in the magnetic recording medium of the embodiment of the present invention. Further, it is considered that the low noise level is also caused by the fact that the information-recording film is amorphous. For the purpose of comparison, the recording was performed in the same manner as described above on the conventional magnetic recording medium provided with the information-recording film based on the Co—Cr—Pt system to observe the magnetization state of the recorded portion of the information-recording film. As a result of the observation, minute inverse magnetic domains, which had the magnetization in the direction opposite to the surroundings, were observed in the recording magnetic domains and between the mutually adjoining recording magnetic domains. On the other hand, in the case of the magnetic recording medium of this embodiment, the minute inverse magnetic domain was scarcely observed in the recording magnetic domains and between the mutually adjoining recording magnetic domains. One of the causes of the low noise level is also the fact that the minute inverse magnetic domain scarcely exists in the recording magnetic domains and between the mutually adjoining recording magnetic domains.

This embodiment is illustrative of the case in which the magnetic material based on the Tb—Fe—Co system is used for the information-recording film. However, any one of the rare earth elements of Gd, Dy, and Ho may be used in place of Tb. The information-recording film may be constructed with two rare earth elements such as Gd—Tb, Gd—Dy, Gd—Ho, Tb—Dy, and Tb—Ho. The Fe—Co alloy was used for the iron family metal film. However, the information-recording film may be also constructed with an alloy such as Fe—Co, Fe—Ni, and Co—Ni.

The underlying base film 2 may be formed as a film in accordance with the reactive sputtering method by using Si as the target and $Ar/N_2$ as the electric discharge gas. A film of oxide such as silicon oxide, nitride (for example, aluminum nitride) other than silicon nitride, and oxynitride such as Si—Al—O—N may be used for the underlying base film other than silicon nitride.

The magnetic material based on the Co—Cr system is used for the ferromagnetic film 4. However, a magnetic material based on the Co—Cr—Ta system or the Co—Cr—Pt system may be used.

Third Embodiment

In this embodiment, a magnetic recording medium having the same stacked structure as that shown in FIG. 1 was manufactured by using the same materials and the same method as those used in the first embodiment except that a substrate having a concave/convex texture on a substrate surface was used. The formation of the texture on the substrate surface includes, for example, (1) a method in which the substrate surface is prepared simultaneously with the polishing and (2) a method in which an extremely thin film in an island form is formed to use it as a texture. Any one of the methods may be used. The respective layers 2 to 5 shown in FIG. 1 were stacked in the same manner as in the first embodiment on the substrate having the texture as described above to manufacture the magnetic recording medium.

Magnetic characteristics were investigated for the obtained magnetic recording medium. As a result, it was revealed that the obtained magnetic recording medium had magnetic characteristics equivalent to those of the magnetic recording medium manufactured in the first embodiment. Subsequently, a plurality of magnetic disks were manufactured in the same manner as in the first embodiment, and the plurality of obtained magnetic disks were coaxially incorporated into the magnetic recording apparatus. The magnetic recording apparatus was constructed in the same manner as in the first embodiment, which had the structure as shown in FIGS. 2 and 3.

The magnetic recording apparatus was driven to evaluate recording and reproduction characteristics of the magnetic disk. As a result, the noise level was lower by about 1 dB than that of the magnetic disk in the first embodiment. It has been revealed from the analysis by MFM that the reason why the noise level is lowered as described above is that the movement of the magnetic wall of the recording magnetic domain is suppressed by the convex/concave unevenness of the texture formed on the substrate surface, and the zigzag pattern in the area of inversion of magnetization is flat after recording information.

The effect to suppress the magnetic wall movement brought about by the texture on the substrate does not depend on the magnetic material to be used. Convex/concave unevenness may be formed on the surface of the underlying base film before forming the information-recording film, in place of the provision of the texture on the substrate surface. According to this embodiment, it is appreciated that the substrate having the texture on the surface is effective to improve the accuracy of formation of the recording magnetic domain and reduce the noise.

Fourth Embodiment

In this embodiment, a magnetic recording medium was produced by using the same materials and the same method as those used in the first embodiment except that a Co/Pt alternately stacked multilayered film was used for the ferromagnetic film. The structure of the magnetic recording medium is the same as that of the magnetic recording medium in the first embodiment. Reference may be made to FIG. 1. Explanation will be made below for only a method for forming the Co/Pt alternately stacked multilayered film as the ferromagnetic film. The method for forming the layers other than the ferromagnetic film is the same as that used in the first embodiment, explanation of which will be omitted.

Formation of Ferromagnetic Film

A Pt/Co alternately stacked multilayered film was formed as a ferromagnetic film 4 to have a film thickness of 8 nm on the information-recording film 3. The Pt/Co alternately stacked multilayered film is obtained by successively and periodically stacking thin films each having a two-layered structure composed of a Pt thin film and a Co thin film. The multi-source co-sputtering method based on two sources of Pt and Co was used to form the Pt/Co alternately stacked multilayered film. In this embodiment, the film thickness of each of the layers of the thin film having the two-layered structure was Pt (0.5 nm)/Co (0.9 nm). The film thickness of each of the layers of the thin film having the two-layered structure can be precisely controlled to have a desired value by combining the velocity of revolution of the substrate and the introduced electric power during the sputtering. In this embodiment, the introduced DC electric power was controlled to be 0.3 kW during the formation of the Pt film, and it was controlled to be 0.6 kW during the formation of the Co film. The number of revolutions of the substrate during the film formation was 30 rpm. The electric discharge gas pressure during the sputtering was 3 mTorr (about 399 mPa), and a high purity Ar gas was used for the electric discharge gas.

When the alternately stacked multilayered film as described above is manufactured, the degree of vacuum upon the initial evacuation is important. In this embodiment, the film formation was started after performing the evacuation up to $4 \times 10^{-9}$ Torr. The values are not absolute, which may be changed depending on, for example, the sputtering system. In this embodiment, when the alternately stacked multilayered film was formed, the DC magnetron sputtering method was used. However, it is also allowable to use the RF magnetron sputtering method and the sputtering method (ECR sputtering method) based on the use of the electron cyclotron resonance. Especially, when the Co layer as aggregates of fine crystals is formed, it is effective to use the ECR sputtering.

Measurement of Magnetic Characteristics

Subsequently, magnetic characteristics of the manufactured magnetic recording medium were measured. According to an M-H loop obtained by the measurement with VSM, both of the rectangularity ratios S, S* were 1.0, and thus good rectangularity was obtained. The coercivity Hc was 3.9 kOe (about 310.362 kA/m). As for the magnetic anisotropy of the information-recording film, the in-plane magnetic anisotropy energy in the direction parallel to the substrate surface was 1×10' erg/cm$^3$, and the perpendicular magnetic anisotropy energy in the direction perpendicular to the substrate surface was 4×10$^7$ erg/cm$^3$ Further, the volume of activation of the magnetic recording medium was measured. As a result, the volume of activation had an extremely large value, i.e., about five times that of a magnetic recording medium provided with a magnetic film based on the Co—Cr—Pt system. This fact indicates that the material for constructing the information-recording film has small thermal fluctuation and small thermal demagnetization, and it is excellent in thermal stability.

Further, the structures of the information-recording film and the ferromagnetic film were investigated by means of the X-ray diffraction method. As a result, no diffraction peak was obtained. According to this fact, it is appreciated that the information-recording film and the ferromagnetic film are amorphous or aggregates of microcrystals as a whole. The organizations and the structures of the information-recording film and the ferromagnetic film were investigated by means of a high resolution transmission electron microscope (high resolution TEM). As a result, it was revealed that a lattice was found for only Fe and Co grains contained in the information-recording film and the ferromagnetic film, and the other portions had an amorphous structure. Especially, it was revealed that the information-recording film was an artificial lattice film having a desired film thickness in which thin films each having a three-layered structure of Fe (1 nm)/Co (0.1 nm)/Tb (0.1 nm) were periodically stacked. The film thicknesses of the respective layers of the thin film having the three-layered structure were well coincident with the measured values obtained by using the X-ray. The ferromagnetic film was also an alternately stacked multilayered film of Pt/Co.

Subsequently, the volume of activation of the magnetic recording medium was measured in accordance with the same method as that used in the first embodiment. As a result, the volume of activation was large, i.e., about five times the value of a Co—Cr—Pt-based magnetic film widely used for the magnetic recording medium. This fact indicates the fact that the information-recording film is excellent in thermal stability.

Subsequently, a lubricant was applied onto the protective layer in the same manner as in the first embodiment to manufacture a plurality of magnetic disks. The plurality of obtained magnetic disks were coaxially incorporated into the magnetic recording apparatus. The arrangement of the magnetic recording apparatus was the same as that used in the first embodiment, which was constructed as shown in FIGS. 2 and 3.

The magnetic recording apparatus was driven to evaluate recording and reproduction characteristics of the magnetic disk. When the recording and reproduction characteristics were evaluated, the distance between the magnetic head and the magnetic recording medium was maintained to be 12 nm. A signal (700 kFCI) corresponding to 40 Gbits/inch$^2$ (6.20 Gbits/cm$^2$) was recorded on the disk to evaluate S/N of the disk. As a result, a reproduction output of 34 dB was obtained. The error rate or defect rate of the disk was measured. As a result, a value of not more than 1×10$^{-5}$ was obtained when no signal processing was performed.

The magnetization state of the recorded portion (recording magnetic domain) was observed with a magnetic force microscope (MFM). As a result, the zigzag pattern peculiar to the magnetization transition area was not observed. It is considered that the noise level is extremely decreased as compared with a magnetic recording medium provided with a magnetic film based on the Co—Cr—Pt system, because the zigzag pattern peculiar to the magnetization transition area scarcely exists in the magnetic recording medium of the embodiment of the present invention. Further, it is considered that the low noise level is also caused by the fact that the magnetic film is an aggregate of fine grains. In the magnetic recording medium of this embodiment, the minute inverse magnetic domains, which had the magnetization in the direction opposite to the surroundings, were not observed in the recording magnetic domains and between the mutually adjoining recording magnetic domains. This fact is also one of the causes of the low noise level.

In this embodiment, the alternately stacked multilayered film based on the Co/Pt system was used for the ferromagnetic film. However, Fe or Ni may be used in place of Co. Further, Pd or Rh can be also used in place of Pt, in which the same or equivalent effect is obtained.

Fifth Embodiment

In this embodiment, a magnetic recording medium having the same stacked structure as that prepared in the first embodiment (see FIG. 1) was manufactured in accordance with the same method as that used in the first embodiment except that the film thicknesses of the respective layers of the Tb layer, the Fe layer, and the Co layer for constructing the Tb/Fe/Co artificial lattice film as the information-recording film were adjusted in order to enhance the coercivity of the information-recording film. The recording can be performed at a higher density by increasing the coercivity of the information-recording film for recording information therein.

Magnetic characteristics of the obtained magnetic recording medium were measured. According to an M-H loop obtained by the measurement with VSM, both of the rectangularity ratios S, S* were 1.0, exhibiting good rectangularity. The coercivity Hc was 3.9 kOe (about 310.362 kA/m). The Curie temperature of the information-recording film was 260° C., and the compensation temperature was not more than the room temperature. The sub-lattice magnetization of the iron family element was dominant in the composition. As a result of the measurement of the magnetic anisotropy of the information-recording film as described above, the in-plane magnetic anisotropy energy in the direction parallel to the substrate surface was 1×10$^4$ erg/cm$^3$, and the perpendicular magnetic anisotropy energy in the direction perpendicular to the substrate was 4×10$^7$ erg/cm$^3$. The value of the perpendicular magnetic anisotropy energy was not less than four times the value of an amorphous alloy of Tb—Fe—Co.

Subsequently, the volume of activation of the magnetic recording medium was measured. The volume of activation was measured in the same manner as in the first embodiment. As a result of the measurement of the volume of activation, the volume of activation of the information-recording film of the magnetic recording medium of this embodiment was extremely large, i.e., about six times the value of a magnetic film based on the Co—Cr—Pt system widely used for the magnetic recording medium. Further, the volume of activation of the information-recording film of the magnetic recording medium of this embodiment was 1.2 time the value of an amorphous alloy based on the Tb—Fe—

Co system. This fact indicates that the information-recording film of this embodiment is a film excellent in thermal stability in which the thermal fluctuation and the thermal demagnetization are small.

Subsequently, the structures of the information-recording film and the ferromagnetic film were investigated by means of the X-ray diffraction method. As a result, only a diffraction peak based on Co—Cr was obtained. Further, the organizations and the structures of the information-recording film and the ferromagnetic film were investigated by means of a high resolution transmission electron microscope (high resolution TEM). As a result, it was revealed that a definite lattice was found for only the Co—Cr film as the ferromagnetic film, and the other films were amorphous or aggregates of extremely fine organizations. Especially, it was found that the information-recording film was an artificial lattice film having a desired film thickness. The film thicknesses of the respective layers of the artificial lattice film were well coincident with the measured values obtained by using the X-ray.

Figure 5:
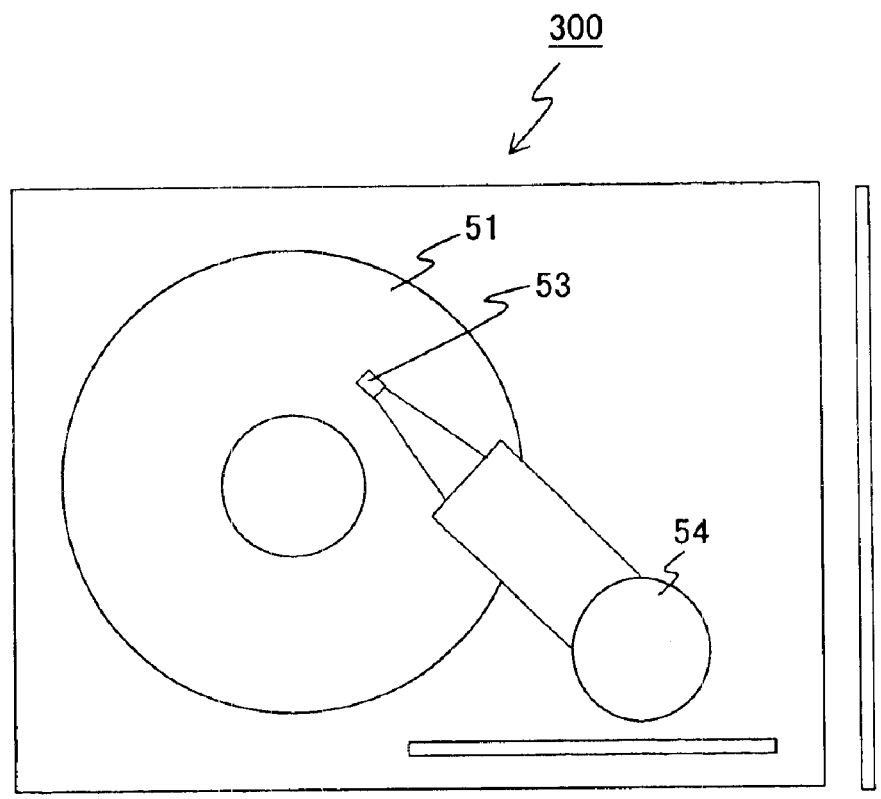
Figure 5:
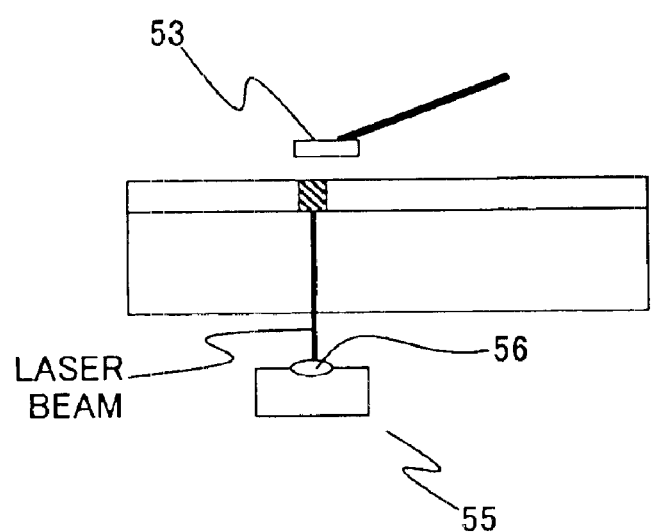

Subsequently, the surface of the magnetic recording medium was subjected to tape cleaning, and then a lubricant was applied to complete the magnetic disk. A plurality of magnetic disks were manufactured in accordance with the same process. In this embodiment, the obtained magnetic disks were coaxially incorporated into the magnetic recording apparatus as shown in FIG. 5. FIG. 5(A) shows a top view illustrating the magnetic recording apparatus 300, and FIG. 5(B) shows a partial magnified sectional view illustrating those disposed in the vicinity of a magnetic head 53 of the magnetic recording apparatus 300 shown in FIG. 5(A).

In the magnetic recording apparatus 300, an optical head 55 and the magnetic head 53 are arranged so that they are opposed to one another with the magnetic disks 51 intervening therebetween as shown in FIG. 5(B). The optical head 55 comprises a semiconductor laser (not shown) having a wavelength of 630 nm, and a lens 56 having a numerical aperture NA of 0.60. In FIGS. 5(A) and 5(B), the magnetic head 53 is an integrated type magnetic head in which a recording magnetic head and a reproducing magnetic head are integrated into one unit. A thin film magnetic head, which is based on the use of a soft magnetic film having a high saturation magnetic flux density of 2.1 T, was used for the recording magnetic head. The gap length of the recording magnetic head was 0.12 $\mu$m. A GMR magnetic head of the dual spin bulb type having the giant magnetic resistance effect was used for the reproducing magnetic head. The integrated type magnetic head 53 is controlled by a magnetic head-driving system 54. The position of the optical head 55 is controlled on the basis of control information used for the magnetic head-driving system 54. The plurality of magnetic disks 51 are coaxially rotated by a spindle 52. The magnetic head 53 is controlled so that the distance between the bottom surface of the magnetic head 53 and the surface of the magnetic disk 51 is 12 nm during recording or during reproduction of information.

A signal (700 kFCI) corresponding to 40 Gbits/inch$^2$ (6.20 Gbits/cm$^2$) was recorded on the magnetic disk 51 by driving the magnetic recording apparatus 300 as described above, and recorded information was reproduced. As a result, a reproduction output of 36 dB was obtained. The error rate or defect rate of the magnetic disk was measured. As a result, a value of not more than 6×10$^{-6}$ was obtained when no signal processing was performed. When information was recorded in this embodiment, then the optical head 55 was used to continuously radiate a multipulse laser beam having a laser power of 6 mW and a pulse interval of 20 ns onto the magnetic disk 51, and the magnetic head 53 was used to apply a constantly modulated magnetic field. Information can be also recorded on the magnetic disk by radiating minute light pulses having a laser power of 15 mw and a pulse interval of 10 ns from the optical head, and applying a pulse magnetic field synchronized with the minute light pulses by using the magnetic head. Further, information can be also recorded by applying a magnetic field by using the magnetic head while radiating, onto the magnetic disk, a laser beam from the optical head in a defocused state.

When the laser beam is radiated onto the magnetic disk during the recording of information as in the magnetic recording apparatus of this embodiment, then the light absorption occurs in the light-irradiated area of the information-recording film, and the light energy is converted into the thermal energy. Accordingly, the temperature is raised and the coercivity is lowered at the light-irradiated portion of the information-recording film. Information is recorded by simultaneously applying, to the light-irradiated portion of the information-recording film, the magnetic field having the polarity corresponding to recording information from the thin film magnetic head. In the magnetic recording apparatus of this embodiment, information can be recorded reliably at a high density even when the coercivity of the information-recording film for constructing the magnetic recording medium is higher than the intensity of the applied magnetic field applied by the magnetic head.

The magnetization state of the recorded portion (recording magnetic domain) was observed with a magnetic force microscope (MFM). As a result of the observation, the zigzag pattern peculiar to the magnetization transition area was not observed. As for the size of the formed recording magnetic domain, the width in the track direction was 70 nm, which was shorter than the gap length of the magnetic head. When information was recorded by using the pulse magnetic field and the pulse light beam, the width in the track direction of the formed recording magnetic domain was 50 nm, which was further shorter than the gap length of the magnetic head.

Sixth Embodiment

Figure 6:
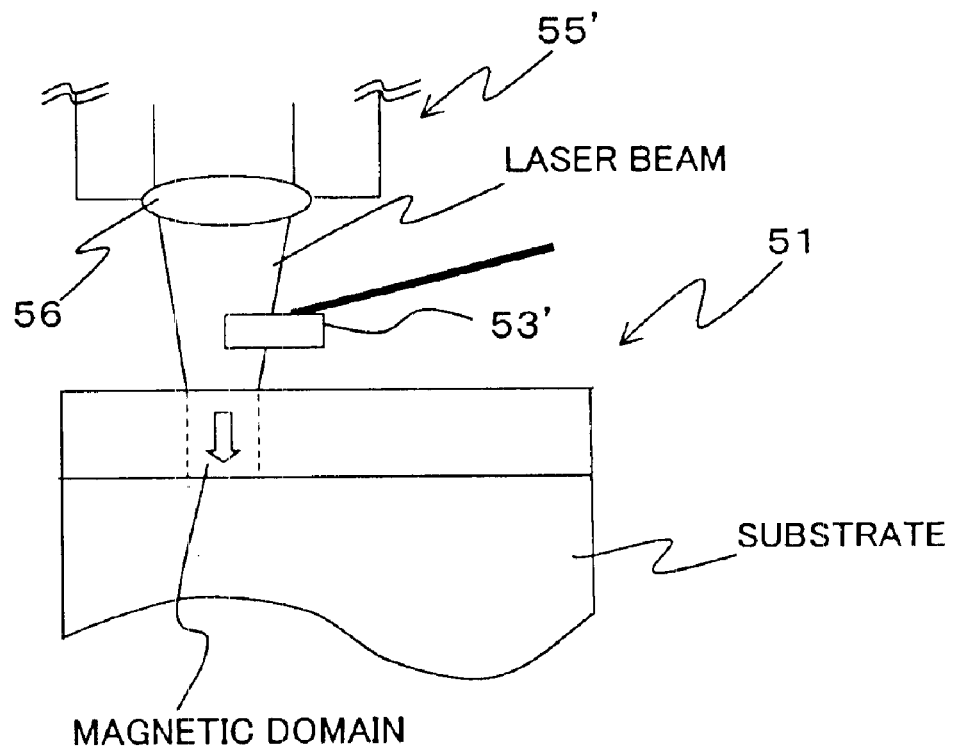
FIG. 6 shows another schematic arrangement different from the arrangement of the fifth embodiment, of a magnetic recording apparatus provided with an optical head, illustrating a situation in which a magnetic head and the optical head are arranged on the same side with respect to a magnetic disk.

In this embodiment, the same magnetic recording medium as that used in the fifth embodiment was used. The magnetic recording medium was incorporated into the magnetic recording apparatus having the same structure as that of the magnetic recording apparatus used in the fifth embodiment (see FIG. 5(A)) except that a magnetic head 53' and an optical head 55' were arranged on an identical side with respect to the magnetic disk 51 as shown in FIG. 6. The magnetic recording apparatus was driven to perform recording/reproduction/erasing.

In the magnetic recording apparatus of this embodiment, the light beam, which is radiated from the optical head 55', comes into the magnetic disk 51 from the side opposite to the substrate, not from the side of the substrate of the magnetic disk 51. In the case of the magnetic recording apparatus as described above, the optical head and the magnetic head can be merged. Therefore, the servo mechanism for the head can be simplified, and thus the arrangement of the apparatus can be simplified.

The magnetic recording apparatus as described above was driven to record a signal (700 kFCI) corresponding to 40 Gbits/inch$^2$ (6.20 Gbits/cm$^2$) on the magnetic disk. When information was recorded, the distance between the bottom surface of the magnetic head and the surface of the magnetic disk was maintained to be 12 nm. Information was recorded by continuously radiating a multi-pulse laser beam at an interval of 20 ns with a laser power of 6 mW from the optical head onto the magnetic recording medium, and simultaneously applying a constant modulated magnetic field from the magnetic head. Information was recorded on the magnetic disk by using the method as described above, and the recorded information was reproduced. As a result, a reproduction output of 36 dB was obtained. Information can be also recorded on the magnetic disk by using minute light pulses having a laser power of 15 mW and a pulse interval of 10 ns as the light beam radiated from the optical head, and synchronizing a pulse magnetic field generated from the magnetic head with the minute light pulses.

The recording magnetic domain recorded on the magnetic disk was observed with MFM in the same manner as in the first embodiment. As a result, the magnetic domain, which was smaller than the gap width of the magnetic head, was formed. In the case of the magnetic recording apparatus of this embodiment, even when the magnetic film of the magnetic recording medium has a coercivity higher than the intensity of the applied magnetic field applied by the magnetic head, the recording can be performed by lowering the coercivity of the magnetic film by means of the heating effected by the radiation of the laser beam. Finally, the error rate or defect rate of the disk was measured. As a result, a value of not more than $1 \times 10^{-5}$ was obtained when no signal processing was performed.

Seventh Embodiment

Figure 7:
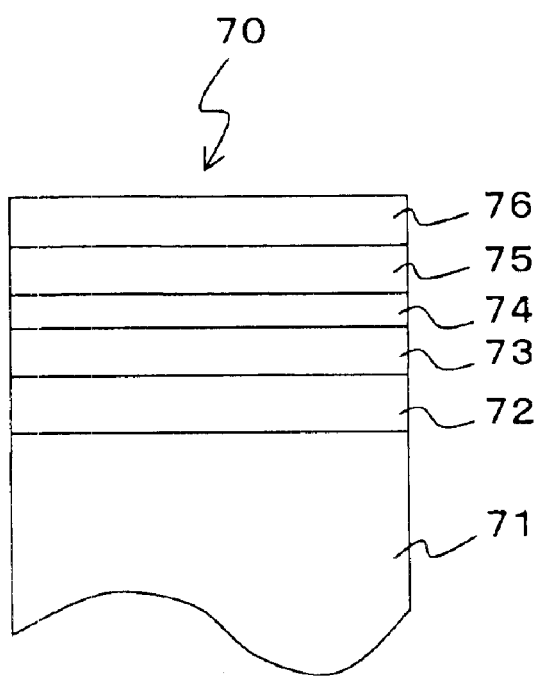
FIG. 7 schematically shows a cross-sectional structure of a magnetic recording medium manufactured in an eighth embodiment.

In this embodiment, a magnetic recording medium having a cross-sectional structure as shown in FIG. 7 was manufactured. The magnetic recording medium 70 has a structure in which an underlying base film 72, a first magnetic film 73, a second magnetic film 74, a third magnetic film 75, and a protective film 76 are successively stacked on a substrate 71. The first magnetic film 73 is a layer (magnetic wall movement control layer) for suppressing the movement of the magnetic wall formed in the second magnetic film, and it is constructed with a Co—Cr—Pt film. The second magnetic film 74 is a layer (information-recording film) for recording information therein, and it is constructed with a Tb—Fe—Co film. The third magnetic film is a layer (reproducing layer) for enhancing the reproduced signal output during reproduction, and it is constructed with a Pt/Co alternately stacked multilayered film. A method for producing the magnetic recording medium 70 will be explained below.

Formation of Underlying Base Film

At first, a glass substrate having a diameter of 2.5 inches (about 6.35 cm$^3$) was prepared as the substrate 71. A $Cr_{80}Ti_{20}$ alloy film was formed as the underlying base film 72 on the substrate 71 by means of the DC magnetron sputtering method. The underlying base film 72 is capable of controlling the orientation of the first magnetic film 73. A Cr—Ti alloy was used for the target material, and pure Ar was used for the electric discharge gas. The pressure during the sputtering was 3 mTorr (about 399 mPa), and the introduced DC electric power was 1 kW/150 mmφ. The sputtering was performed at the room temperature, for the following reason. That is, when the sputtering is performed at the room temperature, then the formed alloy film is fine and minute, and consequently the crystal grains of the first magnetic film 73 formed on the underlying base film 72 can be made fine and minute. The film thickness of the underlying base film 72 was 10 nm.

Formation of First Magnetic Film

Subsequently, a perpendicularly magnetizable film composed of $Co_{53}Cr_{35}Pt_1$, was formed as the first magnetic film 73 on the underlying base film 72 by means of the DC sputtering method. A Co—Cr—Pt alloy was used for the target material, and pure Ar was used for the electric discharge gas. The pressure during the sputtering was 3 mTorr (about 399 mPa), and the introduced DC electric power was 1 kW/150 mmφ. The substrate temperature during the film formation was 200° C.

The cross-sectional structure of the formed first magnetic film 73 was observed with a transmission electron microscope (TEM). As a result, it was revealed that the film thickness of the first magnetic film 73 was 10 nm, and the first magnetic film 73 was epitaxially grown from the Cr—Ti film (underlying base film).

Subsequently, magnetic characteristics of the single first magnetic film were investigated. As a result, the coercivity was 2.8 kOe (about 222.824 kA/m), the perpendicular magnetic anisotropy energy was $8 \times 10^5$ erg/cm$^3$, and the saturation magnetization was 300 emu/ml.

Concave/convex unevenness corresponding to crystal grains in the magnetic film was formed on the surface of the formed first magnetic film 73. The size of the concave/convex unevenness was investigated. As a result, the distance in the direction parallel to the substrate surface, which ranged from an apex (center of the convex) of a certain peak (convex) to an apex (center of the convex) of a peak nearest thereto, was 2 μm. The distance between a peak (center of the convex) and a valley (center of the concave) was 4 nm.

Formation of Second Magnetic Film

Subsequently, an amorphous film of Tb—Fe—Co was formed as the second magnetic film 74 on the first magnetic film 73 without breaking the vacuum after the formation of the first magnetic film 73. The composition of the second magnetic film 74 is $Tb_{21}Fe_{69}CO_{10}$, which is a composition in which the sub-lattice magnetization of the transition metal is dominant. The second magnetic film 74 was formed by using the RF magnetron sputtering method. In the sputtering, a Tb—Fe—Co alloy was used for the target material, and pure Ar was used for the electric discharge gas. The formed second magnetic film 74 has a film thickness of 20 nm. The pressure during the sputtering is 3 mTorr (about 399 mPa), and the introduced DC electric power is 1 kW/150 mmφ.

The coercivity of the obtained second magnetic film 74 was 3.5 kOe (about 278.53 kA/m), the saturation magnetization was 250 emu/ml, and the perpendicular magnetic anisotropy energy was not less than $7 \times 10^6$ erg/cm$^3$.

Formation of Third Magnetic Film

Subsequently, an alternately stacked multilayered film of Pt/Co was formed as the third magnetic film 75 on the second magnetic film 74. The third magnetic film 75 is a layer which is provided in order to improve the reproduction characteristics. The Pt/Co alternately stacked multilayered film is obtained by successively and periodically stacking thin films each having a two-layered structure composed of a Pt thin film and a Co thin film. When the Pt/Co alternately stacked multilayered film was formed, the two-source co-sputtering method based on two source targets of Pt and Co was used. In this embodiment, the film thickness of each of the layers of the thin film having the two-layered structure was Pt (0.5 nm)/Co (0.9 nm). The film thickness of each of the layers of the thin film having the two-layered structure can be precisely controlled to have a desired value by combining the velocity of revolution of the substrate and the introduced electric power during the sputtering. In this embodiment, the introduced DC electric power was controlled to be 0.3 kW during the formation of the Pt film, and the introduced DC electric power was controlled to be 0.6 kW during the formation of the Co film. The number of revolutions of the substrate during the film formation is 30 rpm. The electric discharge gas pressure during the sputtering was 3 mTorr (about 399 mPa), and high purity Ar gas was used for the electric discharge gas. The entire film thickness of the formed third magnetic film was 10 nm.

The coercivity of the third magnetic film itself was 2 kOe (about 159.16 kA/m), the perpendicular magnetic anisotropy energy was not less than $4 \times 10^5$ erg/cm$^3$, and the saturation magnetization was 500 emu/ml.

Formation of Protective Film

Finally, a C (carbon) film was formed to have a film thickness of 5 nm as the protective film 76 on the third magnetic film 75 by means of the ECR sputtering method. C was used for the target material, and Ar was used for the electric discharge gas. The pressure during the sputtering was 0.3 mTorr (about 399 mPa), and the introduced microwave electric power was 0.7 kW. An RF bias voltage of 500 W was applied in order to draw the plasma excited by the microwave.

Measurement of Magnetic Characteristics

Thus, the magnetic recording medium having the stacked structure shown in FIG. 7 was manufactured, and magnetic characteristics of the obtained magnetic recording medium 70 were measured. An M-H loop was obtained by the measurement with VSM (Vibration Sample Magnetometer). According to the obtained results, the rectangularity ratios S, S* were 1.0. It was revealed that good rectangularity was obtained. The coercivity Hc was 4.5 kOe (about 358.11 kA/m), and the saturation magnetization Ms was 300 emu/cm$^3$. It was revealed from the shape of the M-H loop that the first to third magnetic films were subjected to exchange coupling. The perpendicular magnetic anisotropy energy in the direction perpendicular to the substrate surface was $8 \times 10^6$ erg/cm$^3$. It was revealed that the large magnetic anisotropy was possessed in the direction perpendicular to the substrate surface. The volume of activation of the magnetic film of the magnetic recording medium was measured to determine KuV/kT. As a result, KuV/kT was 250. This fact indicates that the magnetic film of the magnetic recording medium is excellent in thermal stability.

Magnetic Recording Apparatus

Subsequently, a lubricant was applied onto the surface of the magnetic recording medium 70, and thus the magnetic disk was completed. A plurality of magnetic disks were manufactured in accordance with the same process, and they were coaxially incorporated into the magnetic recording apparatus shown in FIGS. 2 and 3 in the same manner as in the first embodiment. The magnetic recording apparatus as described above was driven to record and reproduce information. During the recording and the reproduction, the distance between the magnetic head surface and the magnetic film was maintained to be 12 nm. A signal (700 kFCI) corresponding to 40 Gbits/inch$^2$ was recorded on the magnetic disk to evaluate S/N of the disk. As a result, a reproduction output of 34 dB was obtained.

Subsequently, a definite pattern was recorded on the magnetic disk, and the fluctuation of the edge of the magnetic domain formed in the magnetic film was measured with a time interval analyzer. As a result of the measurement, the fluctuation was successfully reduced to be not more than $\frac{1}{10}$ as compared with a magnetic disk provided with no first magnetic film. The error rate or defect rate of the magnetic disk was measured. As a result, a value of not more than $1 \times 10^{-5}$ was obtained when no signal processing was performed. The magnetization state of the recorded portion was observed with a magnetic force microscope (MFM). As a result, the zigzag pattern peculiar to the magnetization transition area was not observed. It is considered that the noise level was successfully reduced thereby. The fact that the second magnetic film for recording information is amorphous is also one of the causes to successfully reduce the noise level.

In this embodiment, the perpendicularly magnetizable film based on the Co—Cr—Pt system was used as the first magnetic film to control the size and the position of the magnetic domain formed in the second magnetic film. However, for example, a four-source system alloy or a five-source system alloy, which is obtained by adding, to the material as described above, Ta, Nb or the like to facilitate segregation of Cr at the Co grain boundary, may be used. In this case, the magnetic interaction between crystal grains is further reduced, and hence it is possible to improve the positioning accuracy of the magnetic domain formed in the second magnetic film. The material, which is used for the magnetic film of the magnetic wall movement type, is not suitable for the material for constructing the first magnetic film. The material, in which the pinning site for suppressing the movement of the magnetic wall exists and the magnetic interaction between magnetic grains is weakened, is preferably used for the material for constructing the first magnetic film. It is preferable that the direction of the anisotropy of the first magnetic film is the same as that of the second magnetic film.

Materials other then those based on the Co alloy system may be also used for constructing the first magnetic film. For example, it is allowable to use a magnetic film such as a Co—CoO partially oxidized film and an amorphous alloy film of rare earth-iron family elements subjected to granulation into 10 nm$\phi$. The granulation as described above makes it possible to form the pinning site for the magnetic wall movement in the magnetic film.

In this embodiment, the amorphous ferrimagnetic film based on the Tb—Fe—Co system was used for the second magnetic film. However, the same or equivalent effect was also obtained, for example, even when Dy, Ho, or Gd was used in place of Tb. Among these elements, the largest perpendicular magnetic anisotropy is obtained with Tb. The magnitude of the perpendicular magnetic anisotropy is changed in an order of Dy>Ho>Gd. A plurality of rare earth elements may be combined in place of the construction of the rare earth element with only Tb. For example, it is allowable to use alloys composed of two elements such as Tb—Gd, Tb—Dy, Tb—Ho, Gd—Dy, Gd—Ho, and Dy—Ho, and alloys composed of three or more elements. Accordingly, it is possible to control the perpendicular magnetic anisotropy energy. It is preferable that the composition of the rare earth element is not less than 20 at % and not more than 30 at % to form the perpendicularly magnetizable film, for the following reason. That is, when such a range is adopted, it is possible to obtain a ferrimagnetic member having an easy axis of magnetization in the direction perpendicular to the substrate surface.

The Fe—Co alloy was used as the transition metal. However, it is also allowable to use alloys such as Fe—Ni and Co—Ni. As for such alloys, the anisotropy energy is decreased in an order of Fe—Co>Fe—Ni>Co—Ni.

Eighth Embodiment

In this embodiment, a magnetic recording medium of the in-plane magnetic recording type was manufactured. The cross-sectional structure of the magnetic recording medium is the same as that of the magnetic recording medium shown in FIG. 1, having the structure in which an underlying base film 2, an information-recording film 3, a ferromagnetic film 4, and a protective film 5 are successively stacked on a substrate 1. The information-recording film 3 is composed of an artificial lattice film of Er/Fe/Co, which is an in-plane magnetizable film having an easy axis of magnetization in a direction parallel to the substrate surface. The ferromagnetic film 4 is composed of a Co—Pt alloy film. A method for producing the magnetic recording medium of the in-plane magnetic recording type will be explained below with reference to FIG. 1.

Formation of Underlying Base Film

At first, a glass substrate having a diameter of 2.5 inches (about 6.35 cm) was prepared as the substrate 1. Subsequently, a silicon nitride film was formed as the underlying base film 2 to have a film thickness of 10 nm on the substrate 1. The underlying base film 2 is a layer which is provided in order to improve the protection of the information-recording film 3 and the adhesive performance with respect to the substrate 1. The magnetron sputtering method was used to form the underlying base film 2. $Si_3N_4$ was used for the target, and Ar was used for the electric discharge gas. The electric discharge gas pressure was 10 mTorr (about 1.33 Pa), and the introduced RF electric power was 1 kW/150 mm$\phi$.

Formation of Information-Recording Film

Subsequently, the information-recording film 3 was formed on the underlying base film 2. The information-recording film 3 is an artificial lattice film obtained by periodically stacking thin films each having a three-layered structure composed of an Er layer, an Fe layer, and a Co layer. The film thickness of each of the layers of the thin film having the three-layered structure is Fe (1 nm)/Co (0.1 nm)/Er (0.2 nm). The multi-source co-sputtering method based on three sources of Er, Fe, and Co was used as a method for forming the information-recording film (artificial lattice film) 3 as described above. The film thickness of each of the layers of the thin film having the three-layered structure can be precisely controlled to have a desired value by combining the velocity of revolution of the substrate and the electric power introduced during the sputtering. In this case, the introduced DC electric power was 0.3 kW during the formation of the Er film, it was 0.15 kW during the formation of the Co film, and it was 0.7 kW during the formation of the Fe film. The number of revolutions of the substrate was 30 rpm. High purity Ar gas was used for the electric discharge gas. The electric discharge gas pressure during the sputtering was 3 mTorr (about 399 mPa). The artificial lattice film (information-recording film), which had the structure comprising the periodically stacked three-layered thin films of Fe (1 nm)/Co (0.1 nm)/Er (0.2 nm), was formed to have a film thickness of about 20 nm under the sputtering condition as described above.

The gas pressure during the sputtering affects the magnetic interaction between magnetic clusters. When the sputtering is performed under the condition in which the gas pressure is high, a film having small magnetic interaction is obtained. Such a film is preferred as a film for magnetic recording. However, the optimum gas pressure differs depending on the film formation apparatus to be used. The gas pressure is adjusted depending on the film formation apparatus. It is considered that the difference in gas pressure depending on the film formation apparatus is caused by the difference in cathode structure of the target and the difference in gas flow in the vacuum chamber or tank.

When the artificial lattice film as described above is formed as the film, the degree of vacuum at the initial evacuation is important. In this embodiment, the film was formed after effecting the evacuation up to $4 \times 10^{-9}$ Torr (about $532 \times 10^{-9}$ Pa). The numerical values, which are adopted in this embodiment when the information-recording film 3 is formed, are not absolute, which change depending on, for example, the system of the sputtering. When the information-recording film 3 is constructed as the artificial lattice film as described above, then it is possible to increase the in-plane magnetic anisotropy energy in the direction parallel to the substrate as compared with a case in which an amorphous alloy film of Er—Fe—Co is used as an information-recording film, and it is possible to improve the thermal stability of the information-recording film. The magnetization of the information-recording film 3 as described above lies in the difference between the magnetization of the transition metal and the magnetization of the rare earth element. This embodiment was designed so that the magnetization of the transition metal was dominant as compared with the magnetization of the rare earth element.

Formation of Ferromagnetic Film

Subsequently, a $Co_{55}Pt_{45}$ film was formed as the ferromagnetic film 4 on the information-recording film 3. The ferromagnetic film 4 was formed to have a film thickness of 10 nm so that the magnetic exchange interaction was generated with respect to the information-recording film 3. The range of the film thickness of the ferromagnetic film, in which the exchange coupling force is exerted with respect to the information-recording film 3, is 15 nm at the maximum in this embodiment. When the ferromagnetic film 4 was formed, the film was continuously formed without breaking the vacuum during the process after forming the Er/Fe/Co artificial lattice film as the information-recording film 3 in order to generate the magnetic coupling.

The Co—Pt film as the ferromagnetic film 4 does not exhibit satisfactory magnetization unless crystallization is effected. For this reason, the ECR sputtering method was used. As for the conditions for the sputtering, the pressure during the sputtering was 0.3 mTorr (about 39.9 mPa), and the introduced microwave electric power was 0.7 kW. In order to draw the plasma excited by the microwave, a DC bias voltage of 500 V was applied. Ar was used for the sputtering gas.

When the ECR sputtering method is used, the film can be formed at a low temperature without raising the substrate temperature. Therefore, it is possible to suppress the interlayer diffusion which would be otherwise caused with respect to the Er/Fe/Co artificial lattice film. If such interlayer diffusion takes place, it is especially feared that the perpendicular magnetic anisotropy energy may be lowered and the coercivity may be lowered. In view of the production, it is preferable that the value of the anisotropy energy is stable. Therefore, it is preferable that the film is formed so that the interlayer diffusion is reduced. Further, the decrease in coercivity due to the interlayer diffusion causes the decrease in reproduced signal output and the decrease in reliability. Also from this viewpoint, it is desirable to reduce the interlayer diffusion. Therefore, it is desirable that the substrate temperature is low during the film formation. The ECR sputtering method as described above is effective to form the film with a material which requires the heat treatment in order to express the magnetization, as in the Co—Pt-based magnetic film as the ferromagnetic film 4. The ECR sputtering method is preferred as a film formation method for forming a thin film (or a multilayered film) in an order of nanometer (nm).

Formation of Protective Film

Finally, a C (carbon) film was formed to have a film thickness of 5 nm as the protective film 5 on the ferromagnetic film 4. The ECR sputtering method based on the use of the microwave was used for the film formation. C (carbon) was used for the target material, and Ar was used for the electric discharge gas. The pressure during the sputtering was 0.3 mTorr (about 39.9 mPa), and the introduced microwave electric power was 0.5 kW. A DC bias voltage of 500 V was applied in order to draw the plasma excited by the microwave. The quality of the carbon film greatly depends on the sputtering conditions as described above and the electrode structure. Therefore, the conditions are not absolute. Thus, the magnetic recording medium having the stacked structure shown in FIG. 1 was obtained.

Subsequently, magnetic characteristics of the manufactured magnetic recording medium were measured. According to an M-H loop obtained with VSM, both of the rectangularity ratios S, S* were 1.0, exhibiting good rectangularity. The coercivity Hc was 3.9 kOe (about 310.362 kA/m). As for the magnetic anisotropy energy of the information-recording film, the in-plane magnetic anisotropy energy in the direction parallel to the substrate surface was $3 \times 10^6$ erg/cm$^3$.

Subsequently, the volume of activation of the magnetic recording medium was measured in accordance with the same method as used in the first embodiment. As a result of the measurement of the volume of activation, the volume of activation of the information-recording film of the magnetic recording medium of this embodiment was extremely large, i.e., about fifty times the value of a Co—Cr—Pt-based magnetic film widely used as the magnetic recording medium. This fact indicates that the information-recording film of this embodiment has small thermal fluctuation and small thermal demagnetization, and it is excellent in thermal stability.

Subsequently, the saturation magnetization was measured for the information-recording film 3 and the ferromagnetic film 4. The saturation magnetization of the ferromagnetic film 4 based on the Co—Pt system was 600 emu/cm$^3$ which was a value larger than that of the saturation magnetization of 380 emu/cm$^3$ of the information-recording film 3. It was revealed by the measurement with VSM that the exchange coupling force between the information-recording film 3 and the ferromagnetic film 4 was strong, and the information-recording film 3 and the ferromagnetic film 4 magnetically behaved as a monolayer film. As described above, the reason why the material having the saturation magnetization larger than that of the information-recording film 3 is used for the ferromagnetic film 4 is that it is intended to increase, with the ferromagnetic film 4, the magnetic flux coming from the magnetic domain formed in the information-recording film 3. Accordingly, when the magnetic recording medium is subjected to reproduction by using the magnetic head, a large reproduction output is obtained.

Subsequently, the organizations and the structures of the information-recording film 3 and the ferromagnetic film 4 were investigated by means of a high resolution transmission electron microscope. As a result, no distinct lattice was found. According to this fact, it was revealed that any one of the information-recording film 3 and the ferromagnetic film 4 was amorphous or aggregates of extremely fine organizations. Especially, it was revealed that the information-recording film 3 was the artificial lattice film having a desired film thickness composed of thin films of the three-layered structure of Fe (1 nm)/Co (0.1 nm)/Er (0.2 nm). The film thicknesses of the respective layers of the thin film having the three-layered structure were well coincident with the measured values obtained with the X-ray.

Subsequently, a lubricant was applied onto the protective film 5, and thus the magnetic disk was completed. A plurality of magnetic disks were manufactured in accordance with the same process, and they were coaxially incorporated into the magnetic recording apparatus constructed in the same manner as in the first embodiment (see FIGS. 2 and 3). The magnetic recording apparatus was driven, and a signal (700 kFCI) corresponding to 40 Gbits/inch$^2$ (6.20 Gbits/cm$^2$) was recorded on the magnetic disk to evaluate S/N of the disk. As a result, a reproduction output of 34 dB was obtained. The error rate or defect rate of the magnetic disk was measured. As a result, a value of not more than $1 \times 10^{-5}$ was obtained when no signal processing was performed.

Figure 9:
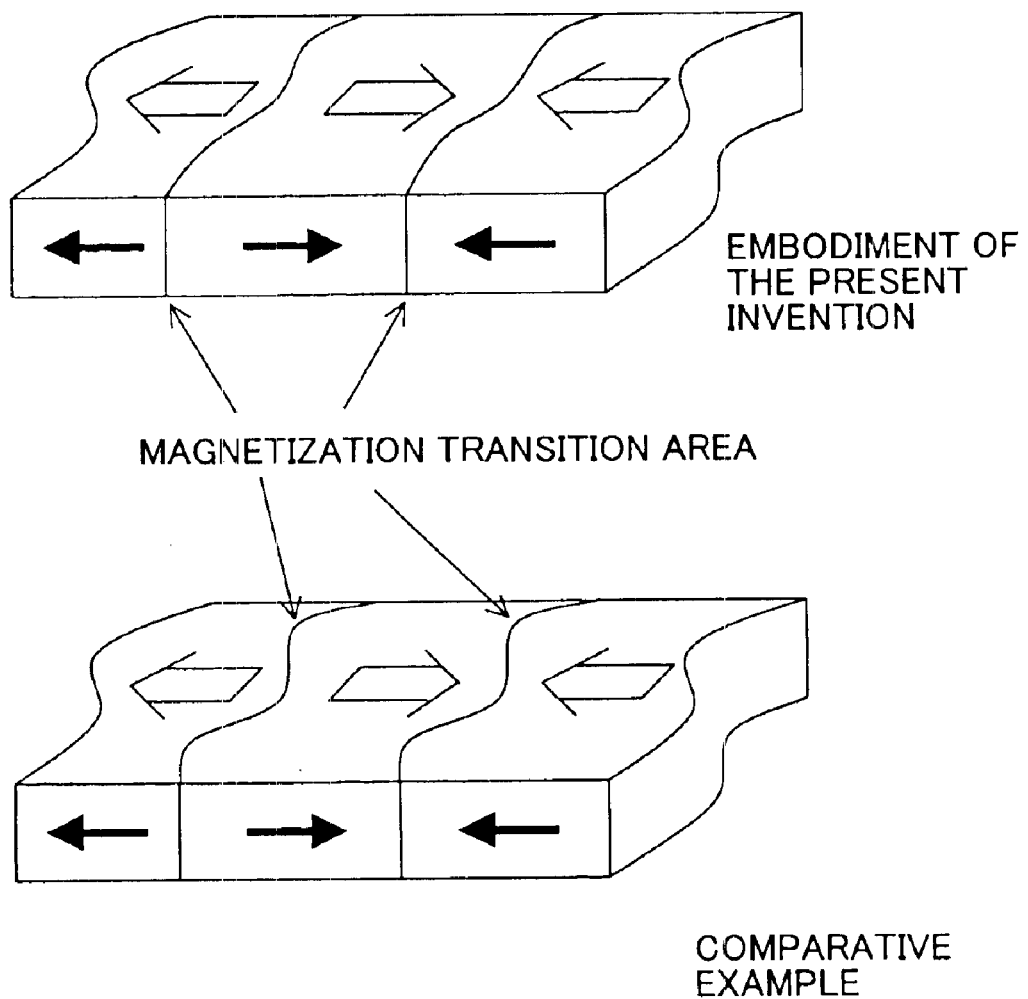
FIG. 9 schematically shows situations of states of magnetization of recorded portions obtained by observation with MFM, illustrating a situation of the state of magnetization of the recorded portion of a magnetic recording medium according to the present invention and a situation of the state of magnetization of the recorded portion of a conventional magnetic recording medium provided with a magnetic film based on the Co—Cr—Pt system as an information-recording film.
Figure 10:
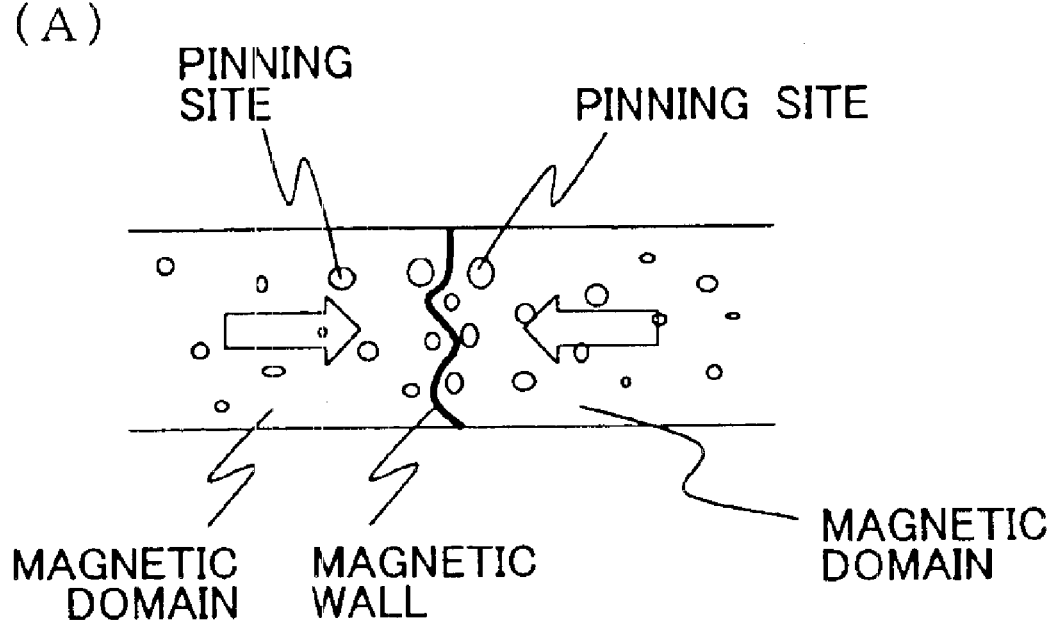
Figure 10:
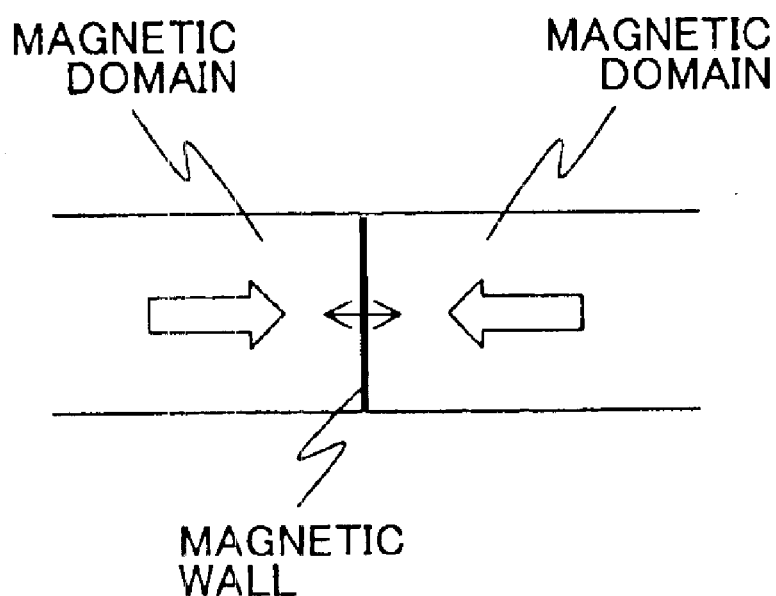

The magnetization state of the recorded portion (recording magnetic domain) was observed with a magnetic force microscope (MFM). As a result of the observation, the zigzag pattern peculiar to the magnetization transition area was not observed. FIG. 9 schematically shows a situation of the magnetization state of the recorded portion. FIG. 9 also schematically shows a situation of the magnetization state of a recorded portion of an information-recording film when the recording was performed in the same manner as described above with a conventional magnetic recording medium (Comparative Example) provided with an information-recording film based on the Co—Cr—Pt system for the purpose of comparison. It is considered that the noise level is extremely small as compared with the magnetic recording medium (Comparative Example) provided with the information-recording film based on the Co—Cr—Pt system, because the zigzag pattern peculiar to the magnetization transition area scarcely exists in the magnetic recording medium of the embodiment of the present invention. Further, it is considered that the low noise level is also caused by the fact that the information-recording film is the aggregate of fine and minute grains. Further, in the case of the magnetic recording medium of the embodiment of the present invention, the minute inverse magnetic domain was scarcely observed in the recording magnetic domains and between the mutually adjoining recording magnetic domains. One of the causes of the low noise level is also this fact.

This embodiment is illustrative of the case in which the Er/Fe/Co system is used for the artificial lattice film for constructing the information-recording film. However, the same or equivalent characteristics were also obtained when another rare earth element such as La, Ce, Pr, Nd, Sm, Eu, Tm, Yb, Lu, or Y was used in place of Er. Especially, a magnetic recording film, which was constructed with Ce, Pr, Nd, Sm, Tm, or Yb, exhibited preferred magnetic characteristics next to those of the magnetic recording film constructed with Er. Alternatively, the rare earth elements for constructing the artificial lattice film may be constructed with an alloy composed of two elements represented by Er—Pr, Er—Nd, Er—Sm, and Er—Tm. The two-layered film of Fe/Co comprising the thin film composed of Fe and the thin film composed of Co was used as the transition metal film for constructing the artificial lattice film. However, the artificial lattice film may be also constructed with a monolayer film composed of an alloy such as Fe—Co, Fe—Ni, and Co—Ni.

The underlying base film 2 is not necessarily formed in the stacked structure shown in FIG. 1. It is also possible to form a control film for controlling the movement of the magnetic wall of the recording magnetic domain formed in the information-recording film, in place of the underlying base film 2 as described above. The underlying base film 2 may be formed as a film in accordance with the reactive sputtering method by using Si as the target and $Ar/N_2$ as the electric discharge gas. A film of oxide such as silicon oxide, nitride (for example, aluminum nitride) other than silicon nitride, and oxynitride such as Si—Al—O—N may be used for the underlying base film other than silicon nitride.

The information-recording film has been formed by means of the DC magnetron sputtering method. However, in the present invention, the sputtering method (ECR sputtering method) based on the use of the electron cyclotron resonance and the RF magnetron sputtering method may be used.

In this embodiment, the Co—Pt system was used for the ferromagnetic film. However, a ferromagnetic film based on, for example, the Co—Cr—Ta system, the Co—Cr—Pt system, or the Co—Cr—Pt—Ta system may be used. Alternatively, it is also allowable to use an alloy such as Co—Pd and Co—Rh and an alternately stacked multilayered film (artificial lattice film) such as Co/Pt, Co/Pd, and Co/Rh. The reason why the Co-based material is used for the ferromagnetic film in this embodiment is that such a material has the large saturation magnetization as compared with an Fe-based material.

Ninth Embodiment

In this embodiment, a magnetic recording medium of the in-plane magnetic recording type was manufactured. The cross-sectional structure of the magnetic recording medium is the same as that of the magnetic recording medium shown in FIG. 7. The magnetic recording medium has a structure in which an underlying base film 72, a first magnetic film 73, a second magnetic film 74, a third magnetic film 75, and a protective film 76 are successively stacked on a substrate 71. With reference to FIG. 7, the first magnetic film 73 is a layer for suppressing the movement of the magnetic wall formed in the second magnetic film, and it is constructed with a Co—Cr—Pt film. The second magnetic film 74 is a layer for recording information therein, and it is constructed with an Er—Fe—Co film. The third magnetic film 75 is a layer for enhancing the reproduced signal output during reproduction, and it is constructed with a Pt—Co alloy film. A method for producing the magnetic recording medium 70 will be explained below.

Formation of Underlying Base Film

At first, a glass substrate having a diameter of 2.5 inches (about 6.35 cm) was prepared as the substrate 71. A $Cr_{85}Ti_{15}$ alloy film was formed as the underlying base film 72 on the substrate 71 by means of the DC magnetron sputtering method. The underlying base film 72 is capable of controlling the orientation of the first magnetic film 73. A Cr—Ti alloy was used for the target material, and pure Ar was used for the electric discharge gas. The pressure during the sputtering was 3 mTorr (about 399 mPa), and the introduced DC electric power was 1 kW/150 mm$\phi$. The sputtering was performed at the room temperature.

Formation of First Magnetic Film

Subsequently, a magnetic film composed of $CO_{69}Cr_{19}Pt_{12}$ was formed as the first magnetic film 73 on the underlying base film 72 by means of the DC sputtering method. A Co—Cr—Pt alloy was used for the target material, and pure Ar was used for the electric discharge gas. The pressure during the sputtering was 30 mTorr (about 3.99 Pa), and the introduced DC electric power was 1 kW/150 mm$\phi$. The substrate temperature during the film formation was room temperature. Magnetic characteristics of the single first magnetic film were investigated. As a result, the coercivity was 2.5 kOe (about 198.95 kA/m), and the saturation magnetization was 360 emu/ml.

Formation of Second Magnetic Film

Subsequently, an amorphous film of Er—Fe—Co was formed as the second magnetic film 74 on the first magnetic film 73. The composition of the second magnetic film 74 is $Er_{19}Fe_{71}Co_{10}$, which is a composition in which the sublattice magnetization of the transition metal is dominant. The second magnetic film 74 was formed by using the RF magnetron sputtering method. In the sputtering, an Er—Fe—Co alloy was used for the target material, and pure Ar was used for the electric discharge gas. The formed second magnetic film 74 has a film thickness of 20 nm. The pressure during the sputtering is 3 mTorr (about 399 mPa), and the introduced RF electric power is 1 kW/150 mm$\phi$. In this embodiment, the film was formed by using the RF magnetron sputtering method. However, the DC magnetron sputtering method may be used.

The coercivity of the obtained second magnetic film 74 was 3.8 kOe (about 302.404 kA/m), and the saturation magnetization was 450 emu/ml. The in-plane magnetic anisotropy energy was not less than $7 \times 10^6$ erg/cm$^3$. The film was a magnetic member having the magnetic anisotropy in the direction parallel to the substrate surface.

Third Magnetic Film

Subsequently, an alloy film of $Pt_{20}Co_{80}$ was formed as the third magnetic film 75 on the second magnetic film 74 by using the RF magnetron sputtering method in the same manner as in the formation of the second magnetic film. The third magnetic film 75 is a layer which is provided in order to improve the reproduction characteristics. The electric discharge gas pressure during the sputtering is 3 mTorr (about 399 mPa), and the introduced RF electric power is 1 kW/150 mm$\phi$. The film thickness of the third magnetic film 75 was 5 nm. There is a certain limit for the range in which the exchange coupling force from the second magnetic film 74 is exerted. The film thickness of the third magnetic film 75 is 15 nm at the maximum, in order to reliably exert the exchange coupling force from the second magnetic film 74 on the third magnetic film 75. Magnetic characteristics of the third magnetic film 75 as described above were measured. As a result, the coercivity was 1 kOe (about 79.58 kA/m), and the saturation magnetization was 560 emu/ml.

Formation of Protective Film

Finally, a C (carbon) film was formed to have a film thickness of 5 nm as the protective film 76 on the third magnetic film 75 by means of the ECR sputtering method. C was used for the target material, and Ar was used for the electric discharge gas. The pressure during the sputtering was 0.3 mTorr (about 39.9 mPa), and the introduced microwave electric power was 0.5 kW. A DC bias voltage of 500 V was applied in order to draw the plasma excited by the microwave.

Measurement of Magnetic Characteristics

Thus, the magnetic recording medium having the stacked structure shown in FIG. 7 was manufactured, and magnetic characteristics of the obtained magnetic recording medium were measured. An M-H loop was obtained by the measurement with VSM (Vibration Sample Magnetometer). According to the obtained results, the rectangularity ratios S, S* were 1.0. It was revealed that good rectangularity was obtained. The coercivity Hc was 3.5 kOe (about 278.53 kA/m), and the saturation magnetization Ms was 450 emu/cm$^3$. The in-plane magnetic anisotropy energy in the direction parallel to the substrate surface was $4\times10^5$ erg/cm$^3$. It was revealed that the large magnetic anisotropy was possessed in the direction parallel to the substrate surface. The volume of activation of the magnetic film of the magnetic recording medium was measured to determine the value of KuV/kT. As a result, the value was 350. The value was larger than the value (about 60 to 120) of a magnetic film based on the Co—Cr—Pt system widely used as the conventional magnetic recording medium. This fact indicates that the magnetic film of the magnetic recording medium is excellent in thermal stability.

Magnetic Recording Apparatus

Subsequently, a lubricant was applied onto the surface of the magnetic recording medium, and thus the magnetic disk was completed. A plurality of magnetic disks were manufactured in accordance with the same process, and they were coaxially incorporated into the magnetic recording apparatus shown in FIGS. 2 and 3 in the same manner as in the first embodiment. The magnetic recording apparatus as described above was used to record and reproduce information. During the recording and the reproduction, the distance between the magnetic head surface and the magnetic film was maintained to be 12 nm. A signal (700 kFCI) corresponding to 40 Gbits/inch$^2$ was recorded on the magnetic disk to evaluate S/N of the disk. As a result, a reproduction output of 36 dB was obtained. The recording was performed in the same manner as described above on a magnetic disk having no Co—Cr alloy (third magnetic film) to reproduce recorded information. As a result, a reproduction output of 34 dB was obtained, which was smaller than the above by 2 dB.

Subsequently, a definite pattern was recorded on the magnetic disk, and the fluctuation of the edge of the magnetic domain formed in the magnetic film was measured with a time interval analyzer. As a result of the measurement, the fluctuation was successfully reduced to be not more than $\frac{1}{10}$ as compared with a magnetic disk provided with no first magnetic film. According to this result, it was revealed that the jitter, which would be generated resulting from the movement of the magnetic wall in the second magnetic film during the recording of information to fluctuate the position of the recording magnetic domain, was successfully reduced by providing the first magnetic film. The error rate or defect rate of the magnetic disk was measured. As a result, a value of not more than $1\times10^{-5}$ was obtained when no signal processing was performed.

The magnetization state of the recorded portion was observed with a magnetic force microscope (MFM). As a result, the zigzag pattern peculiar to the magnetization transition area was not observed. Accordingly, the noise level was successfully reduced thereby as compared with a conventional magnetic recording medium based on the Co—Cr—Pt system. The fact that the second magnetic film for recording information is amorphous is also one of the causes to successfully reduce the noise level.

In this embodiment, the magnetic film based on the Co—Cr—Pt system was used as the first magnetic film to control the size and the position of the magnetic domain formed in the second magnetic film. However, for example, a four-source system alloy or a five-source system alloy, which is obtained by adding Ta, Nb or the like to the material as described above, may be used. Pd or Rh may be used other than Pt. For example, an element such as P, B, or Si may be added by 2 to 3% in view of the corrosion resistance and the realization of fine and minute magnetic grains.

In this embodiment, the amorphous ferrimagnetic film based on the Er—Fe—Co system was used for the second magnetic film. However, the same or equivalent effect is also obtained, for example, even when La, Ce, Pr, Nd, Pm, Sm, Eu, Tm, Yb, Lu, or Y is used in place of Er. For example, it is possible to use an amorphous ferrimagnetic material such as Tb—Fe—Co, Dy—Fe—Co, Ho—Fe—Co, and Gd—Fe—Co. In place of the use of only Er for the rare earth element for constructing the second magnetic film, it is also allowable to use an alloy constructed by combining a plurality of rare earth elements such as alloys containing two elements and alloys containing three or more elements. Specifically, the second magnetic film may be constructed with a ferrimagnetic film such as Tb—Dy—Fe—Co, Tb—Gd—Fe—Co, Tb—Ho—Fe—Co, Gd—Ho—Fe—Co, Gd—Dy—Fe—Co, and Dy—Ho—Fe—Co. For example, the vacuum vapor deposition method and the sputtering method such as the DC magnetron sputtering method and the RF magnetron sputtering method can be used to form the ferrimagnetic amorphous film. The Fe—Co alloy, was used as the transition metal. However, an alloy such as Fe—Ni and Co—Ni may be used.

The Pt—Co alloy was used for the third magnetic film. However, an element such as Pd and Rh may be used in place of Pt. An alloy composed of two elements such as Pt—Pd, Pt—Rh, and Pd—Rh may be used. Alternatively, Ni can be also used in place of Co. Further alternatively, Fe may be used in place of Co. In this case, it is preferable to adopt a composition area in which the saturation magnetization larger than that of the first magnetic film is obtained. Further, there is no limitation to the alloy of Pt and Co. The same or equivalent effect is also obtained even in the case of an alternately stacked multilayered film (artificial lattice film) constructed by alternately stacking layers based on the Pt system and layers based on the Co system.

Tenth Embodiment

Figure 8:
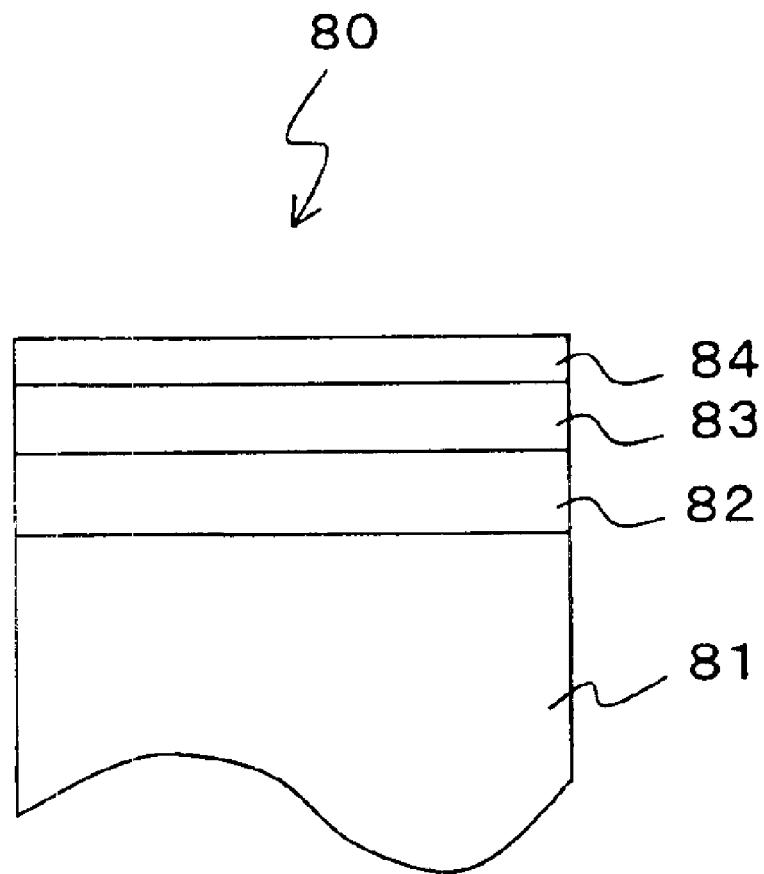
FIG. 8 schematically shows a cross-sectional structure of a magnetic recording medium manufactured in an embodiment.

In this embodiment, a magnetic recording medium having a cross-sectional structure as shown in a schematic sectional view in FIG. 8 was manufactured as the magnetic recording medium according to the second aspect of the present invention. The magnetic recording medium 80 has the structure in which an underlying base film 82, a magnetic film (information-recording film) 83, and a protective film 84 are successively stacked on a substrate 81. A method for producing the magnetic recording medium 80 will be explained below.

Preparation of Substrate

At first, a glass substrate having a diameter of about 2.5 inches (about 6.35 cm) was prepared as the substrate 81. The substrate used in this embodiment is an example. A disk substrate having any size may be used, and a metal substrate such as Al or Al alloy may be used. The effect of the present invention is not affected by the material quality and the size of the substrate to be used. Further, it is also allowable to use a substrate comprising an NiP layer formed on a substrate of glass, Al, or Al alloy by means of the plating method or the sputtering method.

Formation of underlying Base Film

Subsequently, a silicon nitride film was formed as the underlying base film 82 having a film thickness of 50 nm on the substrate 81 by means of the RF magnetron sputtering method. The underlying base film 82 makes it possible to improve the adhesive performance between the substrate 81 and the magnetic film 83. Silicon was used for the target material, and an Ar—$N_2$ mixed gas (Ar/$N_2$ partial pressure ratio: 90/10) was used for the electric discharge gas. The pressure during the sputtering was 3 mTorr (about 399 mPa), and the introduced RF electric power was 1 kW/150 mmφ. The sputtering was performed at the room temperature.

The underlying base film 82 has the function as the nucleation site (position to serve as the core upon the formation of magnetic domain) when a magnetic field is applied from the outside to the magnetic film 83 to form the magnetic domain, and it has the effect as the obstacle for the magnetic wall movement. Such an effect not only depends on the material for constructing the underlying base film 82 but also depends on the condition for the film formation. The material for the underlying base film 82 is not limited to silicon nitride as well. It is also allowable to use a metal film such as Ni—P, Al, Al—Cr alloy, Al—Ti alloy, Cr, and Cr—Ti alloy. Alternatively it is also allowable to use an inorganic compound such as AlN, $Zro_2$, and BN.

Formation of Magnetic Film

Subsequently, an amorphous film of Tb—Fe—Co was continuously formed as the magnetic film 83 on the underlying base film 82 without breaking the vacuum after the formation of the underlying base film 82. The composition of the magnetic film 83 is $Tb_{17}Fe_{74}CO_9$, in which the sub-lattice magnetization of the transition metal is dominant. The RF magnetron sputtering method was used for the formation of the magnetic film 83. In the sputtering, a Tb—Fe—Co alloy was used for the target material, and Ar-$O_2$ mixed gas (partial pressure ratio: 98/2) was used for the electric discharge gas. The thickness of the formed magnetic film 83 is 20 nm. The electric discharge gas pressure during the sputtering was 10 mTorr (about 1.33 Pa), and the introduced RF electric power was 1 kW/150 mmφ.

The coercivity of the obtained magnetic film 83 was 3.5 kOe (about 278.53 kA/m), the saturation magnetization was 250 emu/ml, and the perpendicular magnetic anisotropy energy was $5 \times 10^6$ erg/$cm^3$.

Formation of Protective Film

Finally, a C (carbon) film was formed to have a film thickness of 5 nm as the protective film 84 on the magnetic film 83 by means of the ECR sputtering method. C was used for the target material, and Ar was used for the electric discharge gas. The pressure during the sputtering was 0.3 mTorr, and the introduced microwave electric power was 0.7 kW. An RF bias voltage of 500 W was applied in order to draw the plasma excited by the microwave. The hardness of the manufactured protective film 84 was measured with a hardness tester produced by Hysitron. As a result, the hardness was 21 GPa. According to a result obtained by the Raman spectroscopy, it was revealed that the sp3 bond played a key role.

When the protective film 84 was formed, Ar was used for the sputtering gas. However, the film may be formed with a gas containing nitrogen. When the gas containing nitrogen is used, then the grains become fine and minute, the obtained C film is densified, and it is possible to further improve the protective performance. As described above, the film quality of the protective film greatly depends on the sputtering condition and the electrode structure. Therefore, the conditions described above are not absolute. It is desirable that the conditions are appropriately adjusted depending on the apparatus to be used.

Measurement of Magnetic Characteristics

Thus, the magnetic recording medium 80 having the stacked structure shown in FIG. 8 was manufactured, and magnetic characteristics of the obtained magnetic recording medium 80 were measured. An M-H loop was obtained by the measurement with VSM (Vibration Sample Magnetometer). According to the obtained results, the rectangularity ratios S, S* were 1.0. It was revealed that good rectangularity was obtained. The coercivity Hc was 3.5 kOe (about 278.53 kA/m), and the saturation magnetization Ms was 250 emu/$cm^3$. The perpendicular magnetic anisotropy energy in the direction perpendicular to the substrate surface was $3 \times 10^6$ erg/$cm^3$. The volume of activation of the magnetic film of the magnetic recording medium was measured to determine the value of KuV/kT. As a result, the value was 280. This fact indicates that the magnetic film of the magnetic recording medium is excellent in thermal stability.

Subsequently, the cross-sectional structure of the magnetic film of the magnetic recording medium was analyzed by means of the Auger electron spectroscopy. As a result of the analysis, it was revealed that oxygen existed uniformly in the magnetic film. The content of oxygen in the magnetic film was determined by means of ESCA. As a result, the content of oxygen was 10 at %. The planar structure of the magnetic film was observed with a transmission electron microscope (TEM). As a result, grains of Tb oxide of about 3 nm were present at a rate of one grain in a square of 100 nm. The cross-sectional structure of the magnetic film was observed. As a result, it was revealed that the grains were present in a dispersed manner randomly three-dimensionally.

Magnetic Recording Apparatus

Subsequently, a lubricant was applied onto the surface of the magnetic recording medium, and thus the magnetic disk was completed. A plurality of magnetic disks were manufactured in accordance with the same process, and they were coaxially incorporated into the magnetic recording apparatus constructed in the same manner as in the first embodiment (see FIGS. 2 and 3).

The magnetic recording apparatus was driven so that a signal (700 kFCI) corresponding to 40 Gbits/$inch^2$ (about 6.20 Gbits/$cm^2$) was recorded on the magnetic disk to evaluate S/N of the magnetic disk. As a result, a reproduction output of 34 dB was obtained. The signal was recorded in the same manner as described above on a magnetic recording medium containing substantially no oxygen in a magnetic film to evaluate S/N. As a result, the noise was increased by about 5 dB over the entire frequency area. Thus, the effect to reduce the noise was obtained by containing oxygen in the magnetic film as described above.

Subsequently, a definite pattern was recorded on the magnetic disk of the present invention, and the fluctuation of the edge of the magnetic domain formed in the magnetic film was measured with a time interval analyzer. As a result of the measurement, the fluctuation was successfully reduced to be not more than 1/10 as compared with a conventional magnetic disk containing substantially no oxygen in a magnetic film. Further, the fluctuation of the edge of the magnetic domain was measured in accordance with the same method for magnetic disks manufactured by changing the concentration of oxygen contained in the magnetic film to have a variety of values. As a result, the effect to reduce the fluctuation of the edge appeared in the magnetic disk provided with the magnetic film having an oxygen concentration of 0.1 at %. In the case of the magnetic disks having the oxygen concentrations (contents of oxygen) in the magnetic films of 0.1 at % to 5 at %, the fluctuation of the edge was reduced to be not more than 1/2 as compared with the conventional magnetic disk. In the case of the magnetic disks having the oxygen concentrations in the magnetic films of 5 at % to 10 at %, the fluctuation of the edge was reduced to be 1/3 to 1/4. Further, in the case of the magnetic disks having the oxygen concentrations in the magnetic films of 10 at % to 20 at %, the fluctuation of the edge was reduced to be 1/10, and the magnetic disks exhibited extremely satisfactory characteristics. In the case of the magnetic disks having the oxygen concentrations in the magnetic films exceeding 20 at %, the perpendicular magnetic anisotropy energy of the magnetic film was suddenly decreased, and the disks did not exhibit the perpendicular magnetization. The error rate or defect rate of the magnetic disk was measured. As a result, a value of not more than $1 \times 10^{-5}$ was obtained when no signal processing was performed. The magnetization state of the recorded portion was observed with a magnetic force microscope (MFM). As a result, the zigzag pattern peculiar to the magnetization transition area was not observed. It is considered the noise level was successfully reduced thereby.

In this embodiment, the oxide of Tb was formed by adding oxygen into the magnetic film. However, the same or equivalent effect can be also obtained even when nitride of Tb is formed by adding nitrogen in place of oxygen. The corrosion resistance of the magnetic film was greatly improved by adding nitrogen, probably for the following reason. That is, it is considered that a part of nitrogen formed solid solution in Fe.

In this embodiment, the amorphous ferrimagnetic film based on the Tb—Fe—Co system was used for the magnetic film. However, the same or equivalent effect was also obtained, for example, even when Dy, Ho, or Gd was used in place of Tb. Among these elements, the largest perpendicular magnetic anisotropy is obtained with Tb. The magnitude of the perpendicular magnetic anisotropy is changed in an order of Dy>Ho>Gd. A plurality of rare earth elements may be combined in place of the construction of the rare earth element with only Tb. For example, it is allowable to use alloys composed of two elements such as Tb—Gd, Tb—Dy, Tb—Ho, Gd—Dy, Gd—Ho, and Dy—Ho, and alloys composed of three or more elements. Accordingly, it is possible to control the perpendicular magnetic anisotropy energy. It is preferable that the composition of the rare earth element is not less than 20 at % and not more than 30 at % to form the perpendicularly magnetizable film, for the following reason. That is, when such a range is adopted, it is possible to obtain a ferrimagnetic member having an easy axis of magnetization in the direction perpendicular to the substrate surface.

The Fe—Co alloy was used as the transition metal. However, it is also allowable to use alloys such as Fe—Ni and Co—Ni. As for such alloys, the anisotropy energy is decreased in an order of Fe—Co>Fe—Ni>Co—Ni.

Eleventh Embodiment

In this embodiment, a magnetic recording medium having the same stacked structure as that of the magnetic recording medium manufactured in the tenth embodiment (see FIG. 8) was manufactured except that a magnetic film was constructed with an artificial lattice film of Tb/Fe/Co. The method for forming those other than the magnetic film is the same as that used in the tenth embodiment, explanation of which is omitted. A method for forming the magnetic film (Tb/Fe/Co artificial lattice film) will be explained below.

Method for Forming Magnetic Film

When the magnetic film 83 was formed, the multi-source co-sputtering method based on three sources of Tb, Fe, and Co was used. The film thickness of each of the layers is Fe (1 nm)/Co (0.1 nm)/Tb (0.2 nm). The film thickness of each of the layers can be precisely controlled to have a desired value by combining the velocity of revolution of the substrate and the electric power introduced during the sputtering. In this embodiment, the introduced DC electric power was set to be 0.3 kW for Tb, 0.15 kW for Co, and 0.7 kW for Fe. The number of revolutions of the substrate was 30 rpm. The electric discharge gas pressure during the sputtering was 3 mTorr. A mixed gas of Ar—$N_2$ was used for the electric discharge gas. Thus, the artificial lattice film was formed to have an entire thickness of about 40 nm by periodically stacking stacked units each composed of Fe (1 nm)/Co (0.1 nm)/Tb (0.2 nm).

When the artificial lattice film as described above is manufactured, the degree of vacuum at the initial evacuation is important. In this embodiment, the film was manufactured after effecting the evacuation up to $4 \times 10^{-9}$ Torr. The values as described above are not absolute, which change depending on, for example, the system of the sputtering. In this embodiment, the film was manufactured by means of the DC magnetron sputtering method. However, the film formation may be carried out by using the RF magnetron sputtering method and the sputtering method (ECR sputtering method) based on the use of the electron cyclotron resonance.

When the artificial lattice film is used for the magnetic film as described above, then it is possible to increase the perpendicular magnetic anisotropy energy as compared with a case in which an amorphous alloy film based on the Tb—Fe—Co system is used as a magnetic film, and it is possible to improve the thermal stability of the magnetic film. The magnetic film exhibits substantially the same magnetic characteristics as those of the ferrimagnetic member composed of a transition metal such as Fe and Co and a rare earth element such as Tb. The magnetization of such a magnetic film appears as the difference between the magnetization of the transition metal thin film layer and the magnetization of the rare earth element thin film layer. The magnetic film manufactured in this embodiment is a magnetic film in which the magnetization of the transition metal is dominant. A part of nitrogen in the mixed gas was present in Co of the formed magnetic film, because the Ar—$N_2$ mixed gas was used when the magnetic film was formed.

Measurement of Magnetic Characteristics

Subsequently, magnetic characteristics of the magnetic recording medium provided with the artificial lattice film as described above as the magnetic film were measured. An M-H loop was obtained by the measurement with VSM (vibration Sample Magnetometer). According to the obtained results, both of the rectangularity ratios S, S* were 1.0. It was revealed that good rectangularity was obtained. The coercivity Hc was 3.5 kOe (about 278.53 kA/m). As for the magnetic anisotropy energy of the magnetic film, the perpendicular magnetic anisotropy energy in the direction perpendicular to the substrate surface was $5 \times 10^6$ erg/cm$^3$. The volume of activation V of the magnetic recording medium was measured to determine the value of KuV/kT as the index for the thermal stability of the magnetic layer. As a result, the value of KuV/kT was 400. This fact indicates that the magnetic film is formed of a material which is excellent in thermal stability with small thermal fluctuation and small thermal demagnetization.

Further, the magnetic film was observed with a high resolution transmission electron microscope (TEM). As a result, it was revealed that the artificial lattice film was provided, in which the stacked units each composed of Fe (1 nm)/Co (0.1 nm)/Tb (0.2 nm) were periodically stacked to give the desired film thickness.

Subsequently, a lubricant was applied onto the surface of the magnetic recording medium, and thus the magnetic disk was completed. A plurality of magnetic disks were manufactured in accordance with the same process, and they were coaxially incorporated into the magnetic recording apparatus shown in FIGS. 2 and 3 in the same manner as in the first embodiment. The magnetic recording apparatus as described above was used to record and reproduce information. During the recording and the reproduction, the distance between the magnetic head surface and the magnetic film was maintained to be 12 nm. A signal (700 kFCI) corresponding to 40 Gbits/inch$^2$ was recorded on the magnetic disk to evaluate S/N of the disk. As a result, a reproduction output of 36 dB was obtained. The error rate or defect rate of the magnetic disk was measured. As a result, a value of not more than $1 \times 10^{-5}$ was obtained when no signal processing was performed.

This embodiment is illustrative of the case in which the artificial lattice film based on the Tb/Fe/Co system is used. However, the same or equivalent effect is obtained even when one element of Gd, Dy, and Ho is used other than Tb, or even when an alloy such as Gd—Tb, Gd—Dy, Gd—Ho, Tb—Dy, and Tb—Ho is used. The artificial lattice film was constructed by using the two-layered film of Fe/Co as the transition metal. However, it is also possible to obtain a magnetic film having equivalent characteristics by using an alternately stacked multilayered film composed of an alloy such as Fe—Co, Fe—Ni, and Co—Ni and a rare earth element such as Tb.

Twelfth Embodiment

In this embodiment, a magnetic recording medium having the same stacked structure as that of the magnetic recording medium manufactured in the tenth embodiment (see FIG. 8) was manufactured except that a magnetic film was constructed by alternately stacking layers containing oxygen and layers containing no oxygen. The method for forming the film other than the magnetic film is the same as that used in the tenth embodiment, explanation of which is omitted. A method for forming the magnetic film will be explained below.

Method for Forming Magnetic Film

The composition of the magnetic film used in this embodiment is $Tb_{15}Fe_{75}CO_{10}$ in which the sub-lattice magnetization of the transition metal is dominant. The magnetic film was formed by using the RF magnetron sputtering method. A Tb—Fe—Co alloy was used for the target, and pure Ar was used for the electric discharge gas. The thickness of the formed magnetic film is 20 nm.

During the film formation of the magnetic film, the sputtering was temporarily interrupted when the film thickness was 5 nm, followed by being left to stand as it was for 5 minutes. After that, the film formation was resumed, and the film formation was temporarily interrupted again when the film thickness was 5 nm, followed by being left to stand as it was for 5 minutes. The step of forming the film and the step of being left to stand were repeatedly performed to form the film until the film thickness of the magnetic film was a desired film thickness (about 20 nm). The pressure during the sputtering was 10 mTorr (about 3.99 Pa), and the introduced RF electric power was 1 kW/150 mmφ. The coercivity of the obtained magnetic film was 3.5 kOe (about 278.5 kA/m), the saturation magnetization was 250 emu/ml, and the perpendicular magnetic anisotropy energy was $5 \times 10^6$ erg/cm$^3$.

Magnetic characteristics of the magnetic recording medium provided with the magnetic film as described above were measured. According to an M-H loop obtained by the measurement with VSM, the rectangularity ratios S, S* were 1.0, and thus good rectangularity was obtained. The coercivity Hc was 3.5 kOe (about 278.53 kA/m), and the saturation magnetization Ms was 250 emu/cm$^3$. The perpendicular magnetic anisotropy energy was $5 \times 10^6$ erg/cm$^3$. The volume of activation of the magnetic recording medium was measured to determine the value of KuV/kT. As a result, the value was 300. This fact indicates that the magnetic film is excellent in thermal stability.

Figure 11:
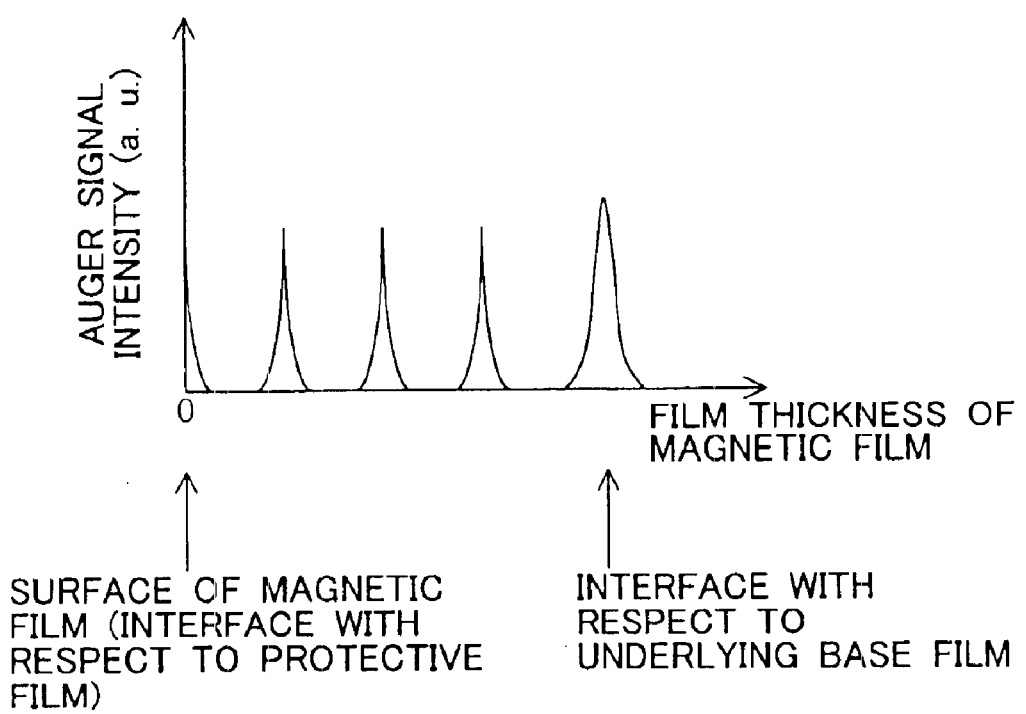
FIG. 11 schematically shows a result of Auger analysis for the cross section of a magnetic film of a magnetic recording medium manufactured in a third embodiment.

Subsequently, the cross-sectional structure of the magnetic film was analyzed by means of the Auger electron spectroscopy. A graph of the result of the analysis is schematically shown in FIG. 11. According to the result of the analysis shown in FIG. 11, it is considered that an area having a high oxygen concentration exists in the magnetic film, and portions having high oxygen concentrations and portions having low oxygen concentrations (portions containing substantially no oxygen) are alternately present in a layered form. According to this fact, the portions having high oxygen concentrations and the portions having low oxygen concentrations were successively formed in the magnetic film by forming the film while temporarily interrupting the sputtering when the magnetic film was formed.

Observation with MFM

Figure 12:
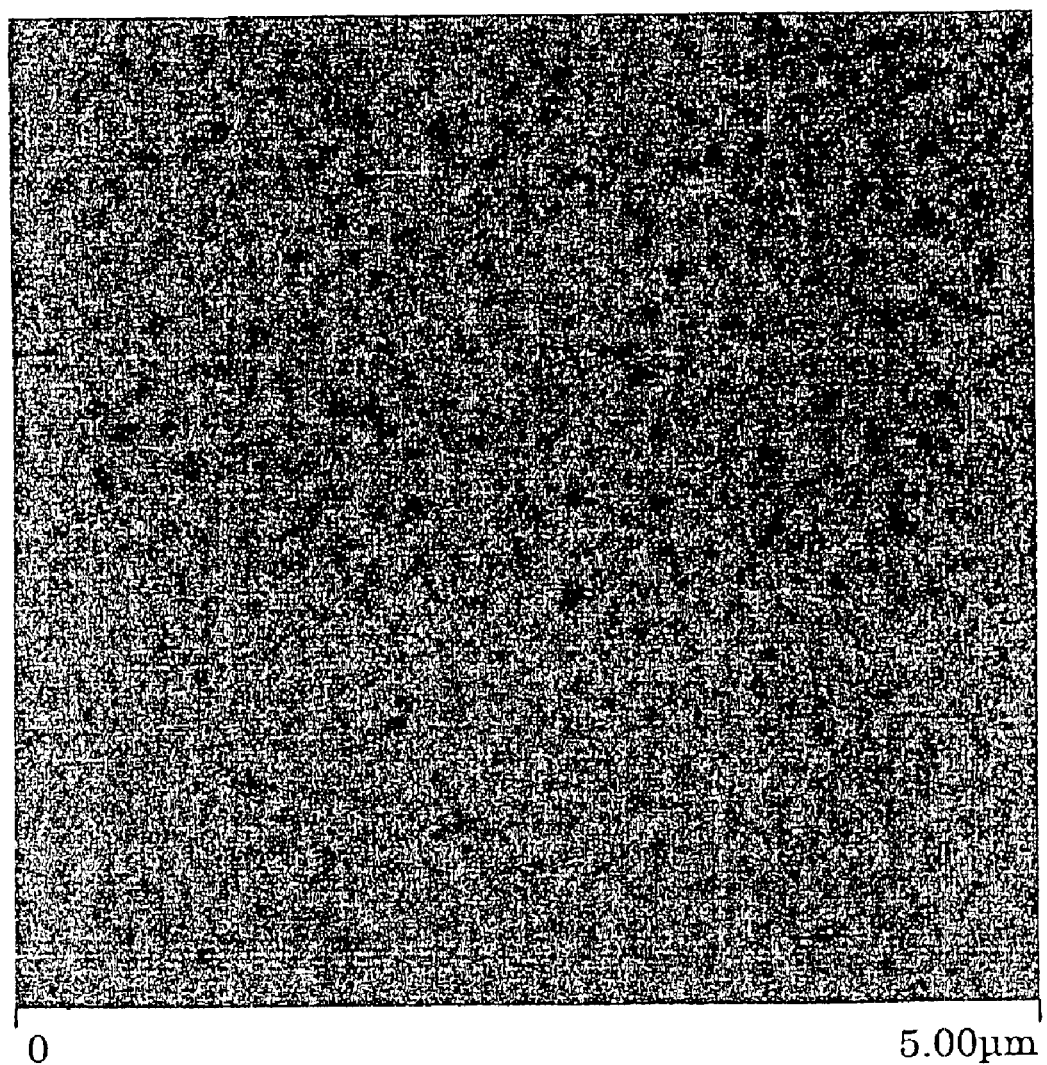
FIG. 12 shows an MFM image obtained by observing a surface of a magnetic film alternately stacked with layers containing oxygen and layers containing no oxygen after AC demagnetization with MFM (magnetic force microscope).

Subsequently, the magnetic film was subjected to AC (alternate current) demagnetization, and then the surface of the magnetic film was observed with a magnetic force microscope (MFM). FIG. 12 shows an MFM image obtained by the observation with MFM. The magnetic film observed in this embodiment was a magnetic film which was obtained by stopping the sputtering at the point of time at which two layers containing oxygen were formed in the magnetic film. For the purpose of comparison, FIG. 13 shows an MFM image of a surface of a magnetic film formed without interrupting the sputtering operation during the film formation.

Figure 13:
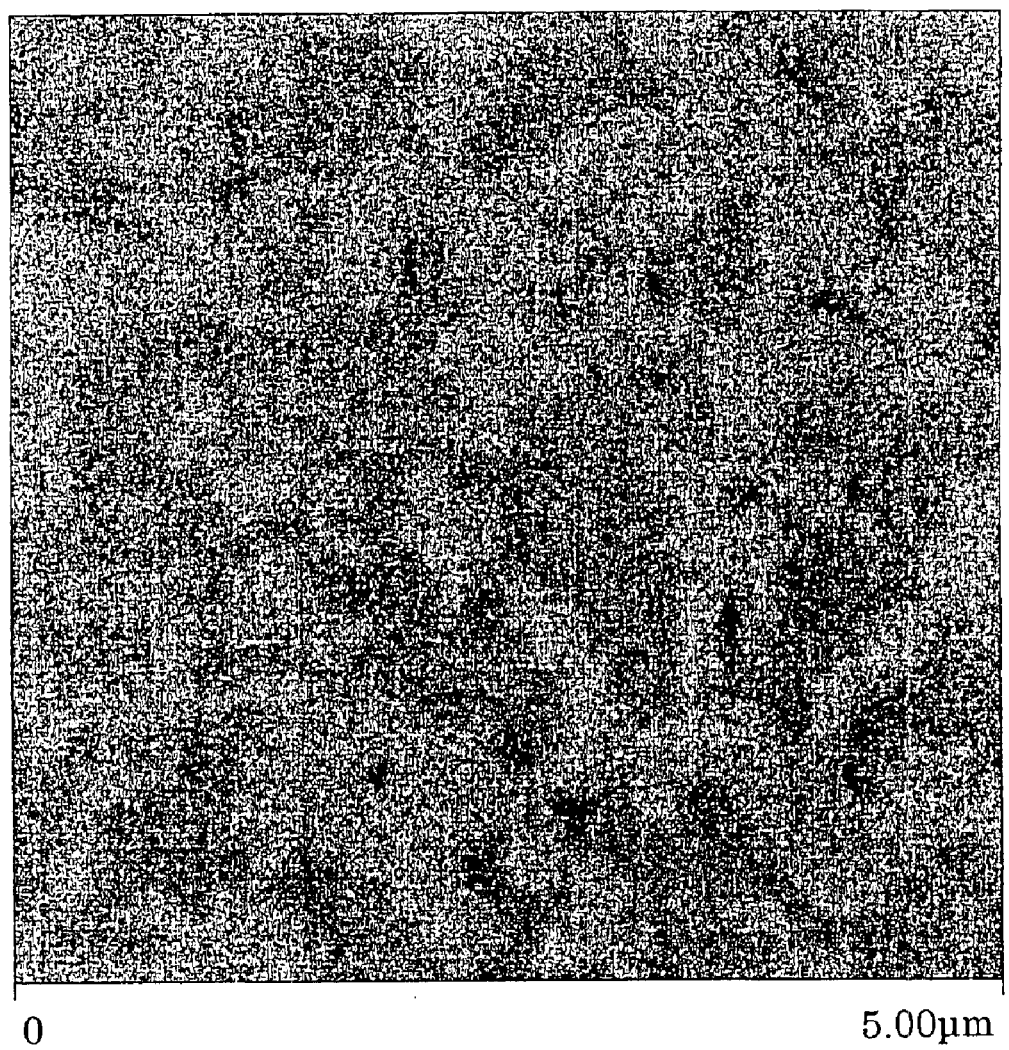
FIG. 13 shows an MFM image obtained by observing a surface of a conventional magnetic film containing no oxygen after AC demagnetization with MFM.

In the MFM images shown in FIGS. 12 and 13, the lightness and the darkness indicate the intensity of the magnification of the magnetic film. In the respective drawings, it is considered that each of the dark portion (black area) and the light portion (white area) indicates the minimum unit of inversion of magnetization. In the MFM image shown in FIG. 12, the size of each of the dark portion and the light portion in the lightness and the darkness was extremely small, and the dimension thereof was about 80 nm in average. According to this fact, it is considered that the unit of inversion of magnetization is small in such a magnetic film, and the minute magnetic domain can be formed therein. On the other hand, in the MFM image shown in FIG. 13, the size of each of the dark portion and the light portion was large, and the dimension thereof was not less than 200 nm in average. It is considered to be difficult to form the minute magnetic domain in such a magnetic film. As described above, the unit of inversion of magnetization of the magnetic film can be made small by repeating the step of forming the film and the step of being left to stand to form the film so that the areas having high oxygen concentrations are formed intermittently in the layered form in the magnetic film when the magnetic film is formed.

Subsequently, a lubricant was applied onto the surface of the magnetic disk based on the use of the magnetic recording medium having the magnetic characteristics as described above, and thus the magnetic disk was completed. A plurality of magnetic disks were manufactured in accordance with the same process, and they were coaxially incorporated into the magnetic recording apparatus shown in FIGS. 2 and 3 in the same manner as in the first embodiment. The magnetic recording apparatus as described above was used to record and reproduce information so that the recording and reproduction characteristics of the magnetic disk were evaluated. During the recording and the reproduction, the distance between the magnetic head surface and the magnetic film was maintained to be 12 nm. A signal (700 kFCI) corresponding to 40 Gbits/inch$^2$ was recorded on the magnetic disk to evaluate S/N of the disk. As a result, a reproduction output of 34 dB was obtained. On the other hand, in the case of a magnetic disk manufactured without forming the distribution of the oxygen concentration in a magnetic film, the noise was increased by about 5 dB over the entire frequency area. Thus, the effect to reduce the noise was obtained by forming the areas having the high oxygen concentrations in the magnetic film as described above.

Subsequently, a definite pattern was recorded on the magnetic disk, and the fluctuation of the edge of the magnetic domain formed in the magnetic film was measured with a time interval analyzer. As a result of the measurement, the fluctuation was successfully reduced to be not more than $\frac{1}{10}$ as compared with a magnetic disk having no oxygen concentration distribution in a magnetic film. Further, the error rate or defect rate of the magnetic disk was measured. As a result, a value of not more than $1\times10^{-5}$ was obtained when no signal processing was performed. The magnetization state of the recorded portion was observed with a magnetic force microscope (MFM). As a result, the zigzag pattern peculiar to the magnetization transition area was not observed. It is considered the noise level was successfully reduced thereby.

In this embodiment, the surface of the halfway formed magnetic film was naturally oxidized with oxygen as the impurity contained in the atmosphere by temporarily interrupting the film formation when the magnetic film was formed. However, the surface may be positively oxidized by allowing the halfway formed magnetic film to be left to stand in an oxygen atmosphere or in an oxygen-containing atmosphere after the interruption of the film formation. In this procedure, the oxidation of the surface of the magnetic film is further facilitated, and it is possible to further increase the oxygen concentration. Accordingly, it is possible to further reduce the fluctuation of the edge of the magnetic domain formed in the magnetic film.

Figure 14:
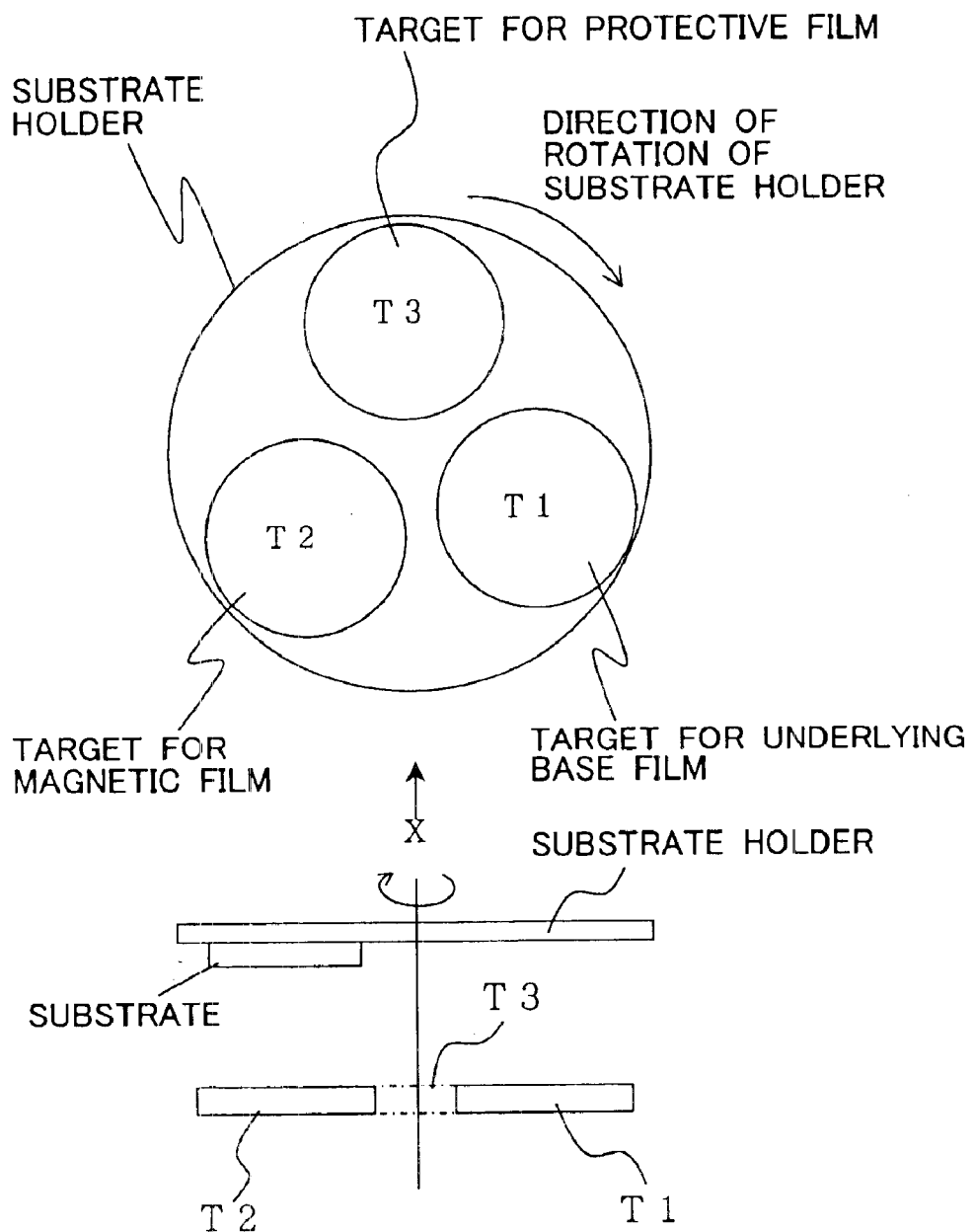
FIG. 14 shows a plan view schematically illustrating the positional relationship between targets and a substrate of a sputtering apparatus of the substrate rotation type, and a schematic sectional view in which the sputtering apparatus is viewed in the direction of X.

The magnetic film, which is constructed by alternately stacking the layers containing oxygen and the layers containing no oxygen, can be also formed by using a sputtering apparatus of the substrate rotation type. In the case of the sputtering apparatus of the substrate rotation type, the substrate holder and the targets are usually arranged as shown in a schematic plan view in FIG. 14. The respective target materials T1 to T3 shown in FIG. 14 are target materials, for example, for the underlying base film, the magnetic film, and the protective film formed on the substrate. When the magnetic film is formed, the target for the magnetic film is subjected to the sputtering while rotating the substrate holder at a high velocity so that the magnetic film is formed on the substrate installed to the substrate holder. When the magnetic film, which is constructed by alternately stacking the layers containing oxygen and the layers containing no oxygen, is formed by using the sputtering apparatus as described above, for example, the number of revolutions of the substrate holder may be lowered during the film formation. When the number of revolutions of the substrate holder is lowered, it takes a long period of time to enter an electrically discharging area (area in which the film is formed) again after passing through the area. Therefore, the magnetic film is not formed during a period of the location outside the electrically discharging area, and the surface of the magnetic film is naturally oxidized. In the case of the sputtering apparatus as described above, it is unnecessary to temporarily stop the electric discharge when the magnetic film is formed. The magnetic film, which is constructed by alternately stacking the layers containing oxygen and the layers containing no oxygen, can be formed by only controlling the number of revolutions of the substrate holder.

Thirteenth Embodiment

In this embodiment, an artificial lattice film of Tb/Fe/Co as a magnetic film was formed in accordance with a method different from that used in the twelfth embodiment to manufacture a magnetic recording medium having the same stacked structure as that shown in FIG. 8. A method for forming the magnetic film will be explained below.

Method for Forming Magnetic Film

The multi-source co-sputtering method based on three sources of Tb, Fe, and Co was used as the method for forming the magnetic film in the same manner as in the twelfth embodiment. The film thickness of each of the layers is Fe (1 nm)/Co (0.1 nm)/Tb (0.2 nm). The film thickness of each of the layers can be precisely controlled to have a desired value by combining the velocity of revolution of the substrate and the electric power introduced during the sputtering. In this embodiment, the introduced DC electric power was 0.3 kW for the formation of the film of Tb, 0.15 kW for the formation of the film of Co, and 0.7 kW for the formation of the film of Fe. The number of revolutions of the substrate was 30 rpm. The electric discharge gas pressure during the sputtering was 3 mTorr (about 399 mPa). High purity Ar gas was used for the electric discharge gas. The sputtering operation was temporarily interrupted at the point of time at which the Tb layer was formed to naturally oxidize the surface of the formed Tb layer. The natural oxidation in this procedure is based on the oxidation with oxygen contained as an impurity in the high purity Ar gas used as the electric discharge gas. The reason whey the Tb layer was oxidized is that Tb tends to be oxidized most promptly among Fe, Tb, and Co. Thus, the artificial lattice film was formed to have a total thickness of about 40 nm by periodically stacking stacked units each composed of Fe (1 nm)/Co (0.1 nm)/Tb (0.2 nm). The magnetic film was observed TEM. As a result, it was revealed that the artificial lattice film composed of Fe (1 nm)/Co (0.1 nm)/Tb (0.2 nm) having the desired film thickness was obtained.

Subsequently, magnetic characteristics of the magnetic recording medium provided with the magnetic film as described above were measured. According to an M-H loop measured by the measurement with VSM, both of the rectangularity ratios S, S* were 1.0, and thus good rectangularity was obtained. The coercivity Hc was 3.9 kOe. The perpendicular magnetic anisotropy energy in the direction perpendicular to the substrate possessed by the magnetic film was $7 \times 10^6$ erg/cm$^3$. The volume of activation of the magnetic recording medium was measured to determine the value of KuV/kT. As a result, the value of KuV/kT was 400. This fact indicates that the magnetic film is formed of a material which is excellent in thermal stability with small thermal fluctuation and small thermal demagnetization.

Subsequently, a lubricant was applied onto the surface of the magnetic disk based on the use of the magnetic recording medium having the magnetic characteristics as described above, and thus the magnetic disk was completed. A plurality of magnetic disks were manufactured in accordance with the same process, and they were coaxially incorporated into the magnetic recording apparatus shown in FIGS. 2 and 3 in the same manner as in the first embodiment. The magnetic recording apparatus as described above was driven to record and reproduce information so that the recording and reproduction characteristics of the magnetic disk were evaluated. During the recording and the reproduction, the distance between the magnetic head surface and the magnetic film was maintained to be 12 nm. A signal (700 kFCI) corresponding to 40 Gbits/inch$^2$ was recorded on the magnetic disk to evaluate S/N of the disk. As a result, a reproduction output of 36 dB was obtained. Further, the error rate or defect rate of the disk was measured. As a result, a value of not more than $1 \times 10^{-5}$ was obtained when no signal processing was performed.

In this embodiment, the distribution of oxygen was formed in the magnetic film with oxygen or water as the impurity contained in the high purity Ar gas atmosphere by repeatedly performing the operation for temporarily interrupting the sputtering in the high purity Ar gas atmosphere (in the residual gas). However, it is also possible to form a distribution of nitrogen in the magnetic film. In this case, it is most preferable that the halfway formed magnetic film is naturally nitrided by temporarily interrupting the sputtering operation in a nitrogen-containing atmosphere, because the amount of nitrogen in the residual gas is smaller than those of water and oxygen.

Fourteenth Embodiment

Figure 15:
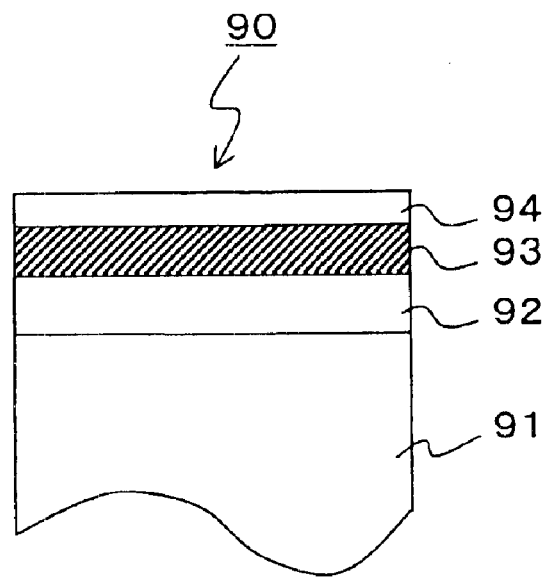
FIG. 15 schematically shows a cross-sectional structure of a magnetic recording medium manufactured in an embodiment.

In this embodiment, a magnetic recording medium according to the third aspect of the present invention was manufactured. The cross-sectional structure of the magnetic recording medium is shown in FIG. 15. In FIG. 15, an information-recording film 93 has the structure in which amorphous alloy films based on the Tb—Co—Fe system and Si films are alternately stacked. A method for producing the magnetic recording medium 90 will be explained below.

Preparation of Substrate

At first, a glass substrate having a diameter of about 2.5 inches (about 6.35 cm) was prepared as the substrate 91. The substrate used in this embodiment is an example. A disk substrate having any size may be used, and a metal substrate such as Al or Al alloy may be used. The effect of the present invention is not affected by the material quality and the size of the substrate to be used. Further, it is also allowable to use a substrate comprising an NiP layer formed on a substrate of glass, Al, or Al alloy by means of the plating method or the sputtering method.

Formation of Underlying Base Film

Subsequently, a silicon nitride film was formed as the underlying base film 92 having a film thickness of 50 nm on the substrate 91 by means of the RF magnetron sputtering method. Silicon was used for the target material, and an Ar—N$_2$ mixed gas (Ar/N$_2$ partial pressure ratio: 90/10) was used for the electric discharge gas. The pressure during the sputtering was 3 mTorr (about 399 mPa), and the introduced RF electric power was 1 kW/150 mm$\phi$. The sputtering was performed at the room temperature.

The underlying base film 92 makes it possible to improve the adhesive performance between the substrate 91 and the information-recording film 93, it has the function as the nucleation site when a magnetic field is applied from the outside to the information-recording film 93 to form the magnetic domain, and it has the effect as the obstacle for the magnetic wall movement. Such an effect not only depends on the material for constructing the underlying base film 92 but also depends on the condition for the film formation. The material for the underlying base film 9.2 is not limited to silicon nitride as well. It is also allowable to use a metal film such as Ni—P, Al, Al—Cr alloy, Cr, and Cr—Ti alloy. Alternatively it is also allowable to use an inorganic compound such as AlN, ZrO$_2$, and BN.

Formation of Information-Recording Film

Subsequently, a film constructed by alternately stacking amorphous alloy films based on the Tb—Fe—Co system and Si films was formed as the information-recording film 93 on the underlying base film 92 without breaking the vacuum after the formation of the underlying base film 92. The composition of the amorphous alloy film based on the Tb—Fe—Co system for constructing the information-recording film 93 is Tb$_{15}$Fe$_{75}$Co$_{10}$ in which the sub-lattice magnetization of the transition metal is dominant. The RF magnetron sputtering method was used for the formation of the information-recording film 93. In the sputtering for the amorphous alloy film based on the Tb—Fe—Co system, a Tb—Fe—Co alloy was used for the target material, and pure Ar was used for the electric discharge gas. In the sputtering for the Si film, Si was used for the target material, and pure Ar was used for the electric discharge gas.

When the information-recording film 93 was formed, the operation, in which Tb—Fe—Co was formed to have a film thickness of 5 nm and then the Si film was formed to have a film thickness of 0.2 nm, was repeatedly performed to alternately stack the Tb—Fe—Co films and the Si films. The film formation was performed until the film thickness of the Tb—Fe—Co films was 20 nm in total. The electric discharge gas pressure during the sputtering was 10 mTorr (about 1.33 Pa), and the introduced RF electric power was 1 kW/150 mm$\phi$.

The coercivity of the obtained information-recording film 93 was 3.5 kOe (about 278.53 kA/m), the saturation magnetization was 250 emu/ml, and the perpendicular magnetic anisotropy energy was $5 \times 10^6$ erg/cm$^3$.

Formation of Protective Film

Finally, a C (carbon) film was formed to have a film thickness of 5 nm as the protective film 94 on the information-recording film 93 by means of the ECR sputtering method. C was used for the target material, and Ar was used for the electric discharge gas. The pressure during the sputtering was 0.3 mTorr, and the introduced microwave electric power was 0.7 kW. An RF bias voltage of 500 W was applied in order to draw the plasma excited by the microwave. The hardness of the manufactured protective film 94 was measured with a hardness tester produced by Hysitron. As a result, the hardness was 21 GPa. According to a result obtained by the Raman spectroscopy, it was revealed that the sp3 bond played a key role.

When the protective film 94 was formed, Ar was used for the sputtering gas. However, the film may be formed with a gas containing nitrogen. When the gas containing nitrogen is used, then the grains become fine and minute, the obtained C film is densified, and it is possible to further improve the protective performance. As described above, the film quality of the protective film greatly depends on the sputtering condition and the electrode structure. Therefore, the conditions described above are not absolute. It is desirable that the conditions are appropriately adjusted depending on the apparatus to be used.

Measurement of Magnetic Characteristics

Thus, the magnetic recording medium 90 having the stacked structure shown in FIG. 15 was manufactured, and magnetic characteristics of the obtained magnetic recording medium 90 were measured. An M-H loop was obtained by the measurement with VSM. According to the obtained results, the rectangularity ratios S, S* were 1.0. It was revealed that good rectangularity was obtained. The coercivity Hc was 3.5 kOe (about 278.53 kA/m), and the saturation magnetization Ms was 250 emu/cm$^3$. The perpendicular magnetic anisotropy energy in the direction perpendicular to the substrate surface was $5 \times 10^6$ erg/cm$^3$. The volume of activation of the information-recording film of the magnetic recording medium was measured to determine the value of KuV/kT. As a result, the value was 300. This fact indicates that the information-recording film of the magnetic recording medium is excellent in thermal stability.

Figure 16:
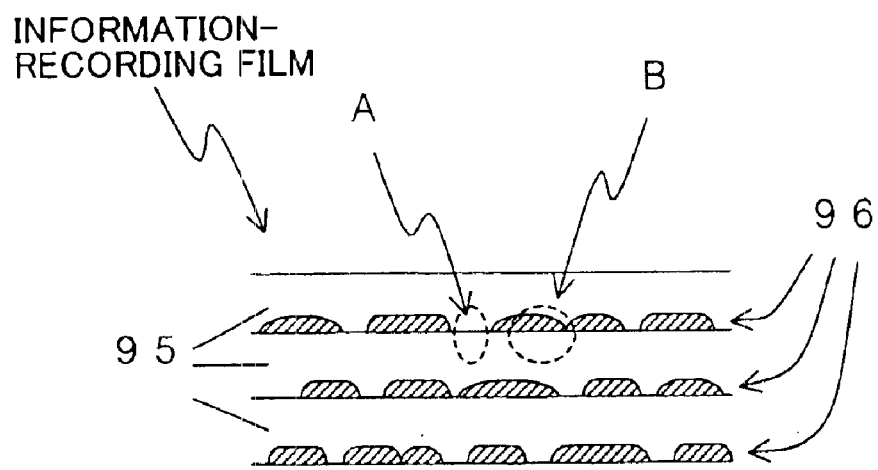
FIG. 16 schematically shows a cross-sectional structure of an information-recording film obtained by TEM observation.

Subsequently, the cross-sectional structure of the information-recording film of the magnetic recording medium was observed with a transmission electron microscope (TEM). FIG. 16 schematically shows an observed situation. As a result of the observation, it is appreciated that the Si films 96 and the Tb—Fe—Co films 95 are alternately stacked. It was also revealed from the TEM observation that the Tb—Fe—Co film was amorphous.

Magnetic Recording Apparatus

Subsequently, a lubricant was applied onto the surface of the magnetic recording medium, and thus the magnetic disk was completed. A plurality of magnetic disks were manufactured in accordance with the same process, and they were coaxially incorporated into the magnetic recording apparatus shown in FIGS. 2 and 3 in the same manner as in the first embodiment. The magnetic recording apparatus as described above was used to record and reproduce information so that recording and reproduction characteristics of the magnetic disk were evaluated. The distance between the magnetic head surface and the magnetic film was maintained to be 12 nm during the recording and the reproduction. A signal (700 kFCI) corresponding to 40 Gbits/inch$^2$ (about 6.20 Gbits/cm$^2$) was recorded on the magnetic disk to evaluate S/N of the magnetic disk. As a result, a reproduction output of 34 dB was obtained. The signal was recorded in the same manner as described above on a magnetic recording medium including an information-recording film constructed with only an amorphous alloy film based on the Tb—Fe—Co system to evaluate S/N. As a result, the noise was increased by about 5 dB over the entire frequency area.

Subsequently, a definite pattern was recorded on the magnetic disk of the present invention, and the fluctuation of the edge of the magnetic domain formed in the information-recording film was measured with a time interval analyzer. As a result of the measurement, the fluctuation was successfully reduced to be not more than $\frac{1}{10}$ as compared with a conventional magnetic disk including an information-recording film composed of only an amorphous alloy film based on the Tb—Fe—Co system. Further, the error rate or defect rate of the magnetic disk was measured. As a result, a value of not more than $1 \times 10^{-5}$ was obtained when no signal processing was performed. The magnetization state of the recorded portion was observed with a magnetic force microscope (MFM). As a result, the zigzag pattern peculiar to the magnetization transition area was not observed. It is considered the noise level was successfully reduced thereby.

In this embodiment, Si was used as the material for the non-magnetic film for constructing the information-recording film. However, the same or equivalent effect can be also obtained, for example, even when another element such as Cr, Nb, Ti, Ta, Al, Pd, Rh, Zr, Re, Mo, W, Ir, V, or Cu is used in place of Si. The corrosion resistance of the information-recording film was successfully improved by using such the material as described above, for the following reason. That is, the non-magnetic film, which is stacked alternately with respect to the magnetic film, can suppress the diffusion of oxygen contained as impurity in the magnetic film.

In this embodiment, the amorphous ferrimagnetic film based on the Tb—Fe—Co system was used for the magnetic film for constructing the information-recording film. However, the same or equivalent effect was also obtained, for example, even when Dy, Ho, or Gd was used in place of Tb. Among these elements, the largest perpendicular magnetic anisotropy is obtained with Tb. The magnitude of the perpendicular magnetic anisotropy is changed in an order of Dy>Ho>Gd. A plurality of rare earth elements may be used in combination, i.e., for example, alloys composed of two elements such as Tb—Gd, Tb—Dy, Tb—Ho, Gd—Dy, Gd—Ho, and Dy—Ho and alloys composed of three or more elements, in place of the construction of the rare earth element for constructing the magnetic film with only Tb. Accordingly, it is possible to control the perpendicular magnetic anisotropy energy. It is preferable that the composition of the rare earth element is not less than 20 at % and not more than 30 at % to form the perpendicularly magnetizable film, for the following reason. That is, when such a range is adopted, it is possible to obtain a ferrimagnetic member having an easy axis of magnetization in the direction perpendicular to the substrate surface.

The F—Co alloy was used as the transition metal. However, it is also allowable to use alloys such as Fe—Ni and Co—Ni. As for such alloys, the anisotropy energy is decreased in an order of Fe—Co>Fe—Ni>Co—Ni.

Fifteenth Embodiment

In this embodiment, a magnetic recording medium having the same stacked structure as that of the magnetic recording medium manufactured in the fourteenth embodiment (see FIG. 15) was manufactured except that an artificial lattice film of Tb/Fe/Co was used in place of the amorphous alloy film based on the Tb—Fe—Co system as the magnetic film for constructing the information-recording film, and an Nb film was used in place of the Si film. The method for forming those other than the information-recording film is the same as that used in the fourteenth embodiment, explanation of which is omitted. A method for forming the information-recording film having the structure constructed by alternately stacking the Tb/Fe/Co artificial lattice films and the Nb films will be explained below.

Method for Forming Information-Recording Film

When the Tb/Fe/Co artificial lattice film in the information-recording film was formed, the DC multi-source co-sputtering method based on three sources of Tb, Fe, and Co was used. The film thickness of each of the layers is Fe (1 nm)/Co (0.1 nM)/Tb (0.2 nm). The film thickness of each of the layers can be precisely controlled to have a desired value by combining the velocity of revolution of the substrate and the electric power introduced during the sputtering. In this embodiment, the introduced DC electric power was set to be 0.3 kW for forming the layer of Tb, 0.15 kW for forming the layer of Co, and 0.7 kW for forming the layer of Fe. The number of revolutions of the substrate was 30 rpm. The electric discharge gas pressure during the sputtering was 3 mTorr, and high purity Ar gas was used for the electric discharge gas. When the Nb film was formed, the DC sputtering method was used. The electric discharge gas pressure during the sputtering was 3 mTorr (about 399 mPa), the number of revolutions of the substrate was 30 rpm, and the introduced DC electric power was 0.7 kW. Nb was used for the target, and pure Ar was used for the electric discharge gas.

When the information-recording film was formed, then the artificial lattice film of Fe (1 nm)/Co (0.1 nm)/Tb (0.2 nm) was formed to have a film thickness of about 4 nm, and then the Nb film was formed to have a film thickness of about 0.3 nm. The film was formed until the entire film thickness of the artificial lattice film was 20 nm by repeatedly performing the formation of the Tb/Fe/Co artificial lattice film and the formation of the Nb film. The Nb film, which is formed on the Tb/Fe/Co artificial lattice film, covers the film surface of the Tb/Fe/Co artificial lattice film in an island form as viewed in a plan view. The same or equivalent effect is also obtained even when Nb as a non-magnetic element is dispersed in the Fe layer of the Tb/Fe/Co artificial lattice film to construct the film, in place of the construction by alternately stacking the Tb/Fe/Co artificial lattice film and the Nb film.

When the Tb/Fe/Co artificial lattice film as described above is manufactured, the degree of vacuum at the initial evacuation is important. In this embodiment, the film was manufactured after effecting the evacuation up to $4 \times 10^{-9}$ Torr. The values as described above are not absolute, which change depending on, for example, the system of the sputtering. In this embodiment, the film was manufactured by means of the DC magnetron sputtering method. However, the film formation may be carried out by using the RF magnetron sputtering method and the sputtering method (ECR sputtering method) based on the use of the electron cyclotron resonance.

When the artificial lattice film as described above is used for the magnetic film in the information-recording film, then it is possible to increase the perpendicular magnetic anisotropy energy as compared with a case in which an amorphous alloy film based on the Tb—Fe—Co system is used, and it is possible to improve the thermal stability. The artificial lattice film exhibits substantially the same magnetic characteristics as those of a ferrimagnetic member composed of a transition metal such as Fe and Co and a rare earth element such as Tb. The magnetization of such an artificial lattice film appears as the difference between the magnetization of the transition metal thin film layer and the magnetization of the rare earth element thin film layer. The artificial lattice film manufactured in this embodiment is an artificial lattice film in which the magnetization of the transition metal is dominant.

Measurement of Magnetic Characteristics

Subsequently, magnetic characteristics of the magnetic recording medium provided with the information-recording film composed of the Tb/Fe/Co artificial lattice film and the Nb film were measured. An M-H loop was obtained by the measurement with VSM (Vibration Sample Magnetometer). According to the obtained results, both of the rectangularity ratios S, S* were 1.0. It was revealed that good rectangularity was obtained. The coercivity Hc was 3.9 kOe (about 310.362 kA/m). As for the magnetic anisotropy energy of the magnetic film, the perpendicular magnetic anisotropy energy in the direction perpendicular to the substrate surface was $1 \times 10^7$ erg/cm$^3$. The volume of activation V of the magnetic recording medium was measured to determine the value of KuV/kT as the index for the thermal stability of the information-recording film. As a result, the value of KuV/kT was 400. This fact indicates that the information-recording film is formed of a material which is excellent in thermal stability with small thermal fluctuation and small thermal demagnetization.

Further, the cross-sectional structure of the information-recording film was observed with a high resolution transmission electron microscope (high resolution TEM). As a result, it was revealed that the information-recording film had the structure in which the artificial lattice film of Fe (1 nm)/Co (0.1 nm)/Tb (0.2 nm) and the Nb film were periodically stacked with the desired film thickness.

Subsequently, a lubricant was applied onto the surface of the magnetic recording medium, and thus the magnetic disk was completed. A plurality of magnetic disks were manufactured in accordance with the same process, and they were coaxially incorporated into the magnetic recording apparatus shown in FIGS. 2 and 3 in the same manner as in the first embodiment. The magnetic recording apparatus as described above was used to record and reproduce information. During the recording and the reproduction, the distance between the magnetic head surface and the information-recording film was maintained to be 12 nm. A signal (700 kFCI) corresponding to 40 Gbits/inch$^2$ (about 6.20 Gbits/cm$^2$) was recorded on the magnetic disk to evaluate S/N of the disk. As a result, a reproduction output of 36 dB was obtained. The error rate or defect rate of the magnetic disk was measured. As a result, a value of not more than $1 \times 10^{-5}$ was obtained when no signal processing was performed.

This embodiment is illustrative of the case in which the artificial lattice film based on the Tb/Fe/Co system is used. However, the same or equivalent effect is obtained even when one element of Gd, Dy, and Ho is used other than Tb, or even when an alloy such as Gd—Tb, Gd—Dy, Gd—Ho, Tb—Dy, and Tb—Ho is used. The artificial lattice film was constructed by using the two-layered film of Fe/Co as the transition metal. However, it is also possible to obtain a magnetic film having equivalent characteristics by using an alternately stacked multilayered film composed of an alloy such as Fe—Co, Fe—Ni, and Co—Ni and a rare earth element such as Tb.

Sixteenth Embodiment

In this embodiment, three types of magnetic recording media were produced in the same manner as in the fifteenth embodiment except that the electric discharge gas pressure, which was used when the information-recording film was formed, was changed to have three different values, i.e., 5 mTorr (about 665 mPa), 10 mTorr (about 1.33 Pa), and 20 mTorr (about 2.66 Pa). The coercivities of the information-recording films of the respective magnetic recording media were measured. As a result, any one of them was 3.9 kOe (about 308.1 kA/m).

δM Plot

The δM plot was obtained for the obtained three types of magnetic recording media. A method for measuring the δM plot will be explained below. At first, the M-H curve of the information-recording film of the magnetic recording medium was determined with VSM. The remanence (remanent magnetization) was determined from the obtained M-H curve. Subsequently, the DC (direct current) demagnetization remanent magnetization curve Id(H) (DC demagnetization remanence curve) and the isothermal remanent magnetization curve Ir(H) (isothermal remanence magnetization curve) were determined. The following calculation was made with the obtained Id(H) and Ir(H):

$$\delta M(H) = Id(H) - [1 - 2Ir(H)]$$

The value of δM(H) was plotted with respect to the applied magnetic field H.

Figure 17:
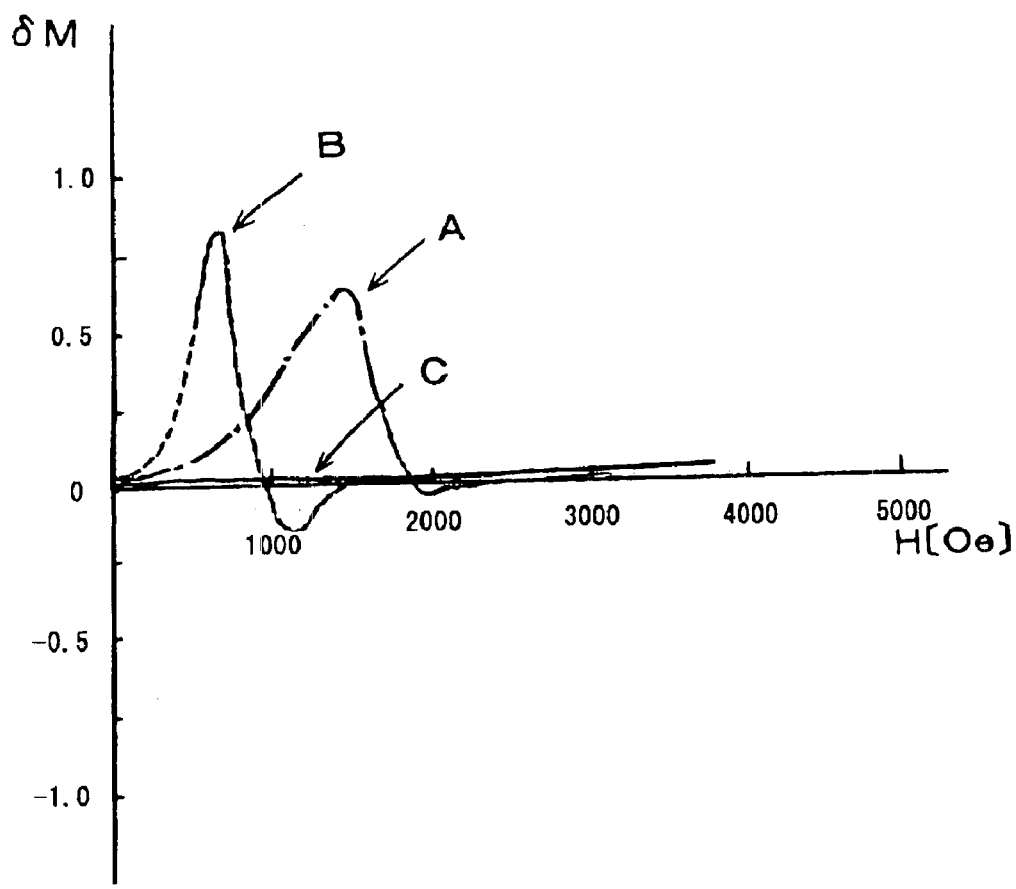
FIG. 17 shows results of measurement for the δM plot for information-recording films formed with different electric discharge gas pressures in a sixteenth embodiment.

Obtained δM plot curves are shown in FIG. 17. According to the δM plot curves shown in FIG. 17, the following fact was revealed for the magnetic recording medium for which the information-recording film was manufactured with the electric discharge gas pressure of 20 mTorr. That is, δM(H) remained zero without depending on the magnetic field intensity H, and no peak was observed on the δM plot curve. On the other hand, in the case of the magnetic recording media having the information-recording films formed at the electric discharge gas pressures of 10 mTorr and 5 mTorr, peaks were obtained on the δM plot curves at 800 Oe (about 63.66 kA/m) and 2.4 kOe (about 190.99 kA/m). According to this fact, it is appreciated that the strong exchange coupling force is exerted on the information-recording film in each of the magnetic recording-media having the information-recording films formed at the electric discharge gas pressures of 10 mTorr and 5 mTorr. According to the results as described above, it has been revealed that the exchange coupling can be remarkably lowered when the information-recording film is formed at a high electric discharge gas pressure, probably for the following reason. That is, when the gas pressure during the sputtering is high, then the sputtering particles are clustered, and the bulk density of the information-recording film is lowered.

Besides the information-recording film is formed by changing the electric discharge gas pressure, the peak position on the δM plot curve can be also controlled even when the film thickness of the Nb layer formed in the information-recording film is changed. However, if the total film thickness of the Nb layer for constructing the information-recording film is not less than 2 nm, the magnetization exhibited by the information-recording film suddenly disappears. This fact indicates that any optimum film thickness is present for the Nb film in the information-recording film. Alternatively, Nb may be added as an alloy to the Fe layer, Co layer, and the layer of the rare earth element, in place of the formation of Nb in the layered form in the information-recording film. The decrease in exchange coupling force caused by the film formation at a high electric discharge gas pressure is not necessarily caused in only the film formation of the information-recording film constructed by alternately stacking the magnetic films and the non-magnetic films. For example, even when an amorphous alloy film (for example, a Tb—Fe—Co amorphous alloy film), which is composed of a single layer, is formed at a high electric discharge gas pressure, then the peak position on the δM plot curve for the amorphous alloy film can be deviated toward the low magnetic field side, or the peak is successfully allowed to disappear. Accordingly, the exchange coupling force of the amorphous alloy film can be lowered.

Subsequently, a lubricant was applied onto the surface of the magnetic recording medium having the information-recording film formed at the electric discharge gas pressure of 20 mTorr, and thus the magnetic disk was completed. A plurality of magnetic disks were manufactured in accordance with the same process, and they were coaxially incorporated into the magnetic recording apparatus shown in FIGS. 2 and 3 in the same manner as in the first embodiment. The magnetic recording apparatus as described above was used to record and reproduce information. During the recording and the reproduction, the distance between the magnetic head surface and the information-recording film was maintained to be 12 nm. A signal (800 kFCI) corresponding to 50 Gbits/inch$^2$ was recorded on the magnetic disk to evaluate S/N of the disk. As a result, a reproduction output of 36 dB was obtained. The error rate or defect rate of the magnetic disk was measured. As a result, a value of not more than $1 \times 10^{-5}$ was obtained when no signal processing was performed.

The magnetic recording medium according to the present invention and the magnetic recording apparatus provided with the same have been explained with reference to the embodiments described above. However, the present invention is not limited thereto, which may include a variety of improved embodiments and modified embodiments.

For example, a Pt—Co alloy film may be formed on the information-recording film in order to improve S/N of the magnetic recording medium manufactured in each of the tenth to fifteenth embodiments. When the Pt—Co alloy film is formed, for example, the two-source co-sputtering method based on two source targets of Pt and Co can be used. It is also allowable to use the RF magnetron sputtering method, the DC magnetron sputtering method, and the ECR sputtering method based on the use of the resonance absorption method, other than the two-source co-sputtering method.

In the tenth to sixteenth embodiments, the magnetic recording medium of the perpendicular magnetic recording type was produced by constructing the information-recording film (or the magnetic film) by using the perpendicularly magnetizable film having the easy axis of magnetization in the direction perpendicular to the substrate surface. However, a magnetic recording medium of the in-plane magnetic recording type can be also constructed by using the in-plane magnetizable film used for the information-recording film of the magnetic recording medium as described in each of the eighth and ninth embodiments.

The stacked structure of the magnetic recording medium is not limited to those described in the embodiments. For example, it is also possible to form a soft magnetic film composed of a soft magnetic material. Such a soft magnetic film is preferably formed so that the information-recording film intervenes between the soft magnetic film and the magnetic head. It is desirable that the soft magnetic film is formed without making contact with the layer having magnetization of the layers for constructing the magnetic recording medium. For example, in the case of the first to seventh embodiments described above, it is desirable that the soft magnetic film is formed without making contact with the information-recording film, the ferromagnetic film, and the first to third magnetic films with the nonmagnetic layer intervening therebetween. Accordingly, a magnetic circuit is formed between the magnetic head and the soft magnetic film during the recording of information, and the magnetic field is applied from the magnetic head to the magnetic recording film in only the direction perpendicular to the film surface. Further, the magnetic coupling is generated between the magnetic head and the soft magnetic film. Therefore, the magnetic field from the magnetic head is applied to only a narrow area of the information-recording film at a large magnetic field intensity. Therefore, it is possible to form fine and minute recording magnetic domains in the magnetic recording film. Those usable for the soft magnetic film as described above include, for example, magnetic materials such as NiFe, Fe—Ta—C, Fe—Hf—N, Al—Si—Fe, Gd—Fe, and Gd—Fe—Co.

Details of the structure of the magnetic recording apparatus (hard disk apparatus) are disclosed in U.S. Pat. No. 5,851,643. The contents of this document are incorporated herein by reference within a range of permission of the domestic laws and ordinances of the designated state or the selected state.

INDUSTRIAL APPLICABILITY

The magnetic recording medium according to the first aspect of the present invention comprises, as the information-recording film, the amorphous magnetic film which has the large volume of activation and which is excellent in thermal stability with small thermal demagnetization and small thermal fluctuation. Therefore, the magnetic recording medium according to the first aspect of the present invention is extremely suitable as the magnetic recording medium for the high density recording. Further, the magnetic recording medium according to the first aspect of the present invention is provided with the ferromagnetic film having the saturation magnetization larger than that of the amorphous magnetic film. Therefore, even when minute magnetic domains are formed in the amorphous magnetic film, then the amplified reproduced signal output can be obtained from the ferromagnetic film, and information can be reliably reproduced. Further, the amorphous magnetic film has the amorphous structure. Therefore, it is unnecessary to form any seed layer for controlling the crystalline orientation of the magnetic film. It is possible to simplify the stacked structure of the magnetic recording medium. Therefore, the magnetic recording medium of the present invention can be mass-produced in a large amount at a low price.

When the amorphous magnetic film is constructed with the artificial lattice film having the easy axis of magnetization in the direction perpendicular to the substrate surface, it is possible to provide the magnetic recording medium which has the larger magnetic anisotropy and which is excellent in thermal stability.

Further, the magnetic recording medium according to the first aspect of the present invention may comprise the magnetic wall movement control layer for suppressing the movement of the magnetic wall of the amorphous magnetic film of the magnetic wall movement type. Accordingly, the minute recording magnetic domain can be formed to have the desired edge shape in the amorphous magnetic film, and the edge position can be positioned highly accurately. Therefore, it is possible to reduce the fluctuation of the recording magnetic domain formed in the amorphous magnetic film, and it is possible to reliably reproduce information subjected to the high density recording.

In the magnetic recording medium according to the second aspect of the present invention, the pinning sites are formed in the dispersed manner in the magnetic film by containing the significant amount of at least one of oxygen and nitrogen in the magnetic film of the magnetic wall movement type such as the amorphous film. Therefore, the magnetic wall in the magnetic film is prevented from movement, and it is possible to form the recording magnetic domain highly accurately at the desired position in the magnetic film.

Even in the case of the minute recording magnetic domain, the edge of the magnetic domain can be formed to have the desired shape, and the edge position can be positioned highly accurately. Therefore, it is possible to reduce the fluctuation of the recording magnetic domain. Therefore, it is possible to record information at the super high density, and it is possible to reliably reproduce information subjected to the high density recording.

When the magnetic film is constructed with the ferrimagnetic material composed of the rare earth element-iron family element, it is possible to provide the magnetic recording medium which is excellent in thermal stability with small thermal demagnetization and small thermal fluctuation.

According to the production methods of the third and fourth aspects of the present invention, at least one of oxygen and nitrogen can be contained at the desired concentration in the magnetic film. Therefore, the production methods according to the third and fourth aspects of the present invention are extremely suitable as the method for producing the magnetic recording medium according to the second aspect of the present invention.

The magnetic recording medium according to the fifth aspect of the present invention comprises the information-recording film having the structure constructed by alternately stacking the magnetic films composed of the magnetic material and the non-magnetic films composed of the non-magnetic material having the film thickness of not more than 1 nm. The non-magnetic film is subjected to the dispersion in the island form in the film surface. Such an island-shaped non-magnetic film functions as the pinning site. Therefore, the magnetic wall in the information-recording film is prevented from movement. The recording magnetic domain formed in the information-recording film can be positioned highly accurately, and the position can be maintained in the stable manner.

Even in the case of the minute recording magnetic domain, the edge shape of the magnetic domain can be formed to be the desired shape. Further, the edge position can be positioned highly accurately. Therefore, it is possible to reduce the fluctuation of the recording magnetic domain. Therefore, it is possible to record information at the super high density, and it is possible to reliably reproduce information subjected to the high density recording. The magnetic recording apparatus according to the present invention makes it possible to reliably record information on the magnetic recording medium having the high coercivity. Therefore, the magnetic recording apparatus according to the present invention is extremely suitable as the next-generation magnetic recording apparatus for the super high density recording. It is possible to realize the areal recording density exceeding 40 Gbits/inch$^2$ (6.20 Gbits/cm$^2$).

What is claimed is:

1. A magnetic recording medium for reproducing information thereon with a magnetic head, the magnetic recording medium comprising:
   a substrate;
   an amorphous magnetic film which has an easy axis of magnetization in a direction perpendicular to a substrate surface and in which information is recorded; and
   a ferromagnetic film; wherein:
   the ferromagnetic film has an easy axis of magnetization in the direction perpendicular to the substrate surface, the ferromagnetic film has saturation magnetization larger than saturation magnetization of the amorphous magnetic film, the ferromagnetic film contacts with the amorphous magnetic film, and the ferromagnetic film is formed on a side closer to the magnetic head than the amorphous magnetic film; and
   wherein the amorphous magnetic film has a single layer film or an artificial lattice film, and is composed of an alloy comprising an iron family element and a rare earth element, the iron family element is at least one element selected from the group consisting of Fe, Co, and Ni, and the rare earth element is at least one element selected from the group consisting of Tb, Gd, Dy, and Ho.

2. The magnetic recording medium according to claim 1, wherein the sub-lattice magnetization of the ferrimagnetic material is rich in iron family elements.

3. The magnetic recording medium according to claim 1, wherein the amorphous magnetic film is an artificial lattice film, and the artificial lattice film has a structure in which one or more layers composed of an iron family element and one or more layers composed of a rare earth element are alternately stacked.

4. The magnetic recording medium according to claim 3, wherein the iron family element is at least one element selected from the group consisting of Fe, Co, and Ni, and the rare earth element is at least one element selected from the group consisting of Tb, Gd, Dy, and Ho.

5. The magnetic recording medium according to claim 3, wherein the layer composed of the iron family element includes a plurality of layers, and the plurality of layers have two layers which are composed of at least two elements selected from the group consisting of Fe, Co, and Ni.

6. The magnetic recording medium according to claim 3, wherein the layer composed of the iron family element is a thin film which is composed of an alloy comprising at least two elements selected from the group consisting of Fe, Co, and Ni.

7. The magnetic recording medium according to claim 1, wherein the ferromagnetic film is a layer which increases a magnetic flux generated from the amorphous magnetic film.

8. The magnetic recording medium according to claim 1, further comprising a magnetic wall movement control layer which suppress movement of a magnetic wall formed in the amorphous magnetic film.

9. The magnetic recording medium according to claim 8, wherein the magnetic wall movement control layer is composed of a magnetization rotation type magnetic material.

10. The magnetic recording medium according to claim 9, wherein the magnetic wall movement control layer is composed of an alloy which principally contains any one of materials of Co, partial oxidation product of Co, and Co—Cr alloy and which further contains at least one element selected from the group consisting of Pt, Pd, Ta, Nb, and Ti.

11. The magnetic recording medium according to claim 9, wherein the amorphous magnetic film, the ferromagnetic film, and the magnetic wall movement control layer have the same direction of easy axis of magnetization.

12. The magnetic recording medium according to claim 9, wherein a coercivity of the amorphous magnetic film is largest among coercivities of the amorphous magnetic film, the ferromagnetic film, and the magnetic wall movement control layer.

13. The magnetic recording medium according to claim 9, wherein saturation magnetization of the ferromagnetic film is largest among saturation magnetizations of the amorphous magnetic film, the ferromagnetic film, and the magnetic wall movement control layer.

14. The magnetic recording medium according to claim 9, wherein the amorphous magnetic film, the ferromagnetic film, and the magnetic wall movement control layer are stacked so that the amorphous magnetic film is positioned between the ferromagnetic film and the magnetic wall movement control layer, the ferromagnetic film is positioned on a side close to the magnetic head, and the magnetic wall movement control layer is positioned on a side far from the magnetic head.

15. The magnetic recording medium according to claim 1, wherein perpendicular magnetic anisotropy energy in a direction perpendicular to a substrate surface of the amorphous magnetic film is not less than $5 \times 10^6$ erg/cm$^3$.

16. The magnetic recording medium according to claim 1, wherein a magnetic domain is formed as recording information in the amorphous magnetic film, thermal stability of the amorphous magnetic film is represented by KuV/kT provided that Ku represents a magnetic anisotropy constant, V represents a volume of activation, k represents the Boltzmann's constant, and T represents a temperature, and the volume of activation V in the amorphous magnetic film is substantially equal to a volume of one magnetic domain formed in the amorphous magnetic film.

17. The magnetic recording medium according to claim 1, wherein the amorphous magnetic film has saturation magnetization of not less than 100 emu/cm$^3$, a coercivity of not less than 3 kOe, and a film thickness of not more than 100 nm.

18. The magnetic recording medium according to claim 7, wherein the ferromagnetic film is composed of a magnetic thin film principally containing a mixture of Co and oxide of Co or an alloy principally containing Co.

19. The magnetic recording medium according to claim 18, wherein the ferromagnetic film further contains at least one element selected from the group consisting of Cr, Pt, Pd, Ta, Nb, Si, and Ti.

20. The magnetic recording medium according to claim 7, wherein the ferromagnetic film is an alternately stacked multilayered film in which one or more layers composed of at least one element selected from the group consisting of Co, Ni, and Fe and one or more layers composed of at least one element selected from the group consisting of Pt, Pd, and Rh are alternately stacked.

21. The magnetic recording medium according to claim 7, wherein the ferromagnetic film is an alternately stacked multilayered film in which one or more alloy layers composed of at least one element selected from the group consisting of Co, Ni, and Fe and at least one element selected from the group consisting of Pt, Pd, and Rh, and one or more layers composed of at least one element selected from the group consisting of Pt, Pd, and Rh are alternately stacked.

22. The magnetic recording medium according to claim 1, wherein substantially no peak is present, or a magnetic field intensity to form a peak is not more than 30% of a coercivity of the amorphous magnetic film in a curve represented by δM(H) represented by the following expression:

$$\delta M(H) = Id(H) - [1 - 2Ir(H)]$$

provided that functions to represent isothermal remanent magnetization and DC demagnetization remanent magnetization with respect to an external magnetic field H for the amorphous magnetic film are Ir(H) and Id(H) respectively.

23. The magnetic recording medium according to claim 1, wherein the substrate is formed with a material selected from the group consisting of glass, resin, and Al alloy.

24. The magnetic recording medium according to claim 1, wherein a convex/concave texture is provided on a substrate surface.

25. The magnetic recording medium according to claim 24, wherein movement of a magnetic wall of a recording magnetic domain is suppressed by the texture during recording of information.

26. The magnetic recording medium according to claim 1, further comprising a protective layer which is composed of carbon.

27. A magnetic recording apparatus comprising:
the magnetic recording medium as defined in claim 1;
a magnetic head which records or reproduces information; and
a drive unit which drives the magnetic recording medium.

28. The magnetic recording apparatus according to claim 27, wherein a magnetic domain having a constant width and a constant length is formed in the recording medium with the magnetic head to record information.

29. The magnetic recording apparatus according to claim 27, wherein the magnetic head comprises an element which has a resistance that is changeable depending on a change of magnetic flux, and information is reproduced with the element.

30. The magnetic recording apparatus according to claim 27, further comprising an optical head which radiates a light beam onto the magnetic recording medium.

31. The magnetic recording apparatus according to claim 30, wherein information is recorded or erased by applying a magnetic field with the magnetic head while radiating the light beam onto the magnetic recording medium with the optical head so that the magnetic recording medium is heated during recording of information.

32. The magnetic recording apparatus according to claim 31, wherein the optical head radiates a pulsed light beam onto the magnetic recording medium.

33. The magnetic recording apparatus according to claim 32, wherein the pulsed light beam has a form of multipulse composed of pulses each having a constant width.

34. The magnetic recording apparatus according to claim 32, wherein the magnetic head applies, to the magnetic recording medium, a pulsed magnetic field which is synchronized with the pulsed light beam.

35. The magnetic recording apparatus according to claim 34, wherein the magnetic recording frequency of not less than 50 MHz.

36. The magnetic recording apparatus according to claim 27, wherein the recording is preformed so that a width in a track direction of a recording magnetic domain formed on a track of the magnetic recording medium is narrower than a gap width of the magnetic head.

37. The magnetic recording apparatus according to claim 28, wherein an areal recording density above 40 Gbits/inch$^2$ is provided.

* * * * *